United States Patent
Hayashi et al.

(10) Patent No.: US 12,504,831 B2
(45) Date of Patent: Dec. 23, 2025

(54) TACTILE PRESENTATION APPARATUS AND TACTILE PRESENTATION KNOB

(71) Applicant: Mitsubishi Electric Corporation, Tokyo (JP)

(72) Inventors: Masami Hayashi, Tokyo (JP); Tae Orita, Tokyo (JP); Yoshinori Ueno, Tokyo (JP); Mitsuru Sakai, Tokyo (JP); Naoki Numata, Tokyo (JP); Yuki Furumoto, Tokyo (JP); Tsuyoshi Sempuku, Tokyo (JP); Yuichi Sasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/779,142

(22) PCT Filed: Dec. 26, 2019

(86) PCT No.: PCT/JP2019/051171
§ 371 (c)(1),
(2) Date: May 24, 2022

(87) PCT Pub. No.: WO2021/130971
PCT Pub. Date: Jul. 1, 2021

(65) Prior Publication Data
US 2023/0010984 A1   Jan. 12, 2023

(51) Int. Cl.
G06F 3/02 (2006.01)
G06F 3/01 (2006.01)
G06F 3/041 (2006.01)

(52) U.S. Cl.
CPC ............ *G06F 3/0227* (2013.01); *G06F 3/016* (2013.01); *G06F 3/041* (2013.01)

(58) Field of Classification Search
None
See application file for complete search history.

(56) References Cited

U.S. PATENT DOCUMENTS

| 8,199,114 B1* | 6/2012 | Jaeger | G06F 3/044 |
| | | | 345/184 |
| 8,482,534 B2* | 7/2013 | Pryor | B60K 35/80 |
| | | | 345/184 |

(Continued)

FOREIGN PATENT DOCUMENTS

| CN | 108351693 A | 7/2018 |
| EP | 3556612 A1 | 10/2019 |

(Continued)

OTHER PUBLICATIONS

International Search Report mailed on Feb. 18, 2020, corresponding PCT/JP2019/051171, 3 pages.

(Continued)

*Primary Examiner* — Nitin Patel
*Assistant Examiner* — Sarvesh J Nadkarni
(74) *Attorney, Agent, or Firm* — XSENSUS LLP

(57) ABSTRACT

Regarding a tactile presentation panel, a tactile presentation panel that has a tactile presentation knob having a conductive member placed on an operation surface and presents a tactile sense to a user via the tactile presentation knob includes a movement amount calculation circuit that calculates a movement amount of the tactile presentation knob from current coordinates on the tactile presentation panel of the tactile presentation knob and past coordinates of the tactile presentation knob, a tactile strength calculation circuit that calculates a tactile strength to be applied to the user based on the movement amount, and a tactile presentation circuit that sets a voltage signal waveform based on the tactile strength. The movement amount is at least one of a (Continued)

rotation angle and a rotation speed of the tactile presentation knob.

71 Claims, 65 Drawing Sheets

(56) References Cited

U.S. PATENT DOCUMENTS

| | | | |
|---|---|---|---|
| 9,513,744 B2* | 12/2016 | Pryor | G01C 21/3664 |
| 11,188,152 B2 | 11/2021 | Ueda | |
| 2007/0279401 A1 | 12/2007 | Ramstein et al. | |
| 2010/0156809 A1 | 6/2010 | Nutaro et al. | |
| 2010/0214257 A1 | 8/2010 | Wussler et al. | |
| 2011/0102145 A1* | 5/2011 | Park | G06F 3/016 |
| | | | 340/6.1 |
| 2015/0103024 A1 | 4/2015 | Haga et al. | |
| 2015/0169080 A1 | 6/2015 | Choi et al. | |
| 2015/0199012 A1 | 7/2015 | Palmer | |
| 2016/0282944 A1 | 9/2016 | Haga et al. | |
| 2017/0123520 A1* | 5/2017 | Kim | G06F 3/016 |
| 2017/0269686 A1* | 9/2017 | Khoshkava | G06F 3/016 |
| 2019/0332197 A1 | 10/2019 | Kim et al. | |
| 2020/0103972 A1* | 4/2020 | Amin-Shahidi | G06F 3/0346 |

FOREIGN PATENT DOCUMENTS

| | | |
|---|---|---|
| JP | 2004-171157 A | 6/2004 |
| JP | 2010-123123 A | 6/2010 |
| JP | 2015-097076 A | 5/2015 |
| JP | 2015-144048 A | 8/2015 |
| JP | 2016-184391 A | 10/2016 |
| JP | 2017-168104 A | 9/2017 |
| JP | 2018-039297 A | 3/2018 |
| JP | 2018-195335 A | 12/2018 |
| JP | 6570799 B2 | 9/2019 |
| JP | 2019-197575 A | 11/2019 |
| KR | 10-1416720 B1 | 7/2014 |
| WO | 2018/116978 A1 | 6/2018 |

OTHER PUBLICATIONS

Office Action issued on Oct. 6, 2020, in corresponding Japanese patent Application No. 2020-535657, 10 pages.

Office Action issued on Sep. 28, 2024, in corresponding Chinese patent Application No. 201980103138.5, 36 pages.

Office Action issued on Feb. 13, 2025, in corresponding Chinese patent Application No. 201980103138.5, 32 pages.

* cited by examiner

F I G. 3
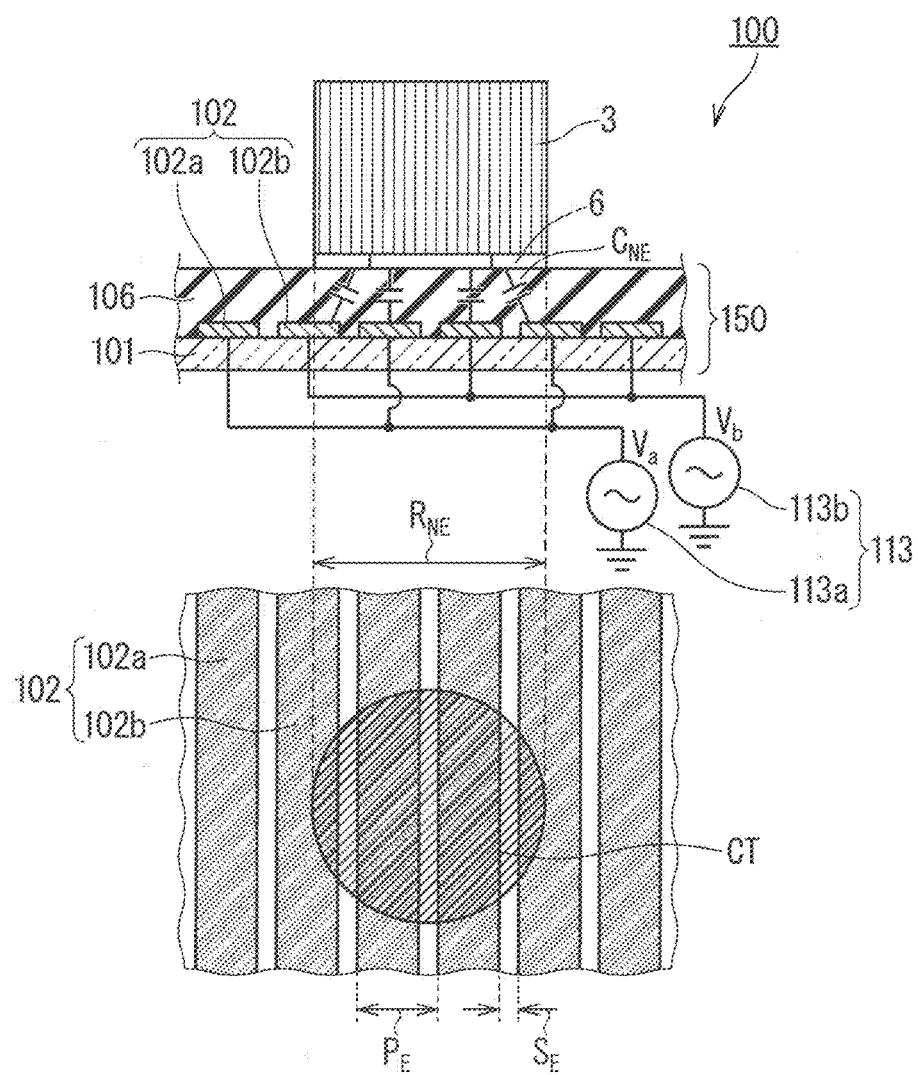

F I G. 1 1
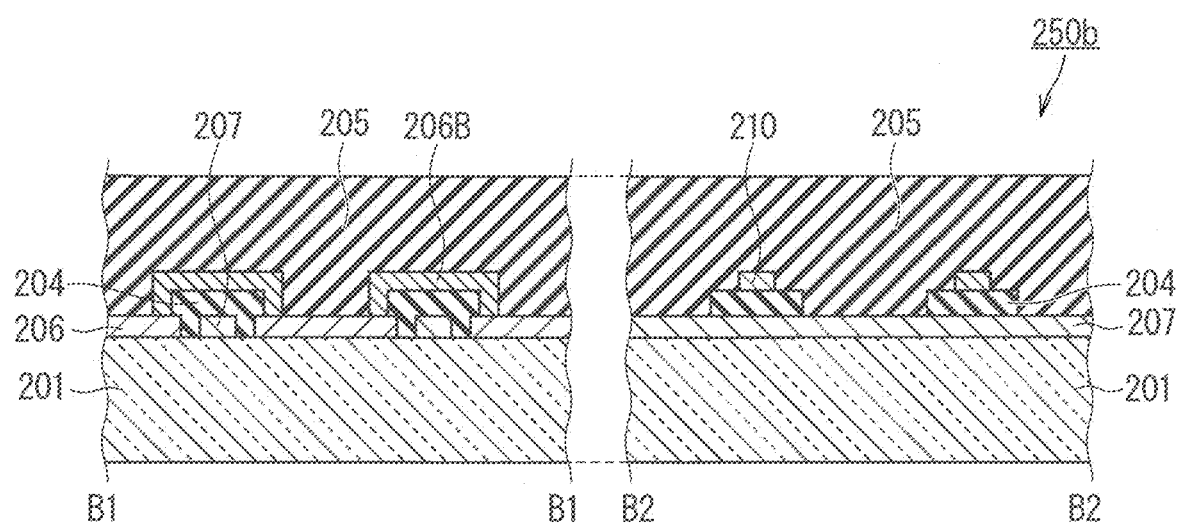

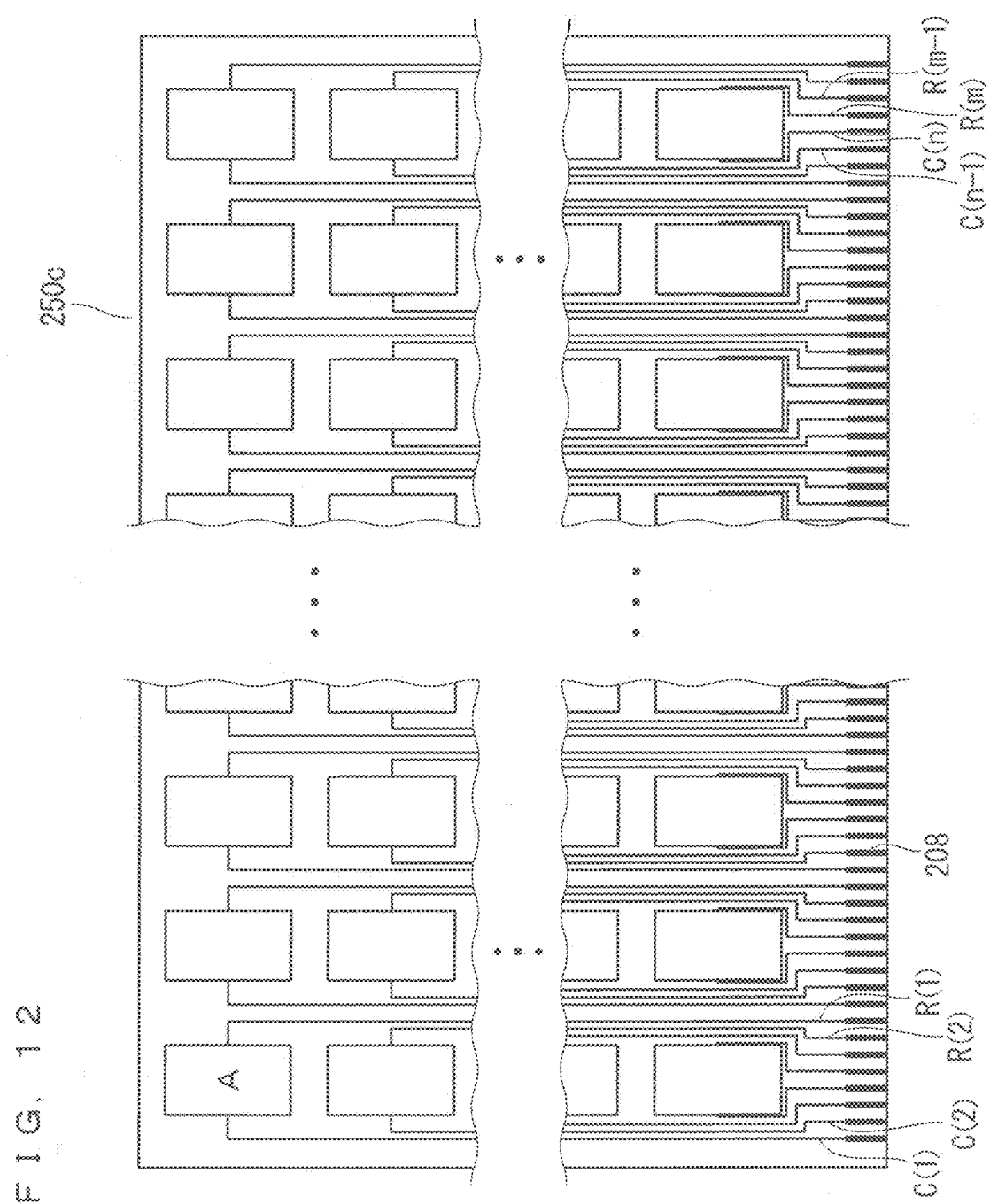

F I G. 2 1
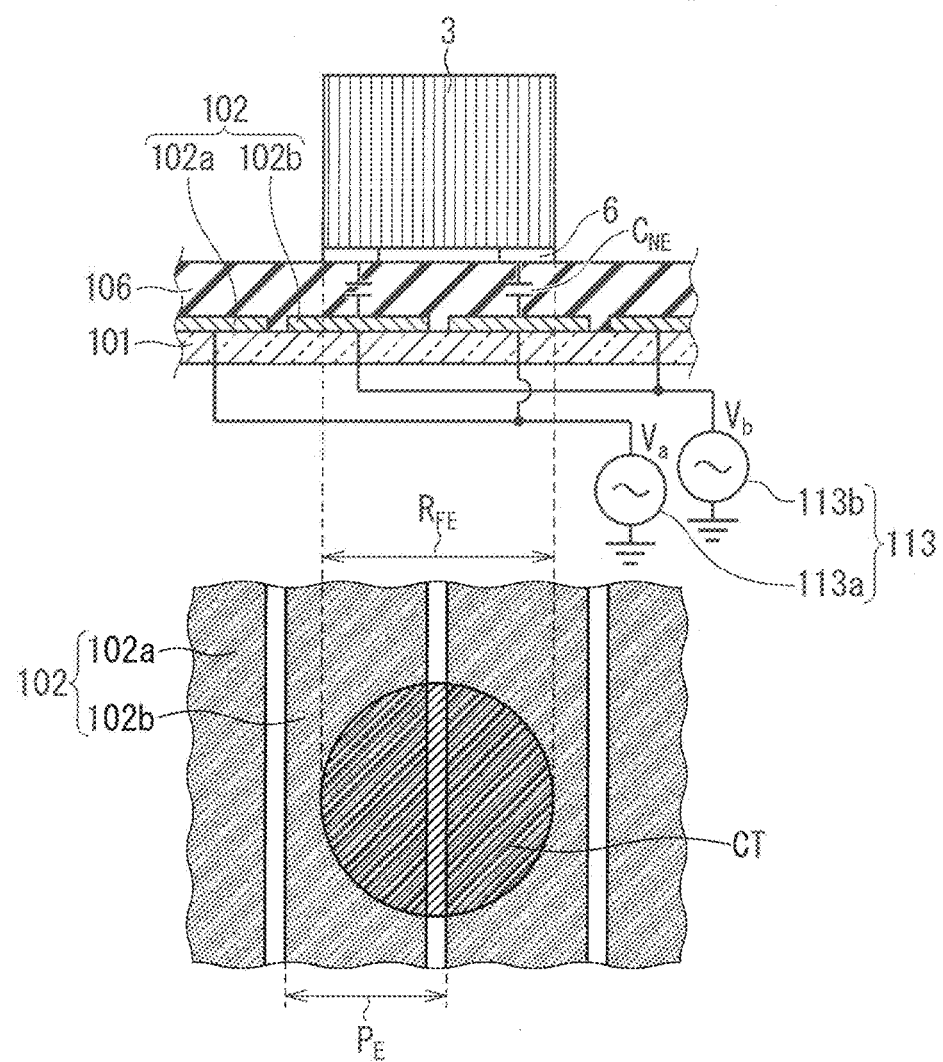

F I G. 29
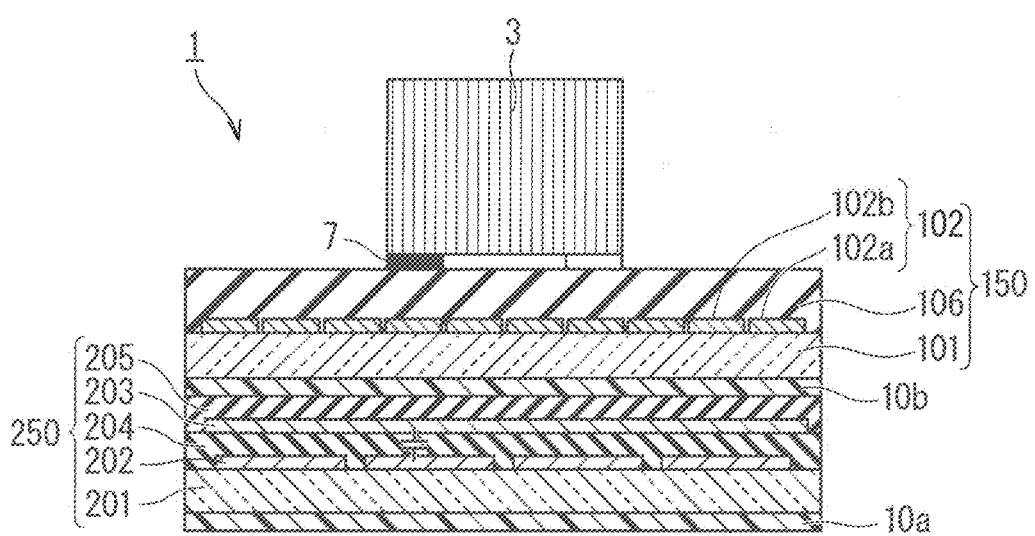

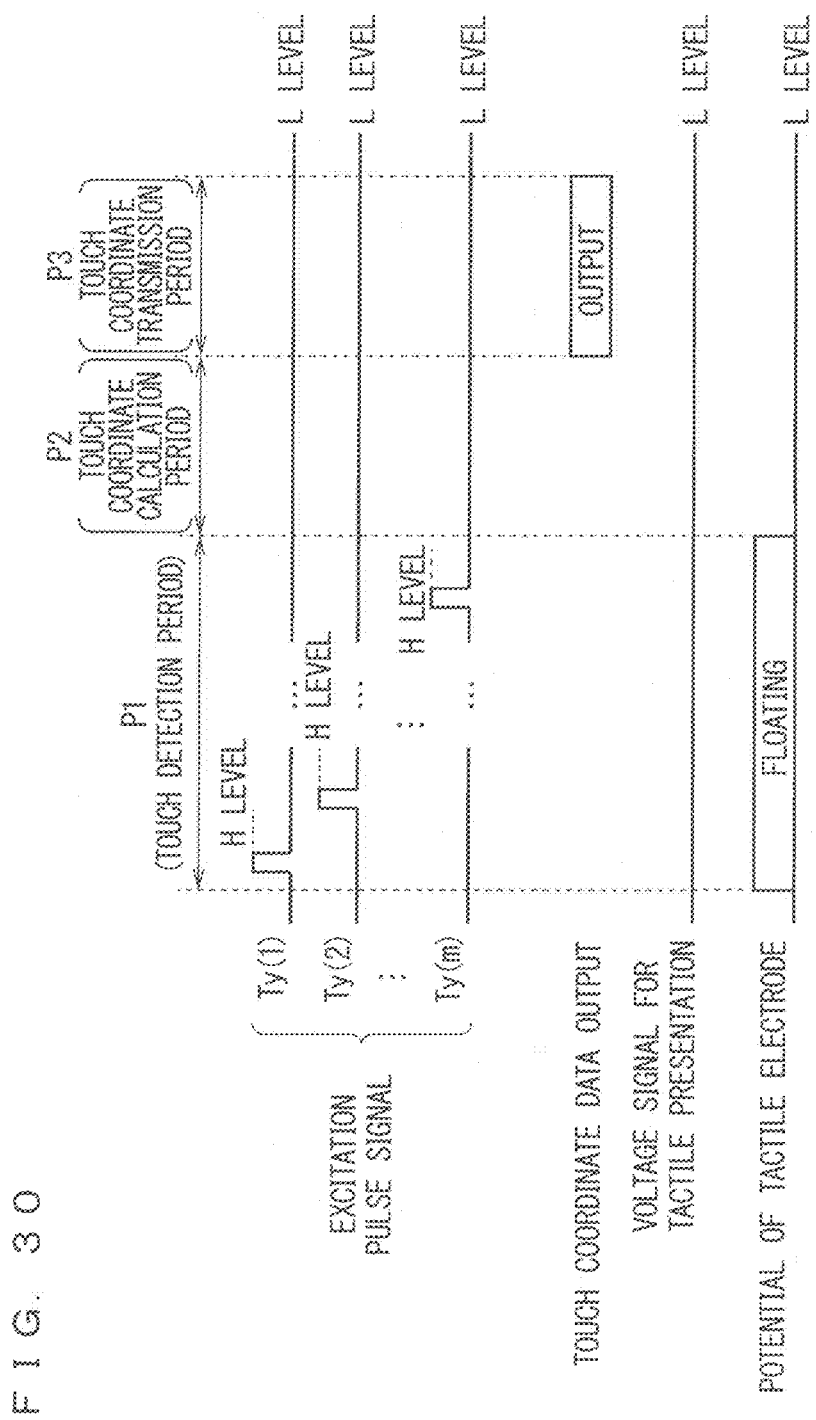

F I G. 3 1
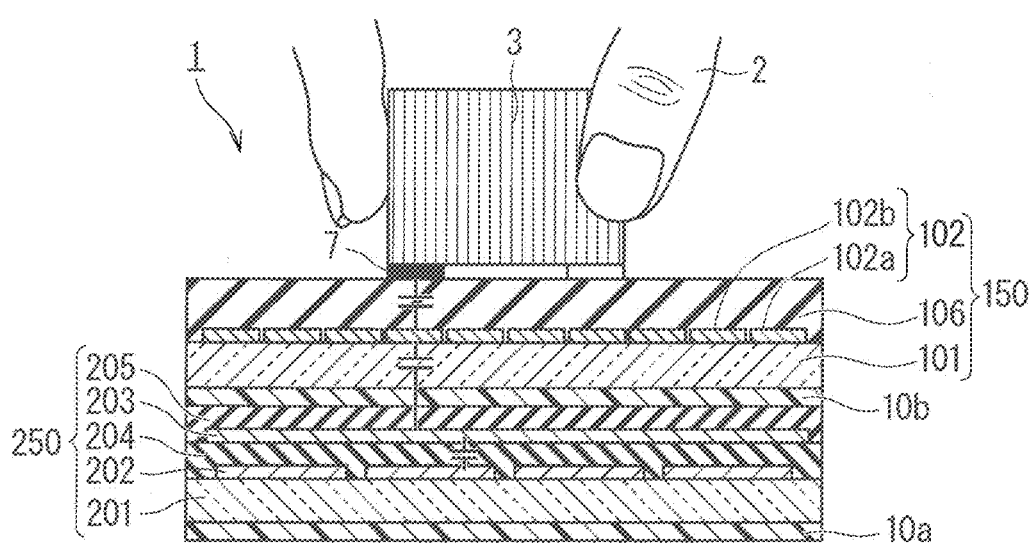

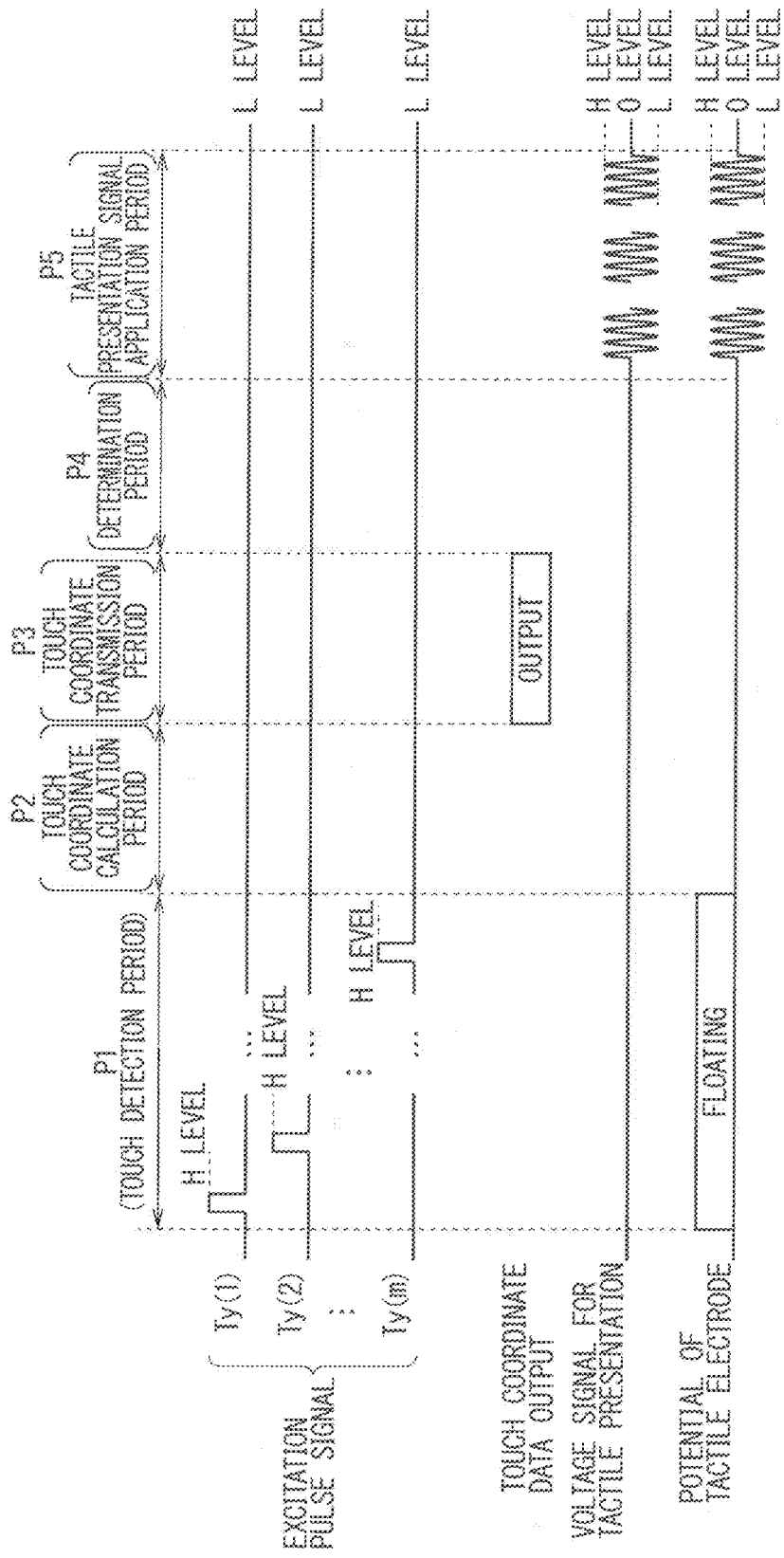
F I G. 3 2

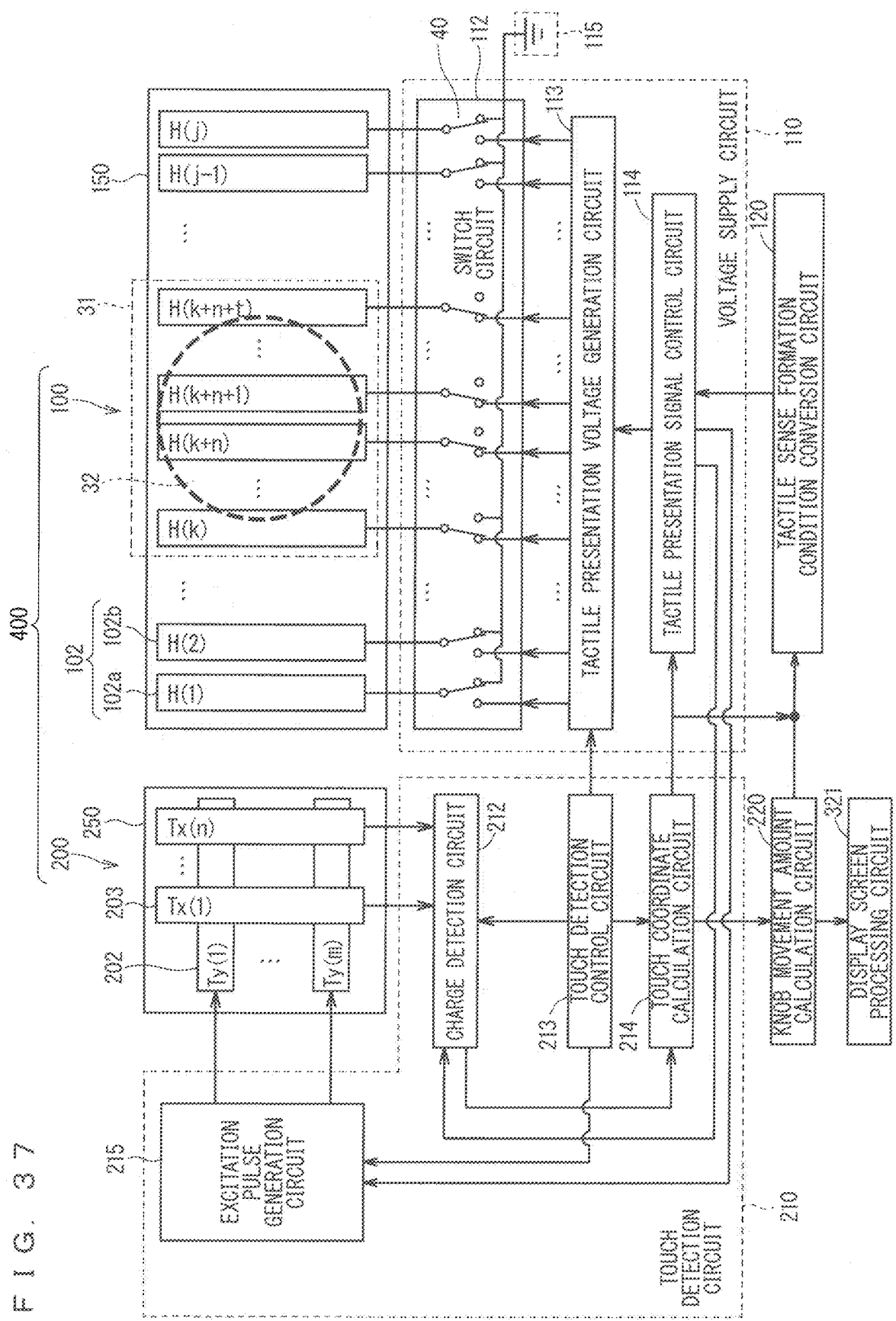
F I G. 37

F I G. 3 9
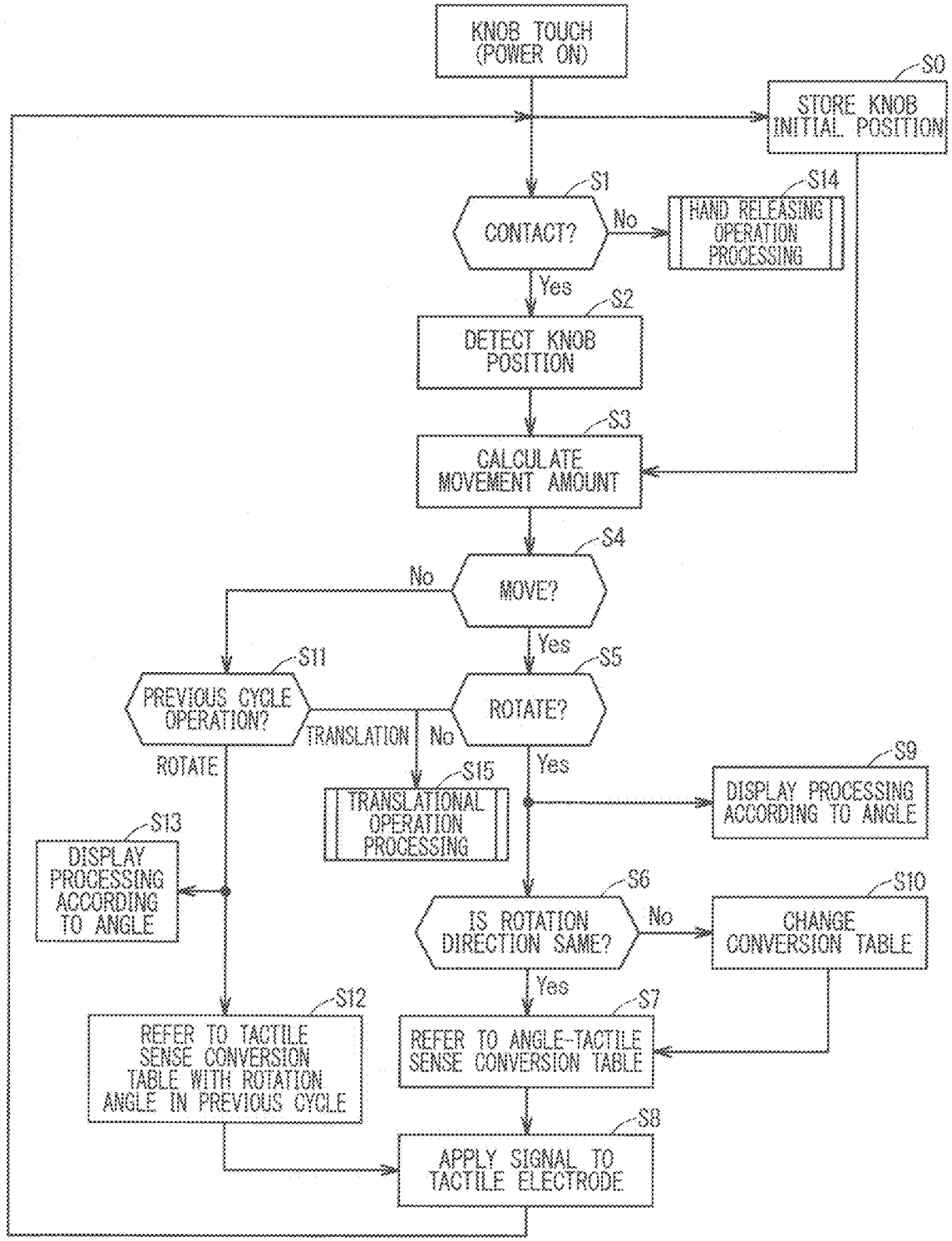

|  |  | KNOB | |
|---|---|---|---|
|  |  | CURRENT ROTATION AMOUNT STORAGE | ROTATION AMOUNT ZERO SETTING |
| DISPLAY SCREEN | SCREEN DISPLAY UPDATE CONTINUATION | ○ | × |
|  | CURRENT SCREEN HOLDING | ○ | ○ |
|  | SCREEN DISPLAY INITIALIZATION | × | ○ |

F I G. 4 8
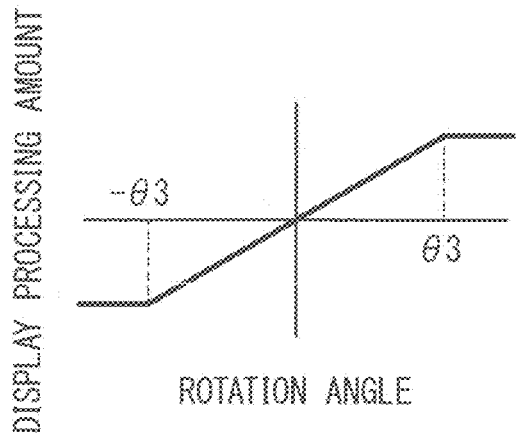
F I G. 4 9
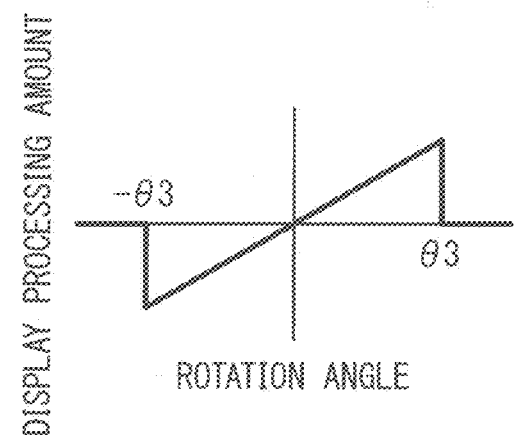
F I G. 5 0
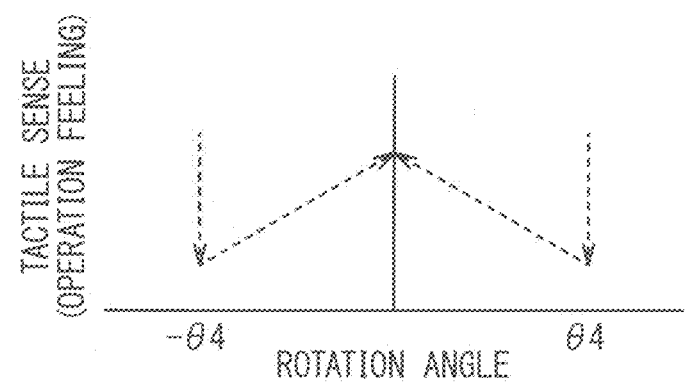

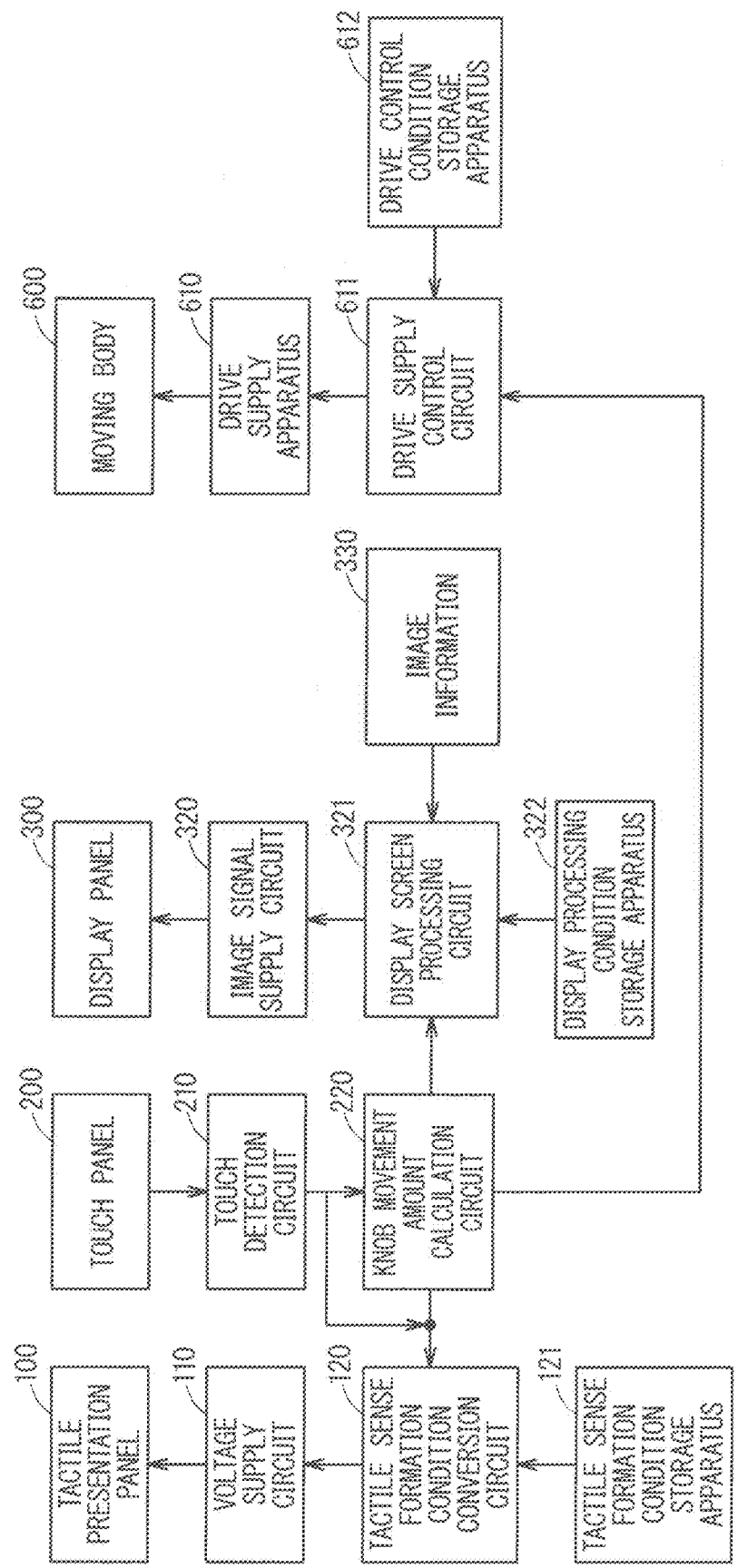
F I G. 66

F I G. 6 7
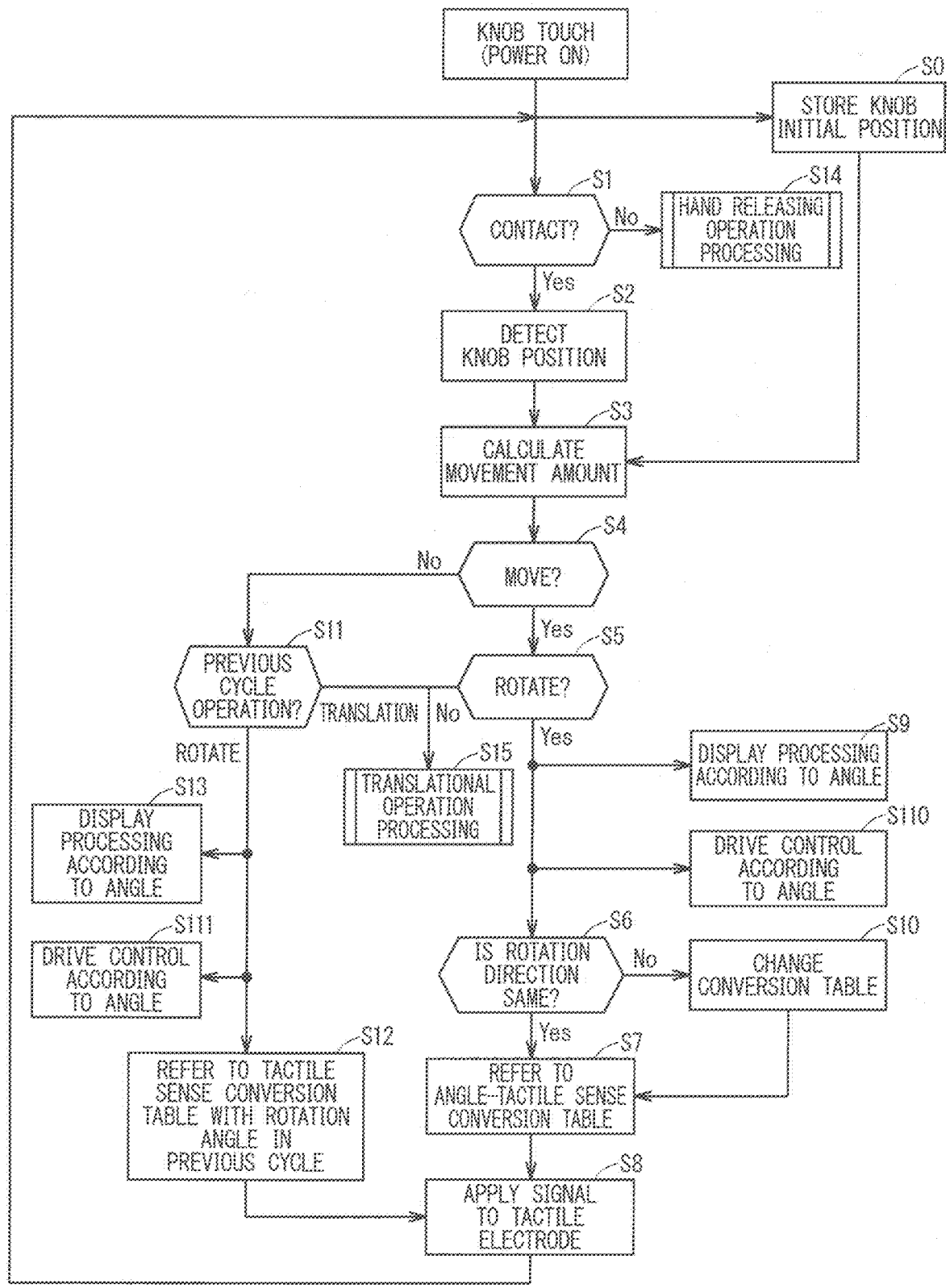

F I G. 7 1
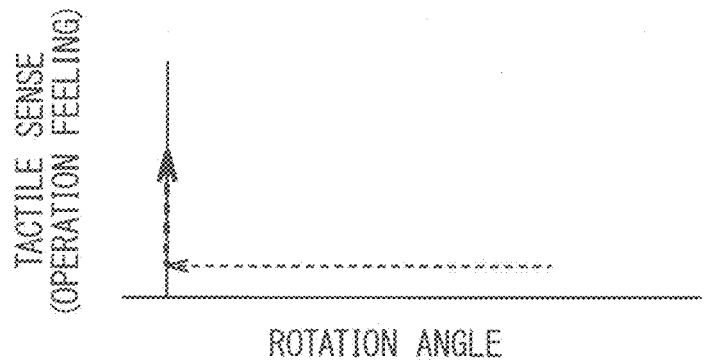
F I G. 7 2
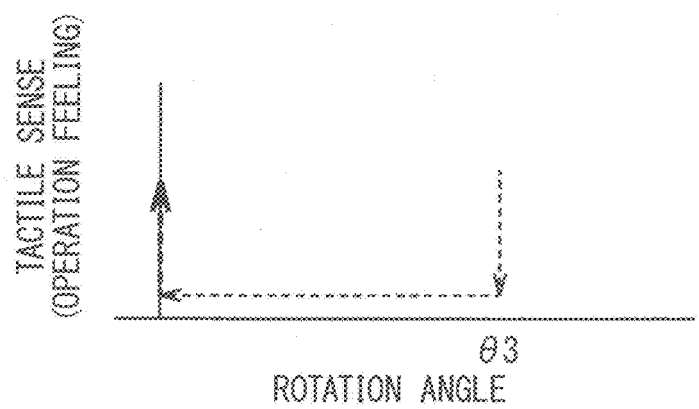
F I G. 7 3
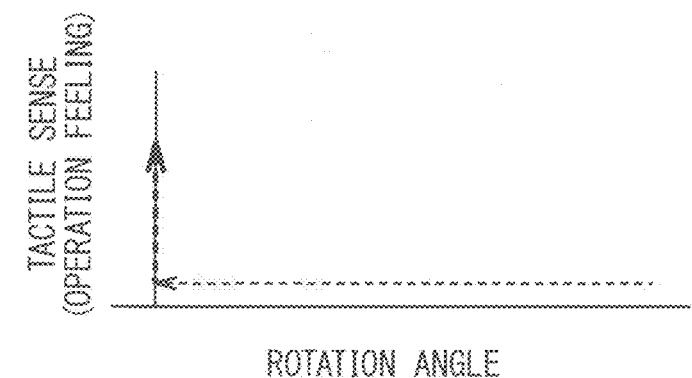

|  | ONE-DIRECTION OPERATION | SERIES OF RECIPROCATING OPERATIONS | | |
|---|---|---|---|---|
|  |  | FORWARD | FORWARD TO BACKWARD | BACKWARD |
| DISPLAY PROCESSING UPDATE | ○ | — | ○ | — |

F I G. 9 1
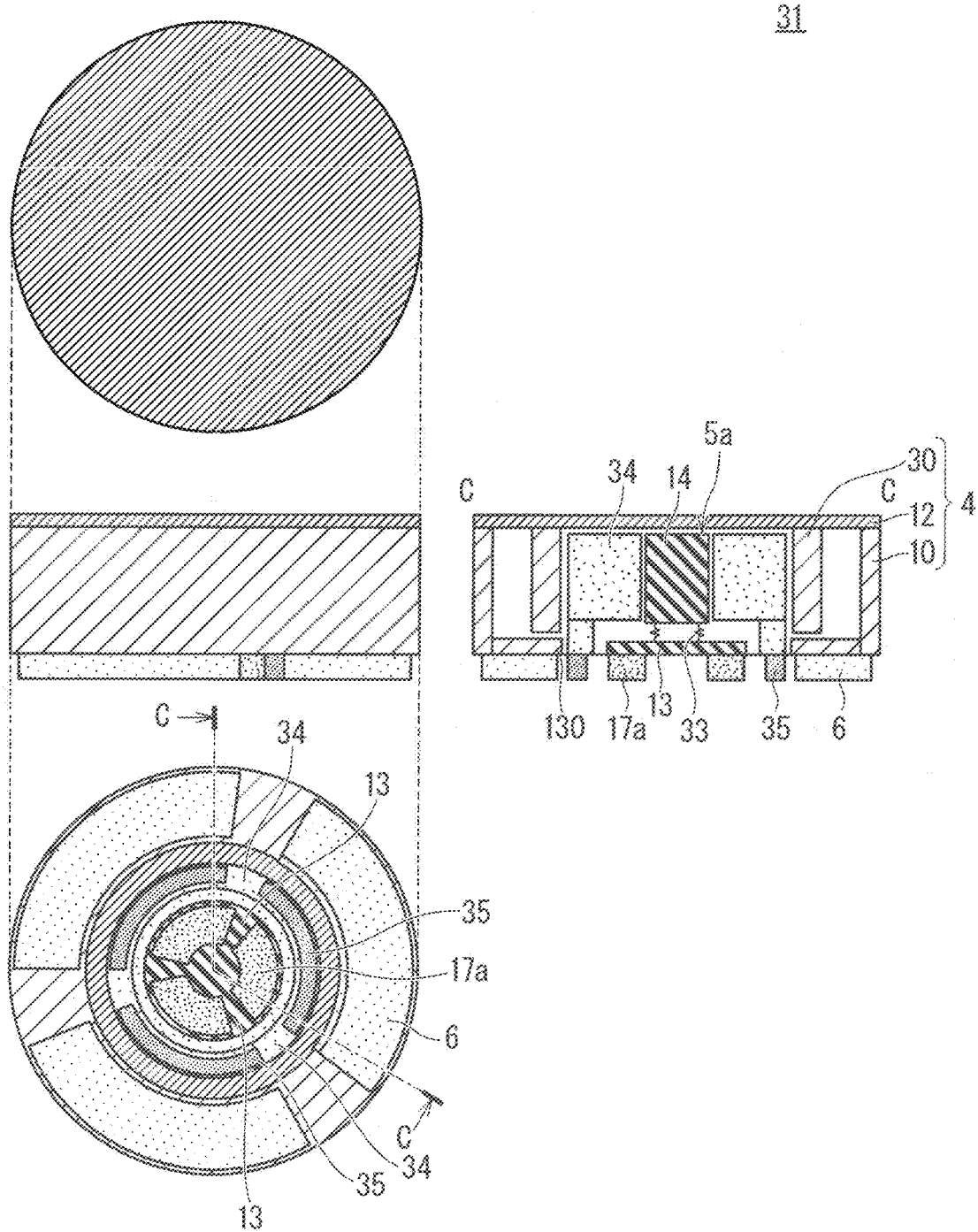

TACTILE PRESENTATION APPARATUS AND TACTILE PRESENTATION KNOB

CROSS-REFERENCE TO RELATED APPLICATIONS

The present application is based on PCT filing PCT/JP2019/051171, filed Dec. 26, 2019, the entire contents of which are incorporated herein by reference.

TECHNICAL FIELD

The present disclosure relates to a tactile presentation panel and a tactile presentation knob that present a tactile sense to the user via the tactile presentation knob.

BACKGROUND ART

A touch panel is widely known as an apparatus that detects and outputs a position (hereinafter, sometimes referred to as a "touch position") instructed by an indicator such as a finger of the user or a pen on a touch screen, and there is a projected capacitive touch panel (PCAP) as a touch panel using a capacitive sensing system. The PCAP can detect a touch position even in a case where a surface on the user side (hereinafter, sometimes referred to as a "front surface") of a touch screen is covered with a protective plate such as a glass plate having a thickness of about several mm. Further, the PCAP has advantages such as excellent robustness because a protective plate can be arranged on the front surface, and long life because no movable portion is included.

A touch screen of the PCAP includes a detection row direction wiring layer that detects coordinates of a touch position in a row direction and a detection column direction wiring layer that detects coordinates of a touch position in a column direction. In description below, the detection row direction wiring layer and the detection column direction wiring layer may be collectively referred to as a "detection wiring layer".

Further, a member on which the detection wiring layer is arranged is referred to as a "touch screen", and an apparatus in which a detection circuit is connected to the touch screen is referred to as a "touch panel". Furthermore, an area where a touch position can be detected on the touch screen is referred to as a "detectable area".

As the detection wiring layer for detecting electrostatic capacitance (hereinafter, may be simply referred to as "capacitance"), a first series conductor element formed on a thin dielectric film and a second series conductor element formed on the first series conductor element with an insulating film interposed between them are included. There is no electrical contact between the conductor elements, and one of the first series conductor element and the second series conductor element overlaps the other in plan view when viewed from the normal direction of the front surface. However, there is no electrical contact between the conductor elements, and the conductor elements intersect three-dimensionally.

Coordinates of a touch position of an indicator are identified as capacitance (hereinafter, sometimes referred to as "touch capacitance") formed between the indicator and a conductor element which is a detection wiring by a detection circuit. Further, the touch position between conductor elements can be interpolated by a relative value of detected capacitance of one or more conductor elements.

In recent years, a touch panel as an operation panel including a switch or the like has become used for many personal devices instead of a mechanical switch. However, since the touch panel has no unevenness like a mechanical switch and has a uniform touch, a surface shape is not changed by operation. For this reason, it is necessary to perform all the operation processes from position check of a switch to operation execution and operation completion by relying on vision, and there is a problem in reliability of blind operation and operability by a visually handicapped person at the time of operation performed in parallel with other work such as operation of a sound or the like during driving of an automobile.

For example, since a touch panel has become widely used in an in-vehicle device from the viewpoint of designability, it is difficult to operate the in-vehicle device by blind touch during driving, and from the viewpoint of ensuring safety, attention to a touch panel with a function that enables operation by blind touch is increasing. Further, in consumer devices, a touch panel as an operation panel has become used in many home appliances and electronic devices. Furthermore, from the viewpoint of designability, devices equipped with the PCAP whose surface is protected with cover glass are also increasing. However, since the touch panel has a smooth surface, it is difficult to check the position of a switch by touch, and it is difficult to support universal design. In the case of the PCAP, a smooth glass surface is required as design property, and it is difficult to support universal design such as processing unevenness on a glass surface corresponding to a switch position.

As a countermeasure against the above, there is a method of notifying that operation has been accepted and that operation has been completed by voice. However, a function and versatility equivalent to those of a mechanical switch are yet to be achieved, since, for example, an environment in which a voice function can be used is limited due to privacy and noise problems. If there are a function of presenting the position of a switch on the touch panel, a function of receiving operation, and a function of feeding back the completion of operation to the user by tactile sense, it is possible to realize operation by blind touch and support for universal design.

A mobile phone and a smartphone may have a tactile feedback feature using vibration to compensate for operational reliability and non-visual operability. It is expected that a feedback function by vibration in conjunction with operation by the user will rapidly become familiar, and demand for more advanced tactile feedback will increase.

Systems for generating a tactile sense are roughly divided into three types: a vibration system, an ultrasonic system, and an electric system. A feature of the vibration system is that it is possible to coexist with the PCAP and the cost is low. However, the vibration system is unsuitable for incorporation of a vibrator into a housing in a manner that the entire device vibrates sufficiently, and the area cannot be increased due to the limit of output of a vibrator. The ultrasonic system is capable of generating a tactile sense that cannot be generated by other systems, such as a smooth feeling. However, for the same reason as the vibration system, the ultrasonic method is unsuitable for incorporation into a housing, and is disadvantageous in that a large area cannot be obtained. The electric system includes an electrostatic friction system that generates a tactile sense by an electrostatic frictional force and an electric stimulation system that directly applies an electric stimulus to a finger.

These systems can generate a tactile sense at an optional position, and a large area can be obtained and multi-touch can be supported.

Hereinafter, this system will be described. Note that, hereinafter, a member in which a tactile electrode is arranged on a transparent insulating substrate is referred to as a "tactile presentation screen", and an apparatus in which a detection circuit is connected to the tactile presentation screen is referred to as a "tactile presentation panel". Further, an area where a tactile sense can be presented on the tactile presentation screen is referred to as a "tactile presentable area".

Regarding a tactile output device for a rotary knob, for example, in Patent Document 1, a knob corresponding to the rotary knob is attached on a screen of a display apparatus to which a touch panel is attached. The knob can be manually rotated by the user, and a projection is provided on a lower surface. When the user performs rotation operation of the knob, the projection moves while being in contact with a touch surface in accordance with the rotation operation. When the projection moves on the touch surface, the rotation operation of the knob is converted into touch operation. In a case where the user performs rotation operation, an actuator is controlled to vibrate the knob with a waveform corresponding to operation content.

PRIOR ART DOCUMENT

Patent Document

Patent Document 1: Japanese Patent No. 6570799

SUMMARY

Problem to be Solved by the Invention

In Patent Document 1, since the knob is attached and fixed onto the screen of the display apparatus to which the touch panel is attached, the user cannot perform rotation operation of the rotary knob at an optional position where the user can easily operate the rotary knob. Further, since a tactile sense is presented to the knob by vibration by the control of the actuator, a tactile sense that can be presented to the knob is limited to a vibration feeling and a click feeling, and an operable range defined by stopping the rotation operation cannot be presented. Furthermore, since a frictional force between the screen of the display apparatus and the rotary knob when there is no tactile sense is always constant, a resistance feeling when the knob is rotated cannot be changed. As described above, there is a problem in Patent Document 1 that it is not possible to provide an operation feeling of a dial knob that allows intuitive operation by a tactile sense of the user, and is user-friendly.

The present disclosure has been made to solve the above problem, and an object of the present disclosure is to provide a tactile presentation panel and a tactile presentation knob that can provide an operation feeling of a dial knob that allows intuitive operation by a tactile sense of the user, and is user-friendly.

Means to Solve the Problem

A tactile presentation panel according to the present disclosure is a tactile presentation panel that has a tactile presentation knob having a conductive member placed on an operation surface and presents a tactile sense to a user via the tactile presentation knob. The tactile presentation panel includes a movement amount calculation circuit that calculates a movement amount of the tactile presentation knob from current coordinates on the tactile presentation panel of the tactile presentation knob and past coordinates of the tactile presentation knob, a tactile strength calculation circuit that calculates a tactile strength to be applied to the user based on the movement amount; and a tactile presentation circuit that sets a voltage signal waveform based on the tactile strength. The movement amount is at least one of a rotation angle and a rotation speed of the tactile presentation knob.

Effects of the Invention

The tactile presentation panel according to the present disclosure can provide an operation feeling of a dial knob that allows intuitive operation by a tactile sense of the user, and is user-friendly.

BRIEF DESCRIPTION OF DRAWINGS

FIG. 3 is a schematic diagram for explaining electrostatic capacitance formed between a tactile electrode and a tactile presentation knob included in a tactile presentation panel in FIG. 2.

FIG. 11 is a partial cross-sectional view taken along line B1-B1 and line B2-B2 in FIG. 10.

FIG. 12 is a plan view schematically illustrating a configuration of a touch panel having a segment structure according to the first embodiment.

FIG. 21 is a schematic diagram for explaining electrostatic capacitance formed between the tactile electrode and the tactile presentation knob in a case where a pitch of the tactile electrode included in the tactile presentation panel in FIG. 2 is smaller than a diameter of the tactile presentation knob.

FIG. 29 is a schematic diagram for explaining electrostatic capacitance formed in the tactile presentation touch panel in FIG. 1 when the indicator is not in contact with the tactile presentation knob.

FIG. 30 is a timing chart schematically illustrating an operation timing of the tactile presentation touch panel of FIG. 1 when the indicator is not in contact with the tactile presentation knob.

FIG. 31 is a schematic diagram for explaining electrostatic capacitance formed in the tactile presentation touch panel in FIG. 1 when the indicator is in contact with the tactile presentation knob.

FIG. 32 is a timing chart schematically illustrating an operation timing of the tactile presentation touch panel of FIG. 1 when the indicator is in contact with the tactile presentation knob.

FIG. 37 is a block diagram schematically illustrating a configuration of the tactile presentation touch panel when a part of tactile electrodes with which the tactile presentation knob is in contact via a dielectric layer is connected to the ground at the time of signal voltage application according to the first embodiment.

FIG. 39 is a flowchart illustrating processing of tactile presentation according to the first embodiment.

FIG. 48 is a diagram illustrating a conversion table of a rotation angle and a display processing amount of the tactile presentation knob according to the first embodiment.

FIG. 49 is a diagram illustrating a conversion table of a rotation angle and a display processing amount of the tactile presentation knob according to the first embodiment.

FIG. 50 is a diagram illustrating a conversion table of a rotation angle and a tactile sense (operation feeling) of the tactile presentation knob according to the first embodiment.

FIG. 66 is a block diagram illustrating an outline of a relationship between a display panel, a touch panel, the tactile presentation panel, and a moving body according to the first embodiment.

FIG. 67 is a flowchart illustrating processing of tactile presentation according to a third embodiment.

FIG. 71 is a diagram illustrating a conversion table of a rotation angle and a tactile sense (operation feeling) of the tactile presentation knob according to the third embodiment.

FIG. 72 is a diagram illustrating a conversion table of a rotation angle and a tactile sense (operation feeling) of the tactile presentation knob according to the third embodiment.

FIG. 73 is a diagram illustrating a conversion table of a rotation angle and a tactile sense (operation feeling) of the tactile presentation knob according to the third embodiment.

FIG. 91 is a diagram illustrating an example of a configuration of the tactile presentation knob according to the fifth embodiment.

DESCRIPTION OF EMBODIMENTS

First Embodiment

<Tactile Presentation Touch Display>

Figure 1:
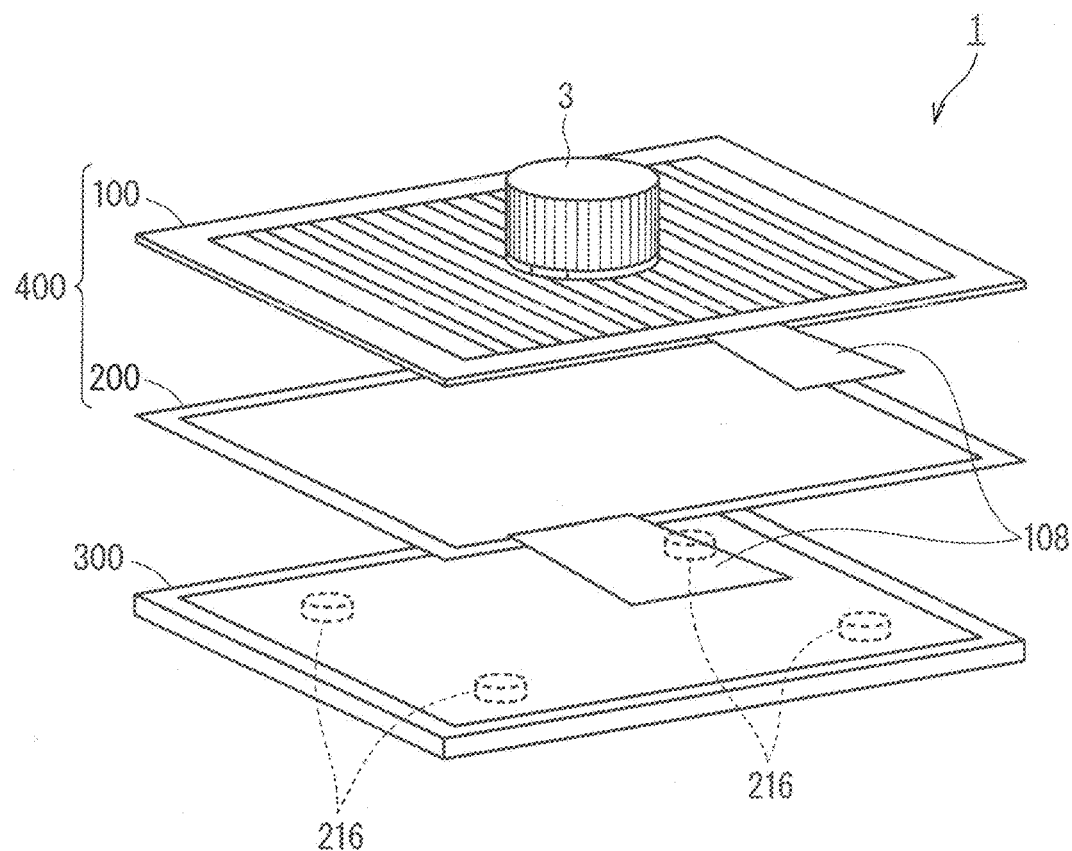
FIG. 1 is an exploded perspective view schematically illustrating a configuration of a tactile presentation touch display according to a first embodiment.
Figure 2:
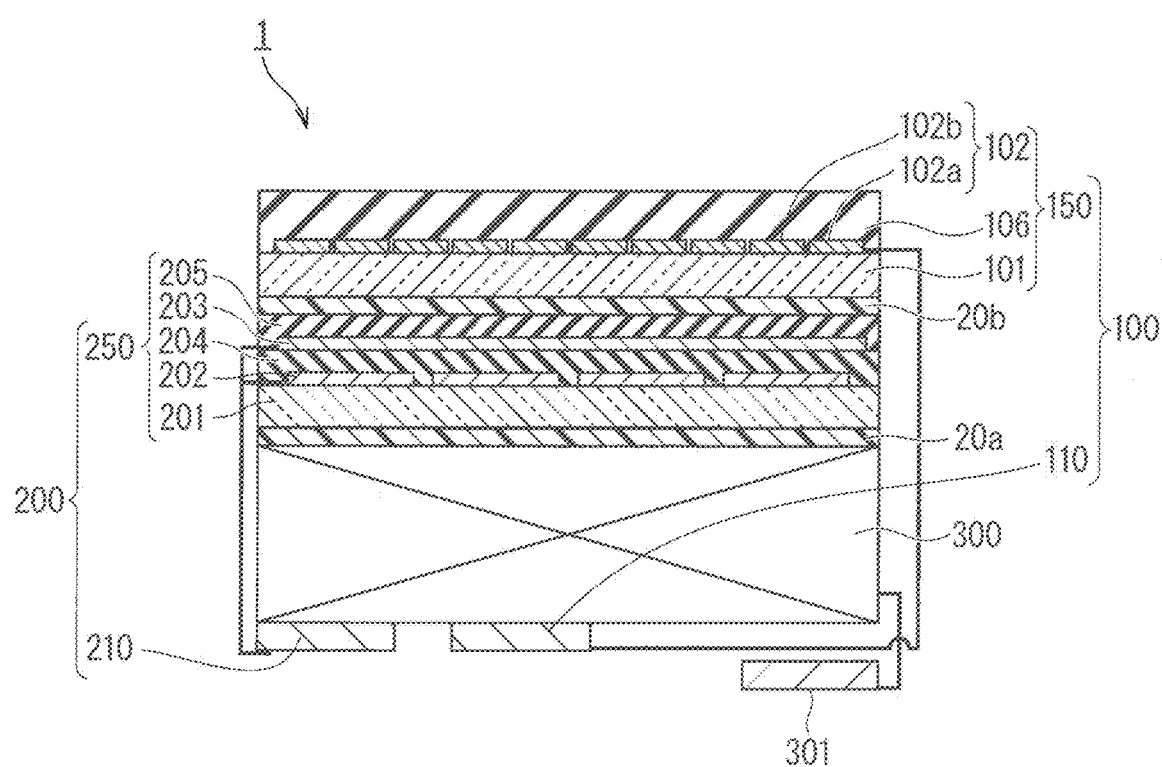
FIG. 2 is a cross-sectional view schematically illustrating a configuration of a tactile presentation touch display of FIG. 1.

FIG. 1 is an exploded perspective view schematically illustrating a configuration of a tactile presentation device in which a tactile presentation knob 3 is placed on a tactile presentation touch display 1 according to a first embodiment to present an operational feeling and a tactile sense of an operation amount. FIG. 2 is a cross-sectional view schematically illustrating a configuration of the tactile presentation touch display 1.

The tactile presentation touch display 1 includes a tactile presentation touch panel 400 and a display panel 300 to which the tactile presentation touch panel 400 is attached. The display panel 300 includes a pressure sensitive sensor 216. The tactile presentation touch panel 400 includes a tactile presentation panel 100 and a touch panel 200. The tactile presentation panel 100 includes a tactile presentation screen 150 and a voltage supply circuit 110. The touch panel 200 includes a touch screen 250 and a touch detection circuit 210.

In the first embodiment, the tactile presentation screen 150 is arranged on the side (front side) facing the user of the tactile presentation touch display 1, and is fixed to a surface (front surface) facing the user of the touch screen 250 by an adhesive material 20b. The touch screen 250 is fixed to a surface (front surface) facing the user of the display panel 300 facing the user by an adhesive material 20a.

The tactile presentation screen 150 includes a transparent insulating substrate 101, a tactile electrode 102, and a dielectric layer 106. The tactile electrode 102 includes a plurality of first electrodes 102a and a plurality of second electrodes 102b alternately arranged at intervals on the transparent insulating substrate 101. The dielectric layer 106 covers a plurality of the first electrodes 102a and a plurality of the second electrodes 102b. The tactile presentation screen 150 is electrically connected to the voltage supply circuit 110 by a flexible print circuit (FPC) 108.

The touch screen 250 includes a substrate 201 that is transparent and has insulating property, an excitation electrode 202, a detection electrode 203, an interlayer insulating layer 204, and an insulating layer 205. The touch screen 250 is electrically connected to the touch detection circuit 210 by the FPC 108. The touch detection circuit 210 detects a touched position on the transparent insulating substrate 101 of tactile presentation screen 150. This enables not only tactile presentation but also touch position detection on the transparent insulating substrate 101. The touch detection circuit 210 includes, for example, a detection integrated circuit (IC) for detecting a change in electrostatic capacitance due to touching and a microcomputer. Details of the configuration of the touch screen 250 will be described later with reference to a specific example.

The display panel 300 includes two transparent insulating substrates facing each other, and a display function layer sandwiched between them and having a display function. The display panel 300 is typically a liquid crystal panel. The display panel 300 may be an organic electro-luminescence (EL) panel, a micro light emitting diode (LED) panel, or an electronic paper panel. The touch panel 200 is typically a PCAP.

<Outline of Tactile Presentation Panel>

Figure 4:
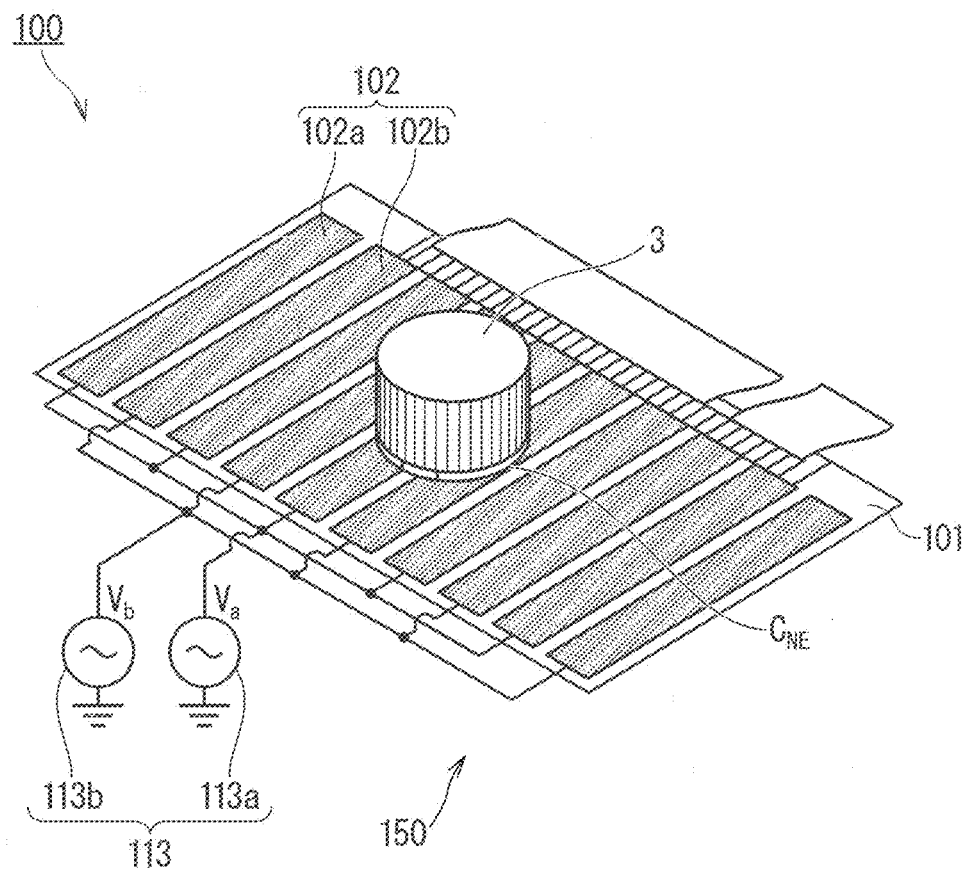
FIG. 4 is a perspective view for explaining electrostatic capacitance formed between the tactile electrode and the tactile presentation knob included in the tactile presentation panel in FIG. 2.

FIG. 3 is a diagram for schematically explaining electrostatic capacitance $C_{NE}$ formed between the tactile electrode 102 and the tactile presentation knob 3 included in the tactile presentation panel 100. FIG. 4 is a perspective view of FIG. 3. When the tactile presentation knob 3 touches a contact surface CT which is a part of the front surface of the tactile presentation screen 150, electrostatic capacitance $C_{NE}$ is formed between the tactile presentation knob 3 and the tactile electrode 102 on the contact surface CT via the dielectric layer 106. Note that, in these diagrams, only a tactile presentation voltage generation circuit 113 included in the voltage supply circuit 110 (see FIG. 2) is illustrated for easy understanding of the diagrams, and other configurations included in the voltage supply circuit 110 are not illustrated. A more specific configuration of the voltage supply circuit 110 will be described later.

The tactile presentation voltage generation circuit 113 included in the voltage supply circuit 110 includes a first voltage generation circuit 113a and a second voltage generation circuit 113b. The first voltage generation circuit 113a applies a voltage signal $V_a$ to the first electrode 102a located on at least a partial region of the transparent insulating substrate 101 among a plurality of the first electrodes 102a, and applies the voltage signal $V_a$ to all the first electrodes 102a located on at least a partial region of the transparent insulating substrate 101 in the first embodiment. The second voltage generation circuit 113b applies a voltage signal $V_b$ to the second electrode 102b located on at least a partial region of the transparent insulating substrate 101 among a plurality of the second electrodes 102b, and applies the voltage signal $V_b$ to all the second electrodes 102b located on at least a partial region of the transparent insulating substrate 101 in the first embodiment.

Figure 5:
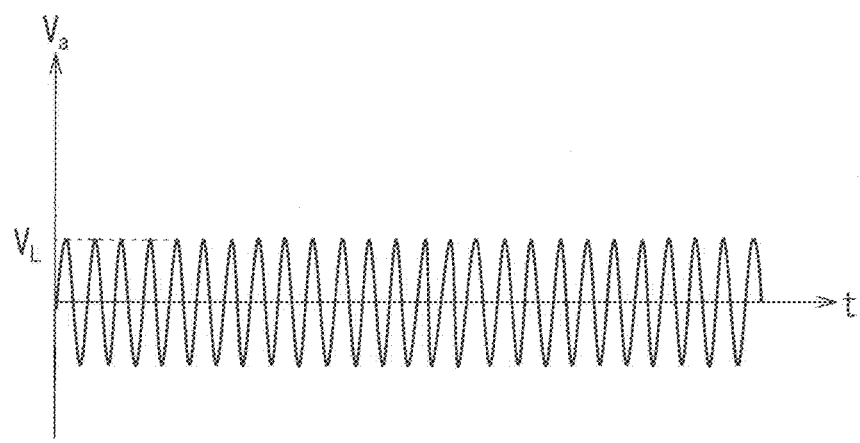
FIG. 5 is a graph illustrating an example of a voltage signal of a first frequency applied to a first electrode of FIG. 2.
Figure 6:
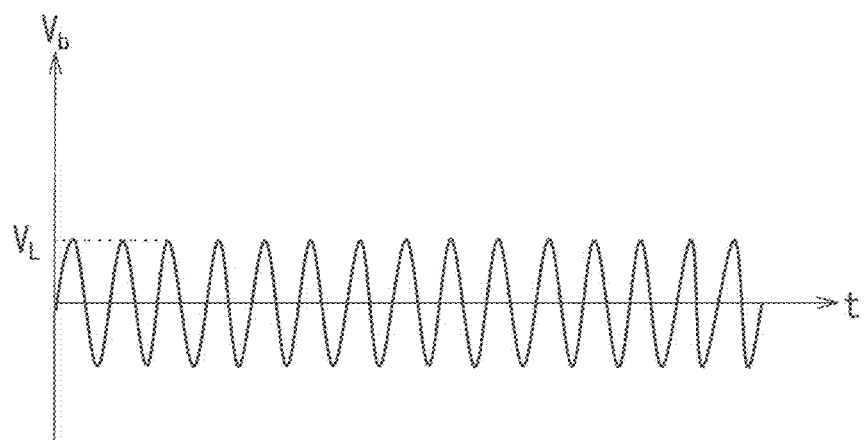
FIG. 6 is a graph illustrating an example of a voltage signal of a second frequency applied to a second electrode of FIG. 2.

Each of FIGS. 5 and 6 is a graph illustrating an example of the voltage signal $V_a$ and the voltage signal $V_b$. The voltage signal $V_a$ (first voltage signal) of the first voltage generation circuit 113a has a first frequency. The voltage signal $V_b$ (second voltage signal) of the second voltage generation circuit 113b has a second frequency different from the first frequency. An amplitude of the voltage signal $V_a$ and an amplitude of the voltage signal $V_b$ may be the same amplitude $V_L$. In the examples of FIGS. 5 and 6, sine waves having different frequencies are used as the voltage signal $V_a$ and the voltage signal $V_b$. Instead of the sine wave, a pulse wave or one having another shape may be used. In order to generate a sufficiently large tactile sense, the amplitude $V_L$ is preferably about several tens of volts.

Figure 7:
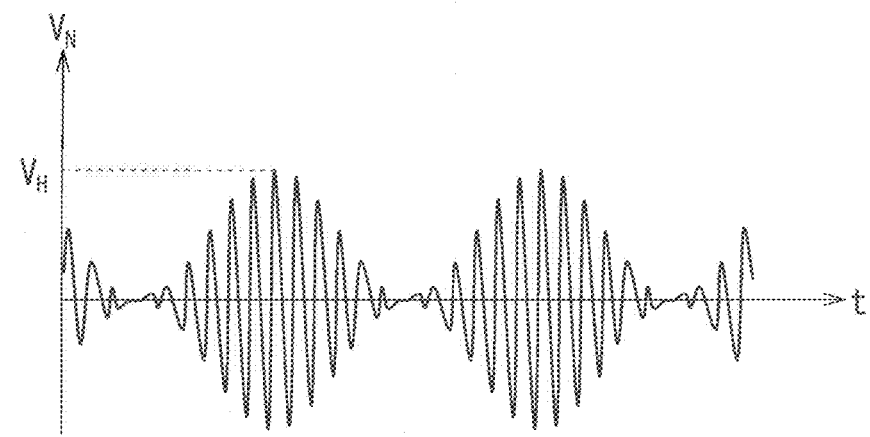
FIG. 7 is a graph illustrating an amplitude modulation signal generated by combining voltage signals of FIGS. 5 and 6.

FIG. 7 is a graph illustrating an amplitude modulation signal $V_N$ generated by combining the voltage signal $V_a$ (see FIG. 5) and the voltage signal $V_b$ (see FIG. 6). The voltage signal $V_a$ is applied to the first electrode 102a, and the voltage signal $V_b$ is applied to the second electrode 102b. As a result, in a region where the electrostatic capacitance $C_{NE}$ (see FIG. 4) is formed between each of the first electrode 102a and the second electrode 102b and the tactile presentation knob 3, charging and discharging are repeated according to the amplitude modulation signal $V_N$ having a maximum amplitude $V_H$ that is approximately twice the amplitude $V_L$. As a result, an electrostatic force corresponding to the amplitude modulation signal $V_N$ having the maximum amplitude $V_H$ is applied to the tactile presentation knob 3 that is in contact with the first electrode 102a and the second electrode 102b via dielectric layer 106. The amplitude modulation signal $V_N$ has a beat frequency corresponding to a difference between the first frequency and the second frequency. Therefore, when the tactile presentation knob 3 rotates on the tactile presentation screen 150, a frictional force acting on the tactile presentation knob 3 changes at the above-described beat frequency. As a result, the tactile presentation knob 3 vibrates at a beat frequency. The user perceives the vibration of the tactile presentation knob 3 as a tactile sense obtained from the tactile presentation screen 150. As described above, the tactile presentation screen 150 included in the tactile presentation panel 100 is configured to generate a tactile sense by changing a frictional force applied to the tactile presentation knob 3 by controlling an electrostatic force applied to the tactile presentation knob 3.

As described above, the amplitude modulation signal $V_N$ having a voltage approximately twice that of each of the input voltage signal $V_a$ (see FIG. 5) and the voltage signal $V_b$ (see FIG. 6) is generated. In this manner, the amplitude modulation signal $V_N$ necessary for exerting a desired frictional force on the tactile presentation knob 3 can thus be generated by the voltage signal $V_a$ (see FIG. 5) and the voltage signal $V_b$ (see FIG. 6) having a voltage of approximately ½ of the amplitude modulation signal $V_N$. Therefore, as compared with a case where an amplitude modulation signal is directly input to the first electrode 102a and the second electrode 102b, the same electrostatic force can be generated at a voltage of ½, and low-voltage driving can be performed.

In order to present a sufficiently large tactile sense to the user, the maximum amplitude $V_H$ only needs to be sufficiently large in a manner corresponding to the tactile sense, and the amplitude $V_L$ may be a small value as compared with that. Therefore, the amplitude $V_L$ itself does not need to be as large as generating a sufficiently large tactile sense. As a result of the amplitude $V_L$ being set in this way, in a state where only one of the first electrode 102a and the second electrode 102b is in contact with the tactile presentation knob 3, the user hardly perceives a tactile sense regardless of how the frequencies of the voltage signal $V_a$ and the voltage signal $V_b$ are selected.

In order to facilitate positioning of the tactile presentation knob 3 across the first electrode 102a and the second electrode 102b, a pitch $P_E$ of the tactile electrodes 102 is preferably smaller than a diameter $R_{NE}$ of the contact surface CT. This will be described later in detail.

<Touch Panel>

Figure 8:
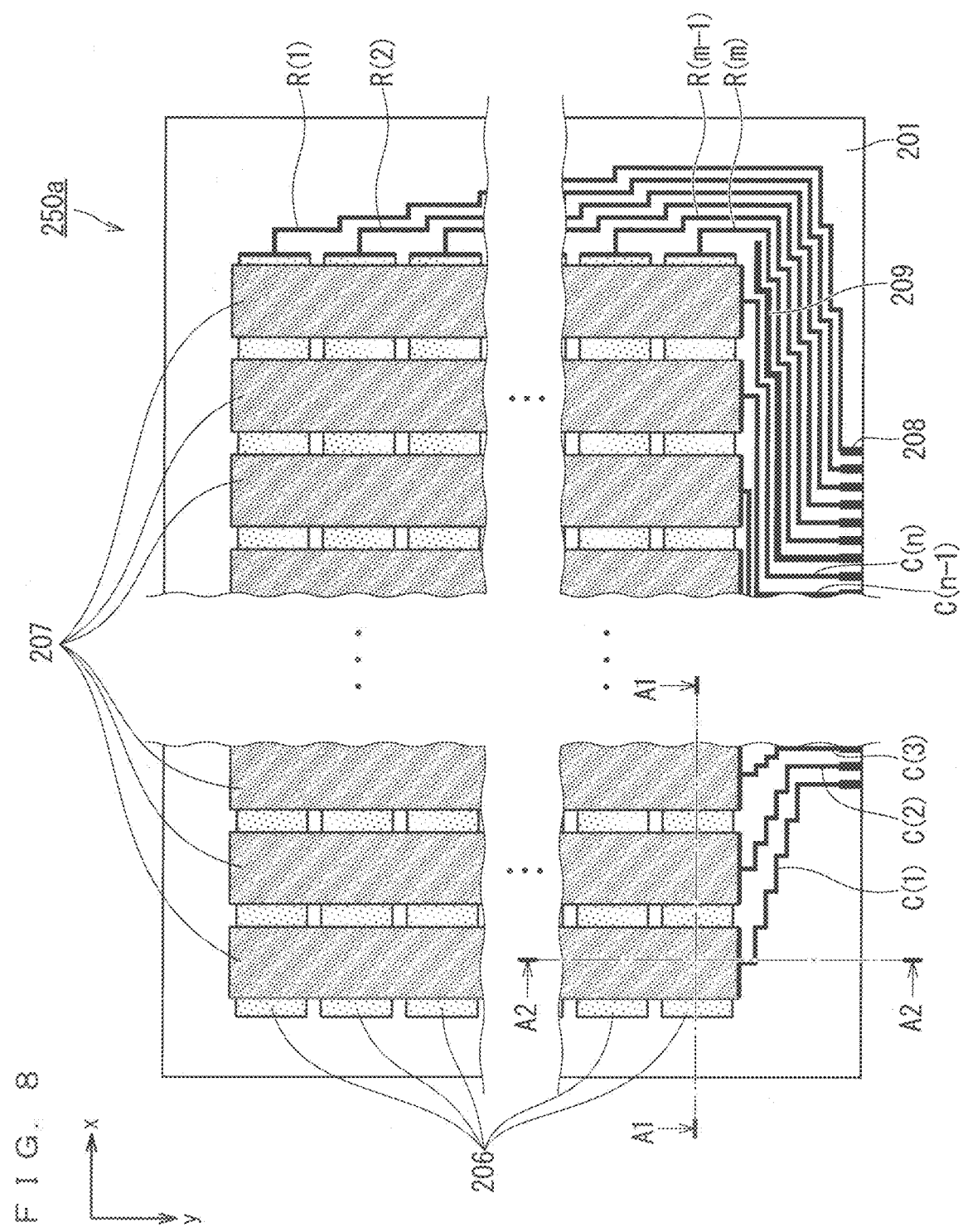
FIG. 8 is a plan view illustrating an example of a touch screen in FIG. 2.
Figure 9:
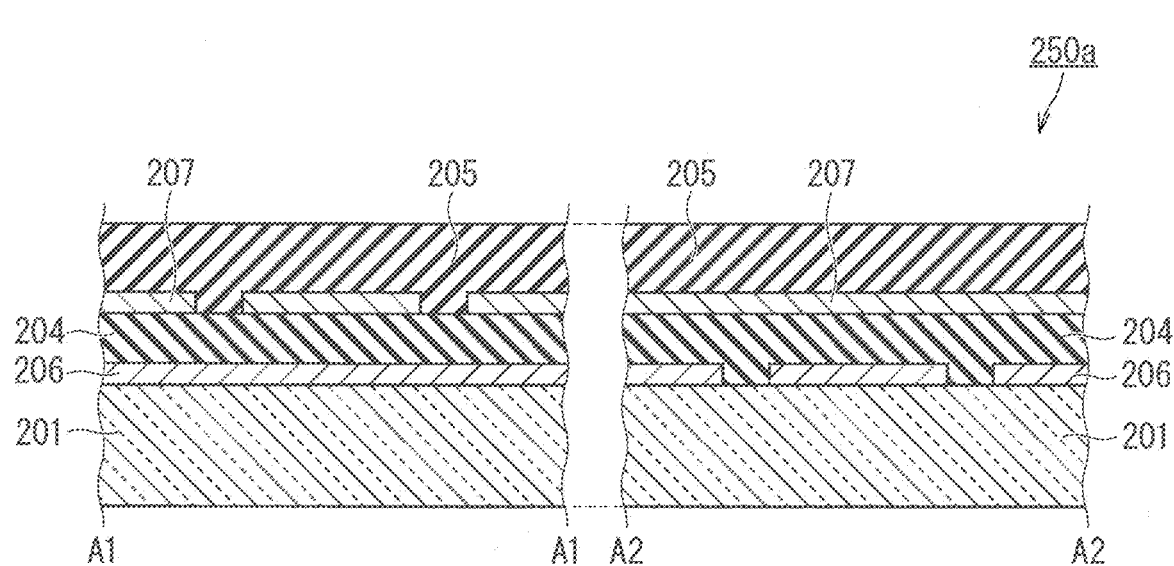
FIG. 9 is a partial cross-sectional view taken along line A1-A1 and line A2-A2 in FIG. 8.

FIG. 8 is a plan view illustrating a touch screen 250a of a capacitive sensing system as an example of the touch screen 250 (see FIG. 2). FIG. 9 is a partial cross-sectional view taken along line A1-A1 and line A2-A2 in FIG. 8.

The touch screen 250a includes a plurality of row direction wiring layers 206 and a plurality of column direction wiring layers 207. Each of the row direction wiring layers 206 includes a plurality of excitation electrodes 202 (see FIG. 2) electrically connected to each other, and each of the column direction wiring layers 207 includes a plurality of detection electrodes 203 (see FIG. 2) electrically connected to each other. In FIGS. 8 and 9, the row direction wiring layer 206 and the column direction wiring layer 207 are illustrated ignoring such a microstructure. The excitation electrode 202 (see FIG. 2) has a single layer film or a multilayer film of metal, or a multilayer structure including any of these and also using another conductive material. As the metal, for example, low resistance metal such as aluminum or silver is preferable. The same applies to the detection electrode 203 (see FIG. 2). By using metal as a wiring material, wiring resistance can be reduced. In contrast, a metal wiring, which is opaque, is easily visually recognized. In order to lower the visibility and increase the transmittance of the touch screen, a thin wire structure is preferably provided to the metal wiring. The thin wire structure is typically mesh-like.

Each of the row direction wiring layers 206 extends along the row direction (x direction in the diagram), and each of the column direction wiring layers 207 extends along the column direction (y direction in the diagram). A plurality of the row direction wiring layers 206 are arranged at intervals in the column direction, and a plurality of the column direction wiring layers 207 are arranged at intervals in the row direction. As illustrated in FIG. 8, in plan view, each of the row direction wiring layers 206 intersects a plurality of the column direction wiring layers 207, and each of the column direction wiring layers 207 intersects a plurality of the row direction wiring layers 206. The row direction wiring layer 206 and the column direction wiring layer 207 are insulated by the interlayer insulating layer 204.

The interlayer insulating layer 204 includes a single-layer film of an organic insulating film, a single-layer film of an inorganic insulating film, or a multilayer film. An inorganic insulating film is excellent for improving moisture resistance, and an organic insulating film is excellent for improving flatness. As the inorganic insulating film, for example, a transparent silicon-based inorganic insulating film such as a silicon oxide film, a silicon nitride film, or a silicon oxynitride film, or a transparent inorganic insulating film composed of a metal oxide such as alumina is used. As a material of the organic insulating film, a polymer material having a main chain composed of a silicon oxide, a silicon nitride film, or a silicon oxynitride film and having an organic substance bonded to a side chain or a functional group of the main chain, or thermosetting resin having a main chain composed of carbon can be used. Examples of the thermosetting resin include acrylic resin, polyimide resin, epoxy resin, novolak resin, and olefin resin.

Each of the row direction wiring layers 206 of the touch screen 250a is connected to a touch screen terminal portion 208 by lead-out wiring layers R(1) to R(m). Each of the column direction wiring layers 207 is connected to the touch screen terminal portion 208 by lead-out wiring layers C(1) to C(n). The touch screen terminal portion 208 is provided on an end portion of the substrate 201.

The lead-out wiring layers R(1) to R(m) are arranged outside a detectable area, and extend to corresponding electrodes in order from a layer closer to the center of the arrangement of the touch screen terminal portions 208 so as to obtain a substantially shortest distance. The lead-out wiring layers R(1) to R(m) are arranged as densely as possible while securing mutual insulation. The same applies to the lead-out wiring layers C(1) to C(n). With such arrangement, it is possible to suppress an area of a portion outside the detectable area of the substrate 201.

A shield wiring layer 209 may be provided between a group of the lead-out wiring layers R(1) to R(m) and a group of the lead-out wiring layers C(1) to C(n). In this manner, generation of noise in one of the groups due to the influence from the other is suppressed. Further, the influence of electromagnetic noise generated from the display panel 300 (see FIG. 2) on the lead-out wiring layer can be reduced. The shield wiring layer 209 may be formed of the same material as the row direction wiring layer 206 or the column direction wiring layer 207 at the same time.

The insulating layer 205 is provided on the substrate 201 so that the touch screen terminal portion 208 is exposed, and covers the row direction wiring layer 206, the column direction wiring layer 207, and the interlayer insulating layer 204. The insulating layer 205 can be formed of the same material as the interlayer insulating layer 204. In a case where the display panel 300 is a liquid crystal panel, an upper polarizing plate subjected to anti-glare treatment for the liquid crystal panel may be attached onto a portion through which light for display is transmitted of the insulating layer 205.

Figure 10:
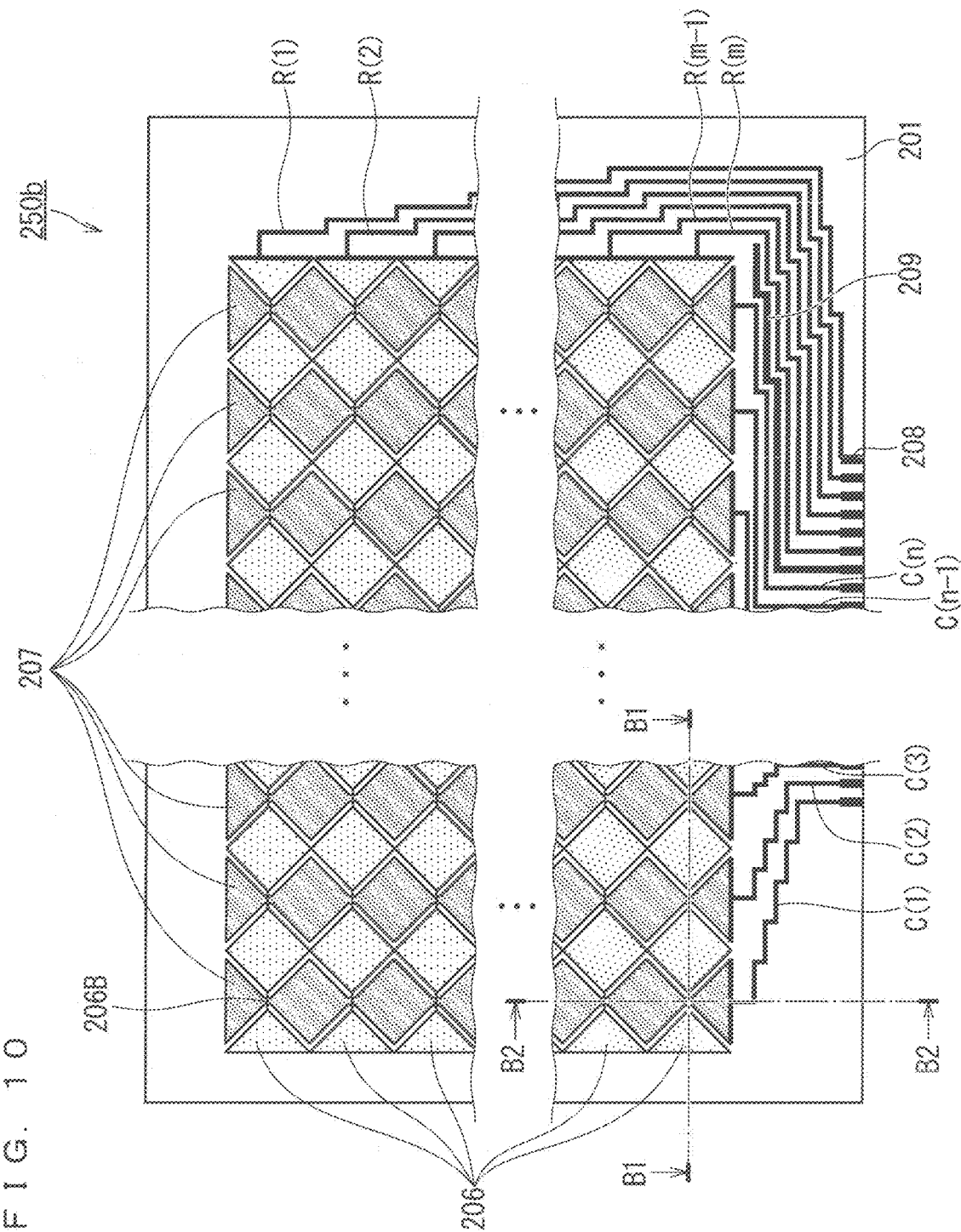
FIG. 10 is a plan view illustrating an example of the touch screen in FIG. 2.

FIG. 10 is a plan view illustrating a touch screen 250b of a capacitive sensing system as an example of the touch screen 250 (see FIG. 2). FIG. 11 is a partial cross-sectional view taken along line B1-B1 and line B2-B2 in FIG. 10. In the example of FIGS. 10 and 11, what is called a diamond structure is employed.

The row direction wiring layer 206 and the column direction wiring layer 207 are arranged on the same layer. Each of the column direction wiring layers 207 has a plurality of diamond-shaped electrodes connected to each other as the detection electrode 203. The row direction wiring layer 206 includes, as the excitation electrode 202, a plurality of diamond-shaped electrodes separated from each other, and a bridge 206B electrically connecting adjacent diamond-shaped electrodes. The interlayer insulating layer 204 is arranged so as to insulate the bridge 206B from the column direction wiring layer 207. Note that a bridge structure may be applied not to the row direction wiring layer but to the column direction wiring layer. Since electrical resistance of the wiring layer tends to become high as a bridge is formed, the bridge structure is preferably applied to a shorter one of the column direction wiring layer and the row direction wiring layer.

As a material of the row direction wiring layer 206 and the column direction wiring layer 207, for example, a transparent conductive film such as indium tin oxide (ITO) is used. Since ITO has translucency, the wiring layer is less likely to be visually recognized by the user. Since a transparent conductive film such as ITO has a relatively high electric resistance, the transparent conductive film is suitable for application to a small touch screen in which wiring resistance is not a problem. Further, since a transparent conductive film such as ITO is likely to have a wiring disconnected due to corrosion with another metal wiring, consideration for moisture resistance and waterproofness is required in order to prevent corrosion.

Note that, although the case where the structure of the touch screen and the structure of the display panel are independent is described above, they may be inseparably integrated. For example, in the case of what is called an on-cell touch panel, a touch screen is directly formed on a substrate (typically, a color filter substrate) of the display panel 300 without using the substrate 201. In a case of what is called an in-cell touch panel, a touch screen is formed between two transparent insulating substrates (not illustrated) included in the display panel 300.

Figure 13:
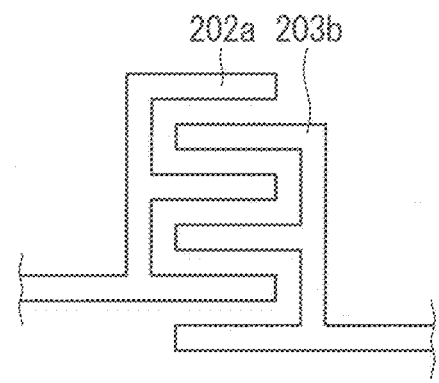
FIG. 13 is a plan view schematically illustrating an example of shapes of a detection electrode and an excitation electrode of the touch panel having a segment structure according to the first embodiment.
Figure 14:
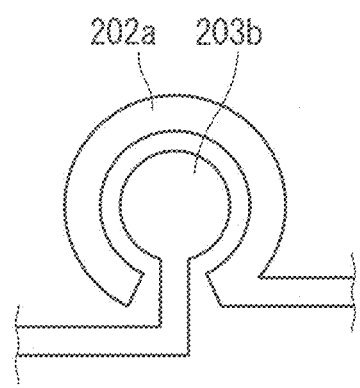
FIG. 14 is a plan view schematically illustrating an example of shapes of a detection electrode and an excitation electrode of the touch panel having a segment structure according to the first embodiment.

Further, in the above touch screen, the detection structure including the row direction wiring layer 206 and the column direction wiring layer 207 has been described. However, the present invention is not limited to this structure. For example, FIG. 12 is a plan view schematically illustrating a configuration of a touch screen 250c having a detection structure in which segments each including a detection electrode and an excitation electrode are arranged in a matrix. FIGS. 13 and 14 illustrate an example of pattern shapes of an excitation electrode 202a and a detection electrode 203b arranged in a segment of an area A in FIG. 12. The touch screen 250c having a segment structure in which segments each including a set of the excitation electrode 202a and the detection electrode 203b as illustrated in FIGS. 13 and 14 are arranged in a matrix and individually driven is used. Both a tactile presentation panel 100a and the touch panel 200 can also be used by switching switches in a drive circuit.

<Pressure Sensitive Sensor>

The pressure sensitive sensor 216 illustrated in FIG. 1 will be described. In general, the pressure sensitive sensor 216 includes a system of detecting a pressure applied to a diaphragm (barrier membrane) made from semiconductor silicon (Si) as deformation of a film, an electrostatic capacitance system of detecting deformation of a display panel, a touch panel, or the like generated according to a pressing force by a change in electrostatic capacitance, a resistance system of detecting a resistance change of a metal wire due to strain according to a pressing force, and the like.

In the case of the electrostatic capacitance system, for example, the pressure sensitive sensors 216 are installed at four symmetrical positions on a diagonal line on a surface opposite to a display surface of the display panel 300. In this case, when an operation surface of the tactile presentation touch display 1 is pressed by the tactile presentation knob 3, the tactile presentation touch display 1 is bent in a direction opposite to the operation surface by the pressing force, or the tactile presentation touch display 1 slightly moves in a direction opposite to the operation surface. The pressure sensitive sensor 216 detects the pressing force by detecting a change in electrostatic capacitance generated as an interval between the capacitance detection electrodes arranged in the pressure sensitive sensor 216 becomes small. Each of the capacitance detection electrodes in the pressure sensitive sensor 216 is parallel to the operation surface of the tactile presentation touch display 1 and is installed at an optional interval.

Even in the case of a system other than the electrostatic capacitance system, a shape change due to a pressing force of any of members constituting the tactile presentation touch display 1 is detected so that the pressing force is detected.

Note that, in FIG. 1, the pressure sensitive sensor 216 is arranged on the lower side (the side opposite to the display surface) of the display panel 300. However, the present disclosure is not limited to this configuration. The pressure sensitive sensor 216 is preferably arranged at a position where reproducibility of a relationship between a shape change and a pressing force in the structure of the tactile presentation touch display 1 is excellent, a shape change caused by a pressing force is large, and the sensitivity of the pressure sensitive sensor 216 is most excellent. Note that, instead of the pressure sensitive sensor 216, for example, a sheet-like pressure sensor arranged in a matrix may be arranged on a back surface of the display panel 300. Further, the present invention is not limited to this, and a pressure sensor of an optimum system for detection can be arranged.

<Tactile Presentation Panel>

Figure 15:
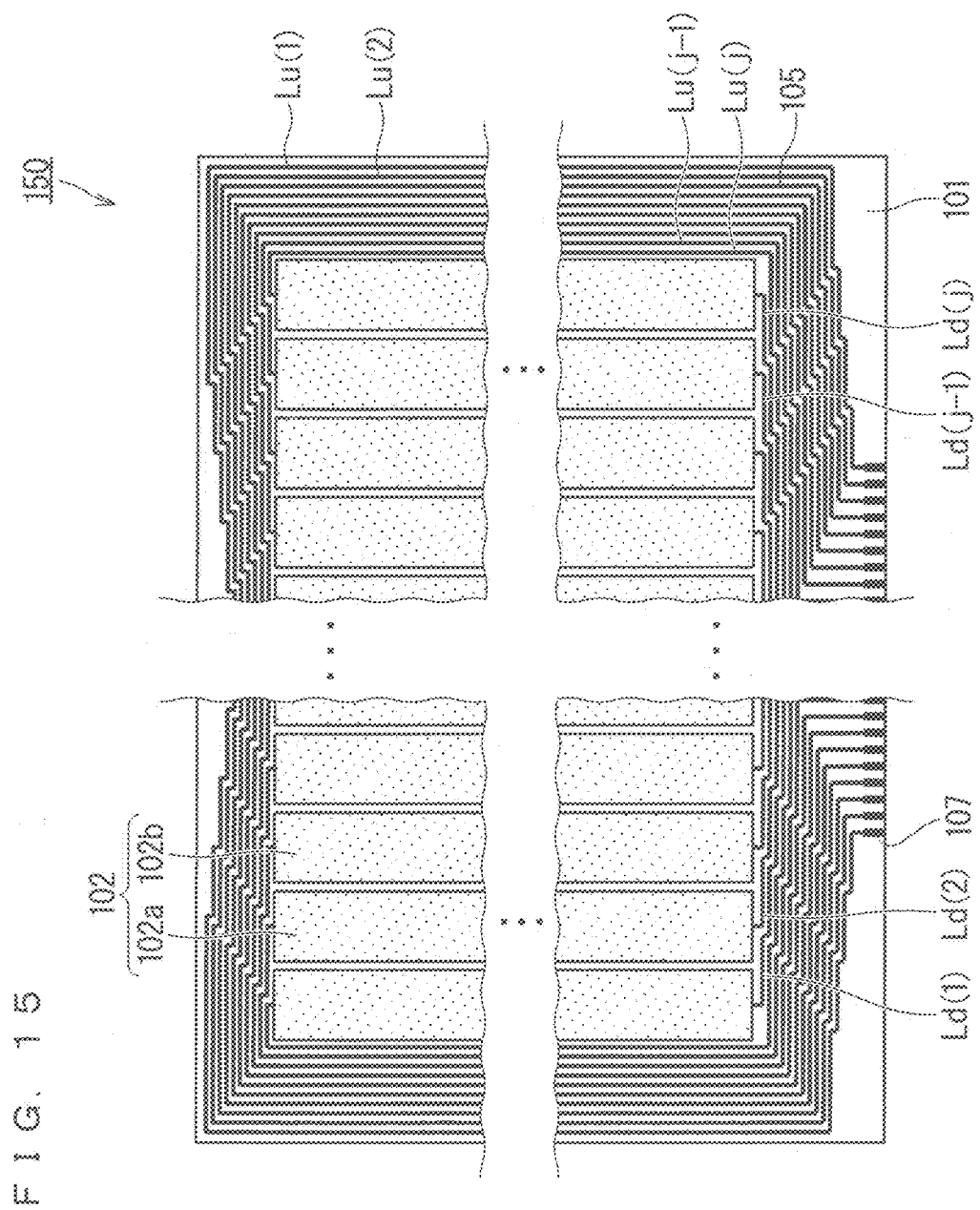
FIG. 15 is a plan view schematically illustrating a configuration of a tactile presentation screen of FIG. 2.
Figure 16:
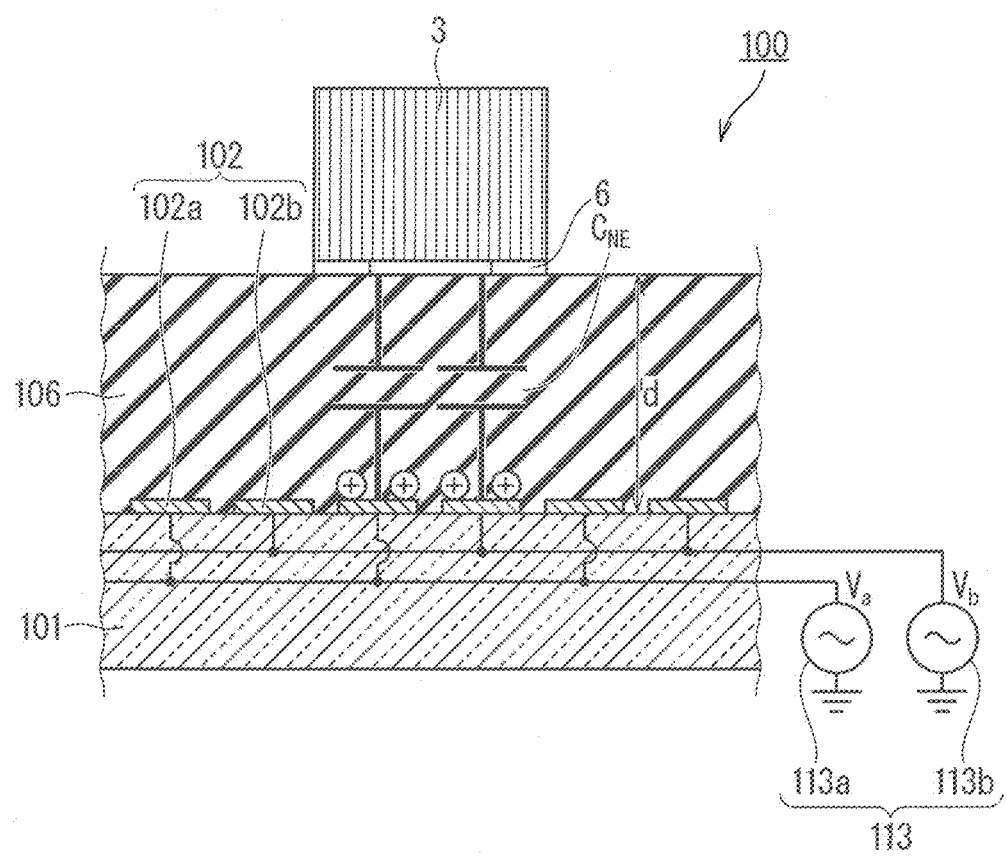
FIG. 16 is a schematic diagram for explaining electrostatic capacitance formed between the tactile electrode and an indicator included in the tactile presentation panel in FIG. 2.

FIG. 15 is a plan view schematically illustrating a configuration of the tactile presentation screen 150. FIG. 16 is a schematic diagram illustrating formation of the electrostatic capacitance $C_{NE}$ between the tactile electrode 102 and the tactile presentation knob 3.

As described above, the tactile presentation screen 150 includes the transparent insulating substrate 101, the tactile electrode 102, and the dielectric layer 106. Furthermore, a tactile presentation panel terminal portion 107 is provided in an end portion of the transparent insulating substrate 101, and a plurality of lead-out wiring layers 105 are arranged on the transparent insulating substrate 101. The dielectric layer 106 is provided such that the tactile presentation panel terminal portion 107 is exposed. The tactile electrode 102 is connected to the tactile presentation panel terminal portion 107 via the lead-out wiring layer 105. The voltage supply circuit 110 (see FIG. 2) is connected to the tactile presentation panel terminal portion 107 via the FPC 108 (see FIG. 1). Note that details of the lead-out wiring layer 105 will be described later.

Each of the tactile electrodes 102 extends along the extending direction (longitudinal direction in FIG. 15). A plurality of the tactile electrodes 102 are arranged at intervals along the arrangement direction (lateral direction in FIG. 15). In the example of FIG. 15, the transparent insulating substrate 101 has a rectangular shape having long sides and short sides. Therefore, the tactile presentation screen 150 also has long sides and short sides corresponding to the transparent insulating substrate 101. In the example of FIG. 12, the arrangement direction is along the long side. In a case where the horizontal direction of the tactile presentation screen 150 as viewed by the viewer is along the long side, the arrangement direction is along the horizontal direction.

Figure 17:
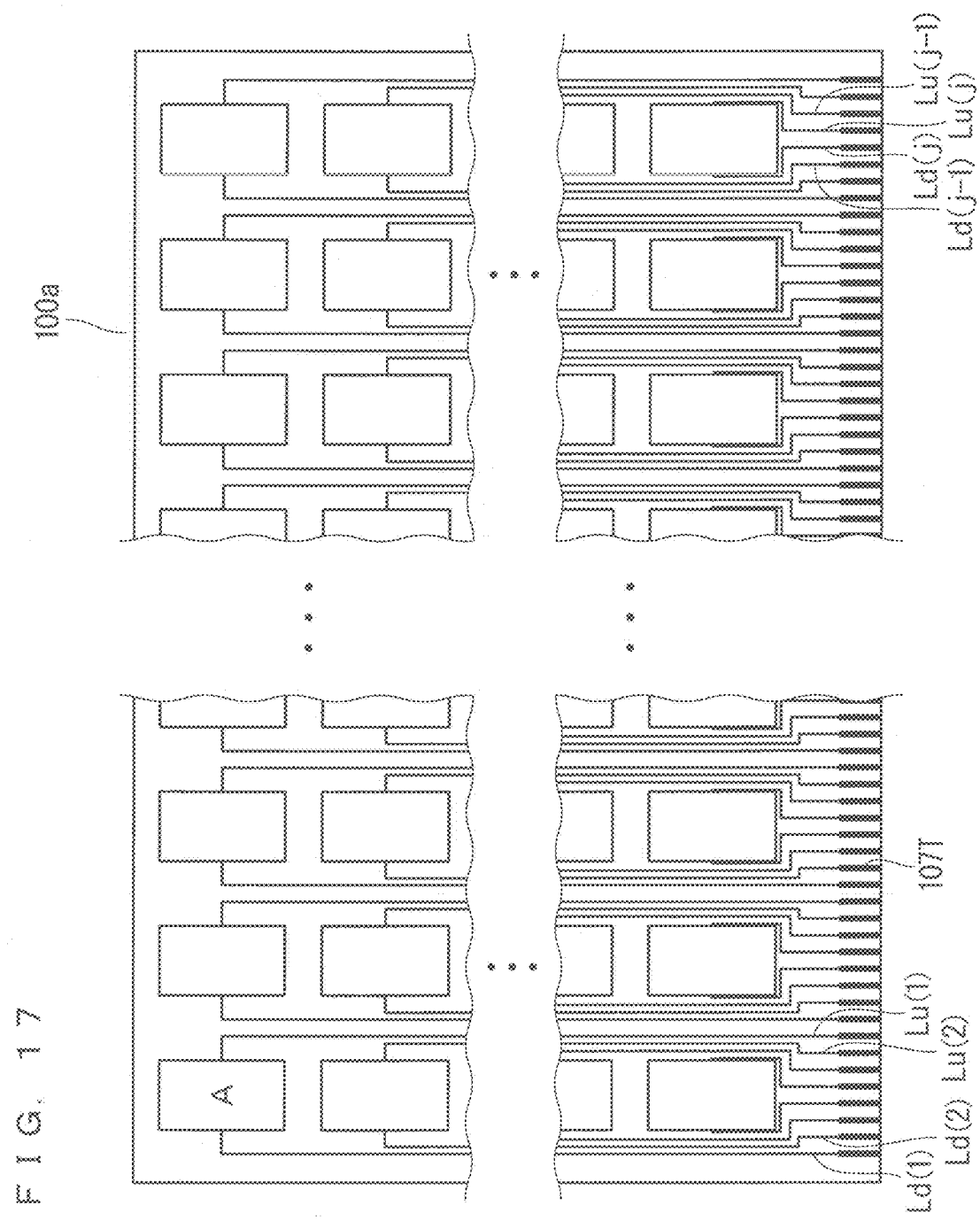
FIG. 17 is a plan view schematically illustrating a configuration of the tactile presentation panel having a segment structure according to the first embodiment.
Figure 18:
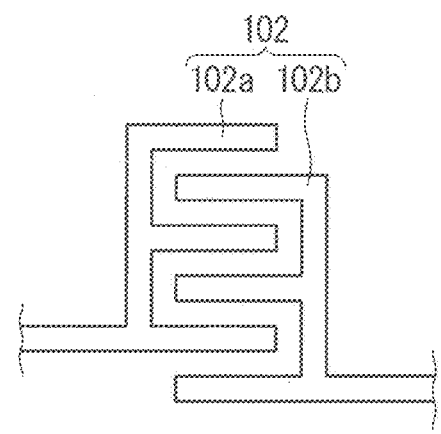
FIG. 18 is a plan view schematically illustrating an example of a shape of the tactile electrode of the tactile presentation panel having a segment structure according to the first embodiment.
Figure 19:
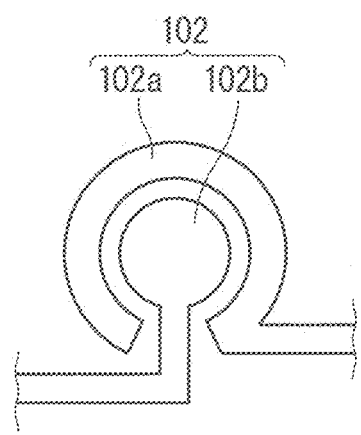
FIG. 19 is a plan view schematically illustrating an example of a shape of the tactile electrode of the tactile presentation panel having a segment structure according to the first embodiment.

Although the example in which the tactile electrodes 102 extend in the extending direction and are arranged along the arrangement direction on the tactile presentation screen 150 is described above, the structure of the tactile electrodes 102 is not limited to this. For example, the configuration may be such that a plurality of segments are arranged in a matrix like the tactile presentation panel 100*a* illustrated in FIG. 17. FIGS. 18 and 19 illustrate an example of a pattern shape of the tactile electrodes 102 arranged in a segment of an area A in FIG. 17. The shape of the tactile electrode 102 is not limited to the shape illustrated in FIGS. 18 and 19, and may be any structure in which mutual capacitance in the same area is larger than mutual capacitance between electrodes in different areas in a structure in which the first electrode 102*a* and the second electrode 102*b* are adjacent to each other. Specifically, the first electrode 102*a* and the second electrode 102*b* in the same area are preferably arranged such that a distance between the first electrode 102*a* and the second electrode 102*b* is smaller than a distance between the first electrode 102*a* and the second electrode 102*b* different areas. In this manner, the influence of capacitance formed between the detection electrode 203 of the touch panel 200 and the tactile electrode 102 on touch detection accuracy can be suppressed, so that wiring resistance of the tactile electrode 102 can be further reduced, and tactile strength can be further improved.

The larger the electrostatic capacitance $C_{NE}$ formed between the tactile electrode 102 and the tactile presentation knob 3 is, the stronger a tactile sense can be presented. From this viewpoint, it is preferable that the area of the tactile electrode 102 is large. In a case where priority is given to the size of the area of the tactile electrode 102, it is difficult to make the tactile electrode 102 less likely to be visually recognized due to imparting of a microstructure to the tactile electrode 102. In order to make the tactile electrode 102 less likely to be visually recognized while making the area of the tactile electrode 102 large, the tactile electrode 102 may be formed of a transparent conductive film. A typical material of the transparent conductive film is ITO. Since a transparent conductive film such as ITO has a relatively high electric resistance as compared with metal, the transparent conductive film is suitable for application to a small touch screen in which wiring resistance is not a problem. When application to a large touch screen where wiring resistance is a problem is necessary, the ITO film thickness is made large or the content of a dopant is increased to reduce the resistivity. In this case, since a light absorption rate of ITO may change and the touch screen may appear colored, it may be necessary to adjust the color tone of the display. Further, since a transparent conductive film such as ITO is likely to have a wiring disconnected due to corrosion with another metal wiring, consideration for moisture resistance and waterproofness is required in order to prevent corrosion in a case where wiring resistance of the electrode is lowered by a lamination structure of with other metal.

Instead of using the transparent conductive film as described above, the tactile electrode 102 may be a single layer film or a multilayer film of metal, or an electrode (hereinafter, also referred to as "metal film-containing electrode") having a multilayer structure including any of these and also using another conductive material. As the metal, for example, low resistance metal such as aluminum or silver is preferable. By using the metal film-containing electrode, wiring resistance can be reduced. In contrast, a metal film, which is opaque, is easily visually recognized. Therefore, in order to make the metal film less likely to be visually recognized, a thin wire structure may be imparted to the metal film-containing electrode. The thin wire structure is typically mesh-like.

The dielectric layer 106 includes a single-layer film of an organic insulating film, a single-layer film of an inorganic insulating film, or a multilayer film. In a case of a multilayer film, different types of organic insulating films may be laminated, or different types of inorganic insulating films may be laminated, or an organic insulating film and an inorganic insulating film may be laminated. The inorganic insulating film has high moisture impermeability, high hardness, and high abrasion resistance. Since the tactile presentation knob 3 rotates on the dielectric layer 106, the dielectric layer 106 requires high abrasion resistance. The organic insulating film is preferable for obtaining high flatness, but has low hardness and low abrasion resistance. For this reason, in order to obtain both high flatness and high abrasion resistance, it is preferable to form the inorganic insulating film on the organic insulating film. As the inorganic insulating film, for example, a transparent silicon-based inorganic insulating film such as a silicon oxide film, a silicon nitride film, or a silicon oxynitride film, or a transparent inorganic insulating film composed of a metal oxide such as alumina is used. As a material of the organic insulating film, a polymer material having a main chain composed of a silicon oxide, a silicon nitride film, or a silicon oxynitride film and having an organic substance bonded to a side chain or a functional group of the main chain, or thermosetting resin having a main chain composed of carbon can be used. Examples of the thermosetting resin include acrylic resin, polyimide resin, epoxy resin, novolak resin, and olefin resin.

The electrostatic capacitance $C_{NE}$ is represented by Equation (1) below.

$$C_{NE}=Q/V=\varepsilon S/d \quad (1)$$

Here, Q is a charge amount stored in each of a conductive elastic portion 6 and the tactile electrode 102, V is a voltage between the tactile presentation knob 3 and the tactile electrode 102, ε is a dielectric constant of the dielectric layer 106, S is a contact area between the conductive elastic portion 6 and the tactile electrode 102 via the dielectric layer 106, and d is a thickness of the dielectric layer 106. The electrostatic capacitance $C_{NE}$ is proportional to the dielectric constant c and is inversely proportional to the film thickness d.

From Equation (1) above, the dielectric constant c is preferably high in order to make the electrostatic capacitance $C_{NE}$ large. Specifically, the dielectric layer 106 preferably includes a film (hereinafter, also referred to as a "high dielectric constant insulating film") having a relative dielectric constant of 10 or more. In the high dielectric constant insulating film, a state in which positive and negative charges are displaced into a material by an electric field applied from the outside occurs (this is generally referred to as dielectric polarization). In the dielectric polarization, charges (generally referred to as polarization charges) generated by polarization are maintained while voltage is held, and when the voltage decreases, the polarization charges decrease and the dielectric polarization decreases, and when the applied voltage is set to zero volt, the dielectric polarization also disappears. The direction of the dielectric polarization can be changed by an electric field. The high dielectric constant insulating film may be used as a single layer, or may be used as a multilayer film by being laminated with another inorganic insulating film or organic insulating film of a low dielectric constant, or another high dielectric constant insulating film. In general, since a refractive index is higher as a dielectric constant is higher, a lamination structure of a high refractive index film and a low refractive index film is obtained as a high dielectric constant insulating film and a low dielectric constant insulating film are laminated. With this lamination structure, the dielectric layer 106 can also function as an antireflection film.

Further, from Equation (1) above, the thickness d is preferably small in order to make the electrostatic capacitance $C_{NE}$ large. By laminating a high dielectric constant insulating film and an organic insulating film, the film thickness of the organic insulating film can be reduced while sufficient insulation is secured. In this manner, the thickness d of the dielectric layer 106 can be reduced.

Assuming that the tactile electrode has a matrix structure (that is, a structure having an X electrode and a Y electrode crossing each other) (see, for example, Japanese Patent Application Laid-Open No. 2015-097076), a step, that is, unevenness is generated at an intersection between the X electrode and the Y electrode. This unevenness is flattened if the thickness of the insulating layer covering the unevenness is large. However, the thickness of the insulating layer is limited in order to avoid an excessive decrease in the electrostatic capacitance $C_{NE}$. For this reason, unevenness may occur on a front surface of the tactile presentation screen. When the texture feeling of the unevenness is mixed with the texture feeling caused by an electrostatic force from the tactile electrode, it is difficult to give an intended texture feeling to the user. In a case where an organic insulating film having an effect of flattening a surface shape is used as the dielectric layer 106, although occurrence of the unevenness is avoided, a large thickness is required to some extent for flattening, and a decrease in the electrostatic capacitance $C_{NE}$ cannot be avoided.

In contrast, according to the first embodiment, since the tactile electrode 102 has no intersection, the size of the unevenness can be suppressed to about the thickness of the tactile electrode 102. This makes it possible to thin the organic film having a flattening effect or to apply a high dielectric constant insulating film having a low flattening effect. In this manner, the electrostatic capacitance $C_{NE}$ can be made larger than that in the case of the matrix structure. Further, since a contact surface with the tactile presentation knob 3 of the tactile presentation screen 150 has less unevenness, a tactile sense caused by unevenness of a surface of the tactile presentation screen 150 is not given to the tactile presentation knob 3 when a voltage signal is not applied. For this reason, a tactile sense of the tactile presentation knob 3 when a voltage signal is applied becomes clearer.

Further, even if the electrostatic capacitance $C_{NE}$ is the same, if the tactile presentation knob 3 is slippery on the dielectric layer 106, a change in an electrostatic force between the tactile presentation knob 3 and the tactile electrode 102 is easily perceived by the user as a change in a frictional force. In this manner, a larger tactile sense can be given to the user. In order to make the tactile presentation knob 3 slippery on the dielectric layer 106, it is necessary to suppress adhesion between the dielectric layer 106 and the tactile presentation knob 3. For this purpose, for example, a film having higher water repellency than the inside of the dielectric layer 106 may be provided on an outermost surface of the dielectric layer 106, on a contact surface with the dielectric layer 106 of the conductive elastic portion 6, or both.

<Electrode Pitch>

Figure 20:
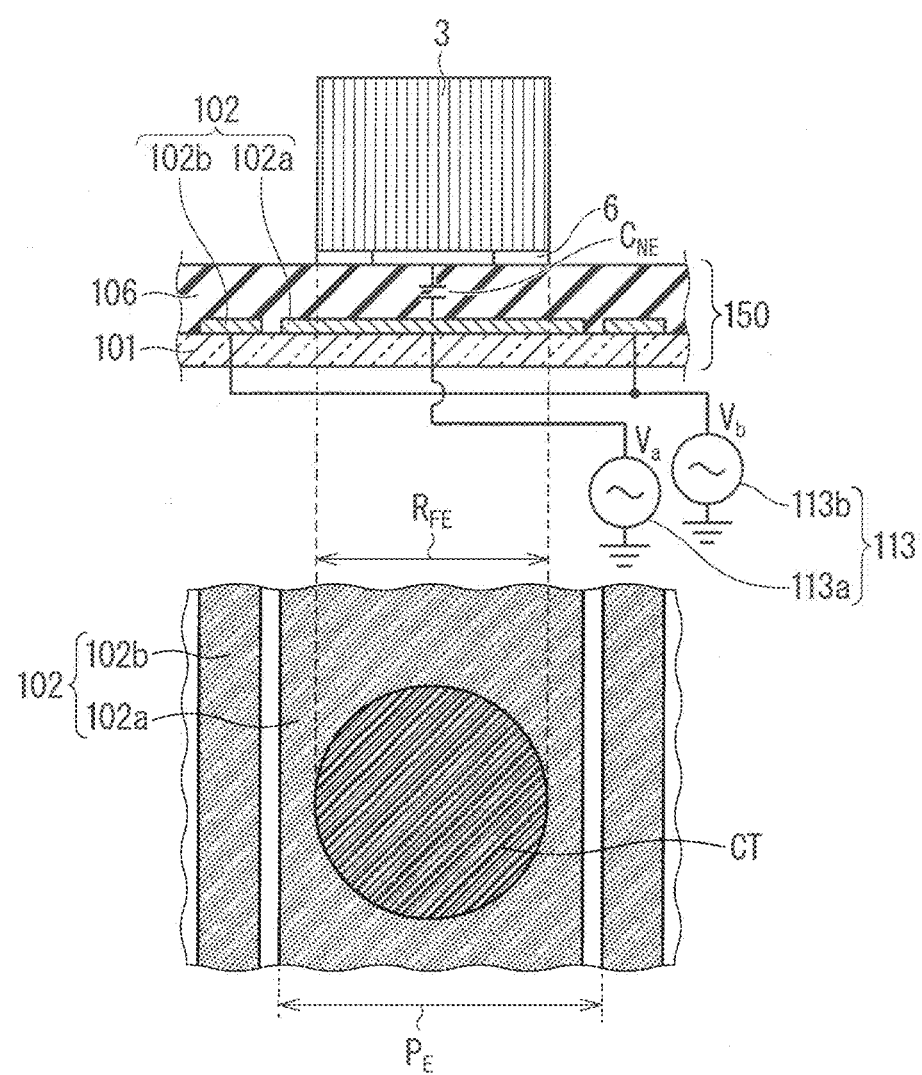
FIG. 20 is a schematic diagram for explaining electrostatic capacitance formed between the tactile electrode and the tactile presentation knob in a case where a pitch of the tactile electrode included in the tactile presentation panel in FIG. 2 is larger than a diameter of the tactile presentation knob.

FIG. 20 is a schematic diagram for explaining the electrostatic capacitance $C_{NE}$ formed between the tactile electrode 102 and the tactile presentation knob 3 in a case where the pitch $P_E$ of the tactile electrode 102 is larger than a diameter $R_{FE}$ of the tactile presentation knob 3. FIG. 21 is a schematic diagram for explaining the electrostatic capacitance $C_{NE}$ formed between the tactile electrode 102 and the tactile presentation knob 3 in a case where the pitch $P_E$ of the tactile electrode 102 is smaller than the diameter $R_{FE}$.

Figure 22:
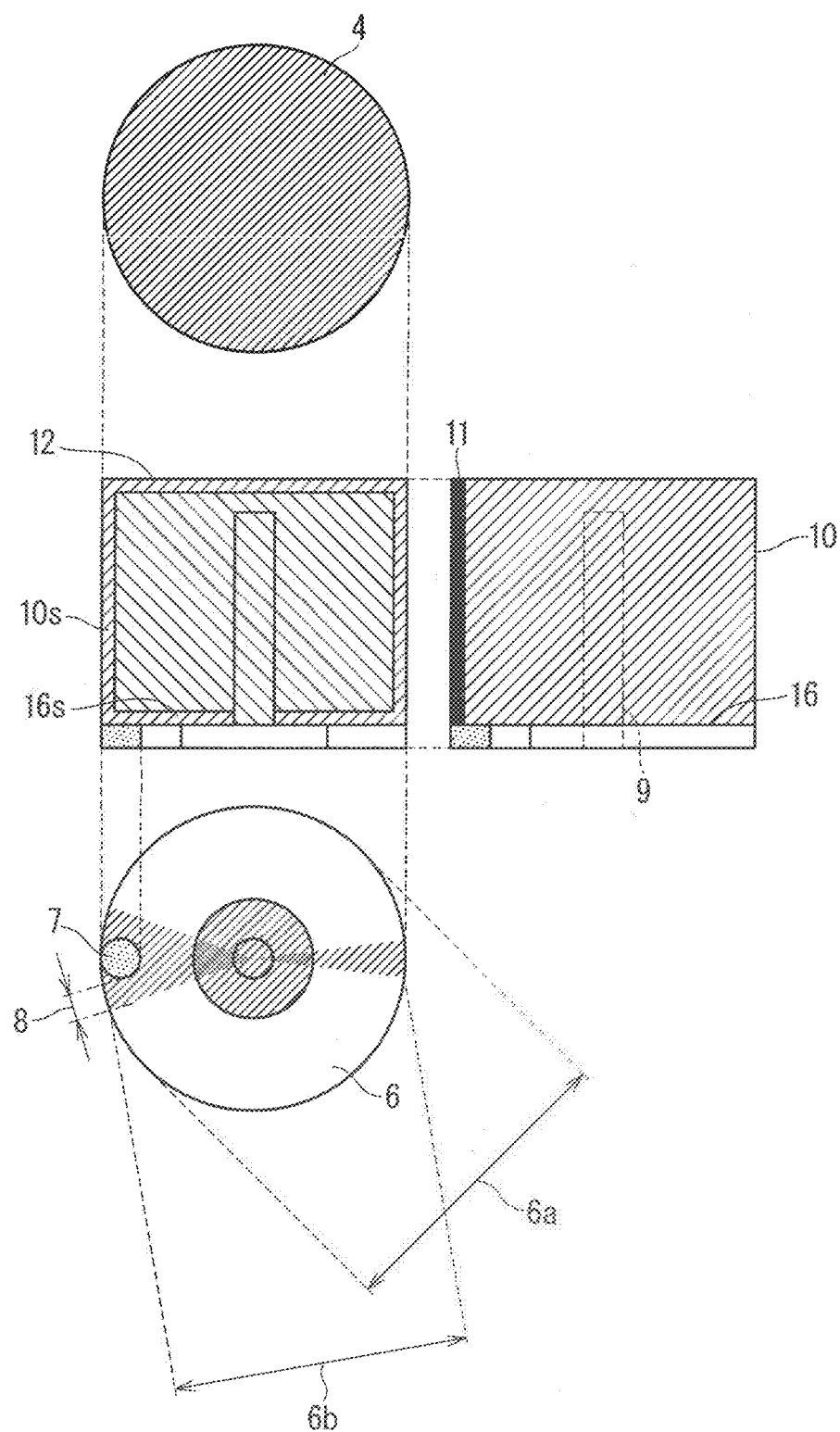
FIG. 22 is a schematic view illustrating a configuration of a rotation portion of the tactile presentation knob according to the first embodiment.

In the first embodiment, as described above, an electrostatic force corresponding to the amplitude modulation signal $V_N$ (see FIG. 7) is generated by applying the voltage signal $V_a$ (see FIG. 5) and the voltage signal $V_b$ (see FIG. 6) having different frequencies to the first electrode 102a and the second electrode 102b adjacent to each other. In this manner, a frictional force between the dielectric layer 106 and the tactile presentation knob 3 changes in accordance with a beat frequency of the amplitude modulation signal $V_N$, and the user perceives this change as a tactile sense. In the state illustrated in FIG. 20, only the voltage signal $V_a$ acts on the tactile presentation knob 3, and the voltage signal $V_b$ does not act on the tactile presentation knob 3. Therefore, the amplitude modulation signal $V_N$ is not generated, and no tactile sense is generated. In contrast, in a case where the tactile presentation knob 3 is located above the boundary between the first electrode 102a and the second electrode 102b, a tactile sense is generated. Therefore, in the configuration of FIG. 20, depending on the position of the tactile presentation knob 3, there are a position where a tactile sense is generated and a position where no tactile sense is generated. In contrast, in the state illustrated in FIG. 21, both the voltage signal $V_a$ and the voltage signal $V_b$ act on the tactile presentation knob 3 regardless of the position of the tactile presentation knob 3. In this manner, the amplitude modulation signal $V_N$ is generated. Therefore, in the configuration of FIG. 21, a tactile sense can be felt regardless of the position of the tactile presentation knob 3, and the position of the tactile presentation knob 3 can be optionally set. That is, in order that the tactile presentation knob 3 is likely to be positioned so as to be across the first electrode 102a and the second electrode 102b, in a case where the conductive elastic portion 6 is divided, for example, as illustrated in FIG. 22 to be described later, a width 6b of the conductive elastic portion 6 is preferably larger than the pitch $P_E$ of the tactile electrodes 102. Further, in a case where the conductive elastic portion 6 is not divided into a plurality of portions, an outer diameter 6a of the conductive elastic portion 6 is preferably larger than the pitch $P_E$ of the tactile electrodes 102.

<Structure of Tactile Presentation Knob>

Figure 23:
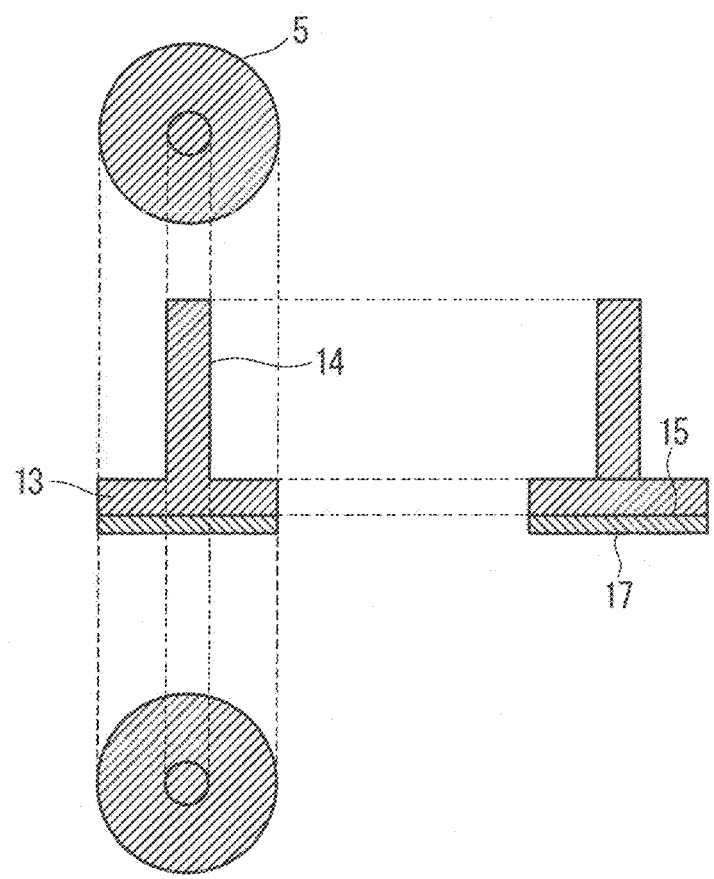
FIG. 23 is a schematic view illustrating a configuration of a fixing portion in a case where a position where the tactile presentation knob according to the first embodiment is placed is fixed at one place.
Figure 24:
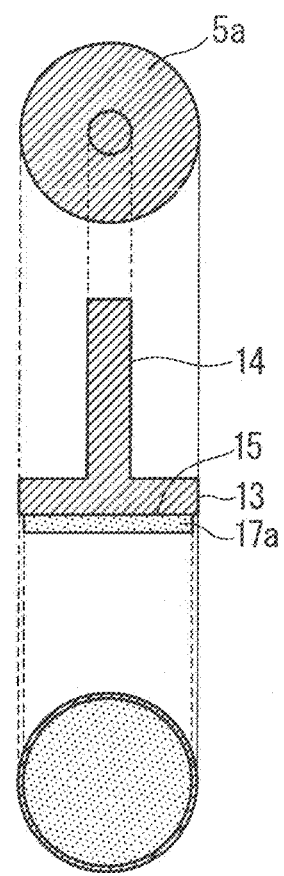
FIG. 24 is a schematic view illustrating a configuration of a rotation shaft structure in a case where a position where the tactile presentation knob according to the first embodiment is placed moves.

FIG. 22 is a schematic diagram illustrating a structure of a rotation portion 4 of the tactile presentation knob 3. FIG. 23 is a schematic diagram of a fixing portion 5 when the rotation portion 4 is placed on a contact surface of the tactile presentation panel 100 and rotated in a case where the position where the tactile presentation knob 3 is placed is fixed at one position. FIG. 24 is a schematic diagram of a rotation shaft portion 5a that suppresses horizontal movement when the rotation portion 4 of the tactile presentation knob 3 is placed on the contact surface of the tactile presentation panel 100 and rotated. The rotation portion 4 and the fixing portion 5 (rotation shaft portion 5a) are both made from metal such as aluminum, SUS, or copper, and resin such as polyvinyl chloride, polystyrene, ABS resin, AS resin, acrylic resin, polyethylene, polypropylene, polyvinyl alcohol, polyvinylidene chloride, polyethylene terephthalate, polycarbonate, modified polyphenylene ether, polyamide, polybutylene terephthalate, polyacetal, ultrahigh molecular weight polyethylene, polyarylate, polysulfone, polyethersulfone, polyamideimide, polyetherimide, thermoplastic polyimide, polyphenylene sulfide, liquid crystalline polymer, polyetheretherketone, or fluororesin. Since an operation feeling and a tactile sense change depending on the weight of the tactile presentation knob 3, the material is selected according to the user's preference, a use environment of the tactile presentation knob 3, the purpose of use, and the like. Since a rotation portion side surface 10 needs to be electrically connected to the conductive elastic portion 6 and an indicator 2 (see FIG. 31), a surface portion 10s in contact with the indicator 2 of the rotation portion side surface 10 and a boundary portion conductive portion 16s are made from metal or a conductive resin material (resistance is desirably $10^3 \Omega$ or less). A resistance value of the surface portion 10s and the boundary portion conductive portion 16s are desirably set to such a value by which, in an RC circuit formed between the wiring resistance of the tactile electrode 102, the resistance of the conductive elastic portion 6, and the dielectric layer 106, capacitance C formed between the tactile electrode 102 and the conductive elastic portion 6 become largest.

The shape of a shaft portion 14 and the shape of a hole portion of a fixing hole 9 are the same cylindrical shape. The tactile presentation knob 3 is formed by inserting the shaft portion 14 of the fixing portion 5 (rotation shaft portion 5a) into the fixing hole 9 of the rotation portion and integrating them. For example, as illustrated in FIGS. 22 and 23, the rotation portion 4 and the shaft portion 14 having unevenness may be prevented from being separated by fitting the shaft portion 14 into the fixing hole 9. A gap between the shaft portion 14 and the fixing hole 9 is desirably as narrow as possible within a range in which the rotation portion 4 smoothly turns. When the gap between the shaft portion 14 and the fixing hole 9 is narrow, a fluctuation of a rotation shaft when the tactile presentation knob 3 is rotated becomes small, and a tactile sense different from a tactile sense originally supposed to be given to the tactile presentation knob 3, such as a shake and vibration of the rotation portion 4 caused by the fluctuation of the rotation shaft, given to the indicator 2 is suppressed, and a tactile sense imparted to the user becomes clearer. In order for the rotation portion 4 to rotate smoothly, a surface of the shaft portion 14 and a surface of an inner surface portion of the fixing hole 9 desirably have as less unevenness as possible, and surface roughness Ra is desirably 0.5 μm or less. An inner diameter tolerance of the fixing hole 9 is desirably 0 to +0.5 mm, and an outer diameter tolerance of the shaft portion 14 is desirably −0.0005 mm.

The fixing portion 5 (rotation shaft portion 5a) serves as a rotation shaft when rotation portion 4 rotates, and serves to keep an operation surface of the tactile presentation panel 100 and a rotation shaft of the rotation portion 4 perpendicular to each other. For this reason, the center of the shaft portion 14 of the fixing portion 5 (rotation shaft portion 5a) is orthogonal to a bottom surface portion 15 and an adhesive portion 17 (shaft structure holding portion 17a), a bottom surface of the adhesive portion 17 (shaft structure holding portion 17a) is flat, and a contact surface of the conductive elastic portion 6 with the tactile presentation panel 100 and the adhesive portion 17 (shaft structure holding portion 17a) are located on the same plane. Note that, although FIG. 23 illustrates the case where the diameter of the adhesive portion 17 and the diameter of a fixing table 13 are the same, the diameter of the shaft structure holding portion 17a and the diameter of the fixing table 13 may be different as illustrated in FIG. 24.

The surface portion 10s and the boundary portion conductive portion 16s on the rotation portion side surface 10 of the rotation portion 4 with which the indicator 2 is in contact when the rotation portion 4 is rotated are composed of a conductive material, and are also electrically connected to the conductive elastic portion 6 and a position detection unit 7. Whether or not the user is in contact with a surface of the rotation portion 4 is detected, and accumulation of electric charges in the conductive elastic portion 6 is suppressed. The surface portion 10s and the boundary portion conductive portion 16s are composed of the same material as the conductive elastic portion 6. In particular, it is desirable to use metal having low resistance, and the surface portion 10s and the boundary portion conductive portion 16s may be formed by forming the rotation portion 4 with resin or the like and then performing coating with metal plating or the like. Details will be described later.

The conductive elastic portion 6 is a conductor that forms electrostatic capacitance with the tactile electrode 102. The conductive elastic portion 6 is divided into two or more portions, and prevents a decrease in tactile strength. Details of this effect will be described later. Since the conductive elastic portion 6 has elasticity, there is an effect of suppressing a decrease in tactile strength due to a decrease in adhesion. When the adhesion between the conductive elastic portion 6 and a surface of the tactile presentation panel decreases due to a decrease in flatness of a surface of the tactile presentation panel 100 or minute unevenness on a surface of the tactile presentation panel 100, or the like caused by processing accuracy of the rotation portion 4 or the fixing portion 5 (rotation shaft portion 5a) or assembly accuracy of the tactile presentation screen 150, the tactile electrode 102 and the conductive elastic portion 6 form electrostatic capacitance not only via the dielectric layer 106 but also via air having a small dielectric constant, and the electrostatic capacitance formed between the tactile electrode 102 and the conductive elastic portion 6 decreases, resulting in a decrease in tactile strength. Since the conductive elastic portion 6 has elasticity, it is possible to fill a gap between the dielectric layer 106 and the conductive elastic portion 6 due to unevenness of the surface of the tactile presentation panel 100, and to prevent a decrease in tactile strength due to a decrease in adhesion between the conductive elastic portion 6 and the tactile presentation panel 100. A material used for the conductive elastic portion 6 is preferably an elastic resin material called conductive rubber obtained by mixing a conductive substance such as conductive carbon black or metal powder with CNR, CR rubber, NBR rubber, silicon, fluoro rubber, EPT rubber, SBR, butyl rubber, acrylic rubber, or CSM rubber as a base material. Volume resistivity only needs to be $10^6$ Ωcm or less, and as the volume resistivity is lower, electric charges are less likely to accumulate in the conductive elastic portion 6. Details of charge accumulation in the conductive elastic portion 6 will be described later. Further, since electrostatic capacitance is formed with the tactile electrode 102, a withstand voltage characteristic is desirably as high as possible because the life and reliability of the conductive elastic portion 6 are improved. The position detection unit 7 forms electrostatic capacitance with the detection electrode 203 of the touch screen 250, and is used to detect a position and a rotation amount of the tactile presentation knob 3.

A material that forms the position detection unit 7 is a conductor capable of forming electrostatic capacitance with the detection electrode 203, has elasticity similarly to the conductive elastic portion 6, and may be the same material as the conductive elastic portion 6. The better the adhesion with the tactile presentation panel 100, the less a difference between a design value and an actual capacitance value is likely to occur, and stable position detection accuracy can be obtained.

When the conductive elastic portion 6 and the position detection unit 7 have the same thickness so as to be in close contact with a surface of the tactile presentation panel 100 without forming a gap between them, high tactile strength and highly accurate position detection can be obtained. A flatness (a difference between a maximum value and a minimum value of measured values obtained by measuring a distance from a reference surface) of a surface where the conductive elastic portion 6 and the position detection unit 7 are in contact with the tactile presentation panel 100 is desirably 0.5 mm or less. Further, since a diameter of a contact area of a finger of a person with respect to a touch surface when a touch panel is operated said to be about 3 mm for a child and about 7 to 10 mm at the maximum for an adult, and a contact area of a finger in various touch operations is generally said to be 20 to 400 mm², an area of the position detection unit 7 may be considered to be within a range of 7 mm² or more and 400 mm² or less.

<Detection of Knob Position and Rotation Amount>

Figure 25:
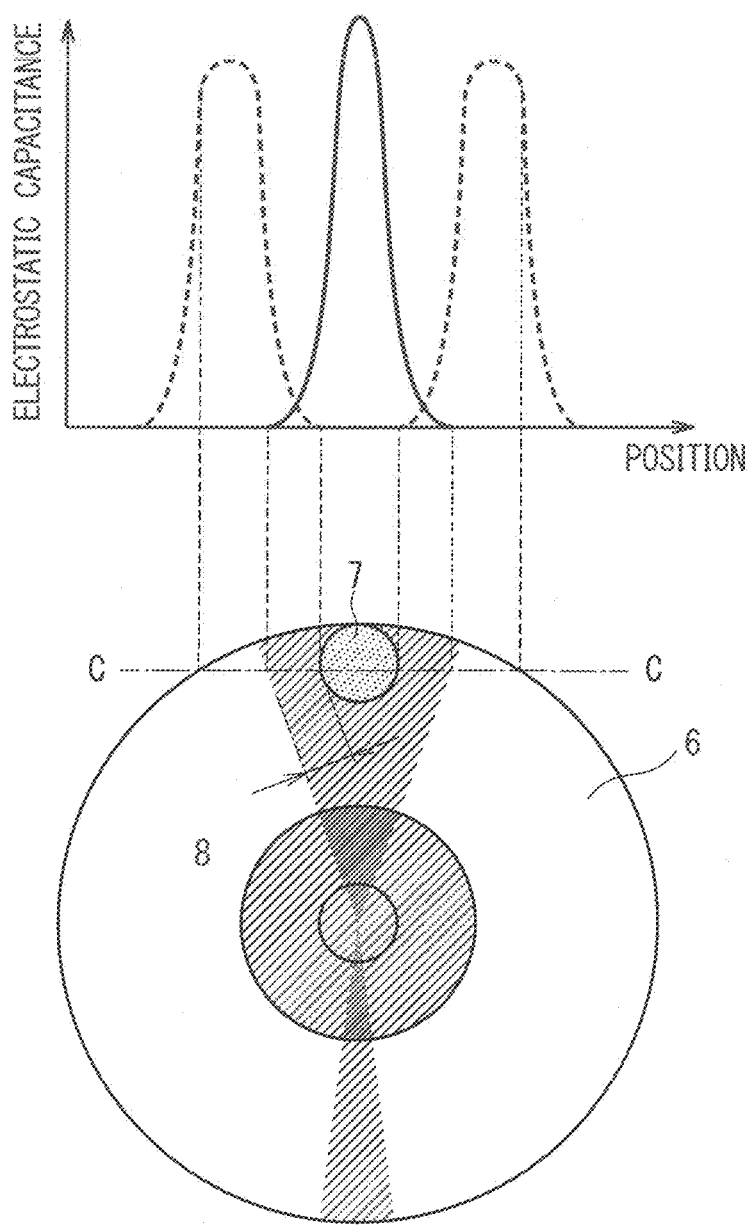
FIG. 25 is a schematic diagram for explaining a capacitance profile of line C-C when the touch screen according to the first embodiment detects the position of the tactile presentation knob.

FIG. 25 is a schematic diagram illustrating a capacitance profile of line C-C when the touch panel 200 performs detection at the time of position detection of the tactile presentation knob 3. Generation of a tactile sense on the tactile presentation knob 3 and the position detection of the tactile presentation knob 3 are performed by time division. During a period in which a voltage signal is applied to the tactile electrode 102, the detection electrode 203 and the excitation electrode 202 apply an optional voltage so as not to cause a voltage drop on the tactile electrode 102 by forming electrostatic capacitance with the tactile electrode 102, or 0 V. When the detection electrode 203 performs position detection, the tactile electrode 102 is placed in a floating state. Then, a change amount in electrostatic capacitance between the excitation electrode 202 and the detection electrode 203 of when the conductive elastic portion 6 and the detection electrode 203 form electrostatic capacitance via the tactile electrode 102 is detected, so that the position of the tactile presentation knob 3 is detected.

The detection electrode 203 forms electrostatic capacitance with both the position detection unit 7 and the conductive elastic portion 6 to detect the electrostatic capacitance. At this time, since there is a gap 8, an electrostatic capacitance profile with the position detection unit 7 and an electrostatic capacitance profile with the conductive elastic portion 6 have peaks at different positions, and these positions are distinguished from each other.

For a rotation amount of the tactile presentation knob 3, in a case where the number of the position detection units 7 is one, the rotation amount is calculated as movement only in a rotation direction from a movement amount from an initial position of the position detection unit 7. The number of the position detection units 7 is not necessarily one. When a plurality of the position detection units 7 are provided as illustrated in FIG. 26, a rotation amount θ can be calculated from a direction vector P1–P2 between the position detection units 7 at an initial position (P1, P2) and a direction vector P1'–P2' at a position (P1', P2') after movement.

Figure 26:
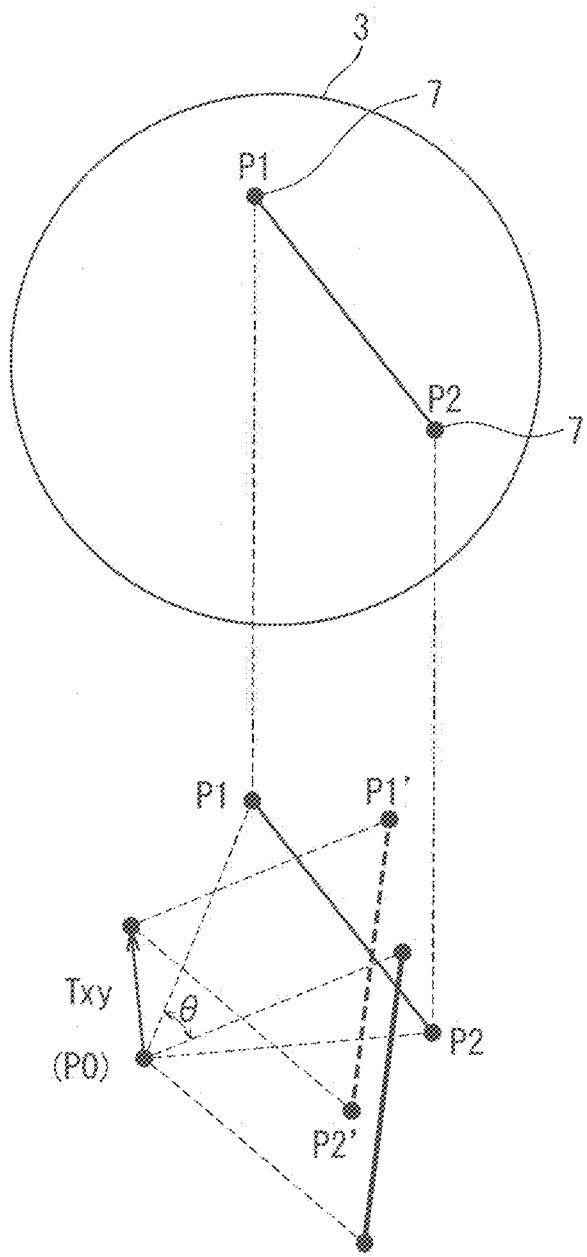
FIG. 26 is a diagram for explaining calculation of a rotation amount in a case where there are a plurality of position detection units according to the first embodiment.

In FIG. 26, when a rotation center is P0, a translational movement amount is Txy, a coordinate transformation matrix of the rotation angle θ is R, and an identity matrix is I, P1'–P2' is expressed by Equation (4) from Equations (2) and (3) below.

$$P1'=R \cdot P1-(R-1) \cdot P0+Txy \tag{2}$$

$$P2'=R \cdot P2-(R-I) \cdot P0+Txy \tag{3}$$

$$P1'-P2'=R \cdot (P1-P2) \tag{4}$$

Note that, in a case where the coordinate transformation matrix R is equal to the identity matrix I (R=I), translational operation is performed, and Txy is expressed by Equation (5) below.

$$Txy=P1'-P1 \tag{5}$$

When an operation range of the tactile presentation knob 3 is set to exceed 360 degrees, a rotation angle from the initial position can be calculated by performing addition/subtraction correction of 360 degrees×n (n is an integer) with reference to a rotation angle and a rotation angle change direction of the position detection unit 7. Although the measurement accuracy of a rotation angle is improved as the number of pairs of the position detection units 7 used for calculation is larger, the area of the conductive elastic portion 6 is reduced, and thus the number of the position detection units 7 is determined based on the balance between the tactile strength and the measurement accuracy of a rotation angle. An indication position line 11 (see FIG. 22) indicating an indication position of the tactile presentation knob 3 may be arranged on the rotation portion 4 to visualize a knob position. In a case where the indication position line 11 is arranged, the position detection unit 7 is arranged immediately below the indication position line 11, which simplifies calculation processing.

<Inter-Electrode Distance>

Figure 27:
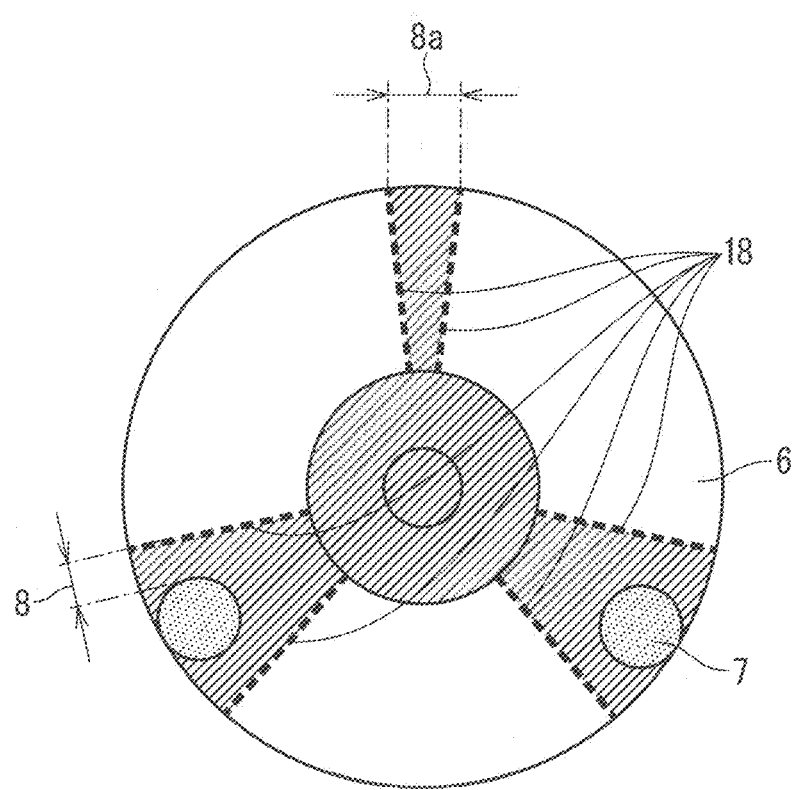
FIG. 27 is a schematic view illustrating a configuration of an edge portion of a conductive elastic portion according to the first embodiment.

FIG. 27 illustrates an example of a positional relationship between the conductive elastic portion 6 and the position detection unit 7 in the tactile presentation knob 3. A distance between the conductive elastic portion 6 and the position detection unit 7 in a case where the position detection unit 7 is arranged between the conductive elastic portions 6 adjacent to each other is indicated by the gap 8, and a distance between the conductive elastic portions 6 in a case where the position detection unit 7 is not arranged between the conductive elastic portions 6 adjacent to each other is indicated by a gap 8a. In a case where unevenness caused by thickness of the electrode is present on a surface of the tactile presentation panel 100, when the conductive elastic portion 6 slides while being in contact with the tactile electrode 102 via the dielectric layer 106, the tactile presentation knob 3 vibrates due to the unevenness on the surface. This vibration is sensed by the indicator 2 independently of a voltage signal applied to the tactile electrode 102. As a result, the indicator 2 may be less likely to feel a tactile sense obtained by the voltage signal. In other words, the tactile strength may be decreased.

Even if there is unevenness on the surface of the tactile presentation panel 100, whether or not the indicator 2 can easily feel the unevenness depends on an inter-electrode interval of the tactile electrodes 102 as described later. As larger unevenness is allowed, the need for increasing the thickness of the dielectric layer 106 to alleviate the unevenness is lowered. That is, it is allowed to reduce the thickness of the dielectric layer 106. This makes it possible to increase the capacitance formed between the conductive elastic portion 6 and the tactile electrode 102. Therefore, a stronger tactile sense can be generated. Further, if an inter-electrode distance of the tactile electrode 102 is wider than the gap 8 between the conductive elastic portion 6 and the position detection unit 7, an edge portion 18 (see FIG. 27) of the conductive elastic portion 6 is caught by the unevenness on the surface caused by the inter-electrode distance of the tactile electrode 102, and an unintended tactile sense occurs in the tactile presentation knob 3. Therefore, the inter-electrode distance of the tactile electrode 102 is desirably narrower than the gap 8. Further, the narrower the inter-electrode distance of the tactile electrode 102 is, the larger an occupied area of the tactile electrode 102 becomes, the larger the electrostatic capacitance formed with the conductive elastic portion 6 becomes, and the larger the obtained tactile strength becomes, which is desirable.

<Detailed Configuration of Tactile Presentation Touch Panel>

Figure 28:
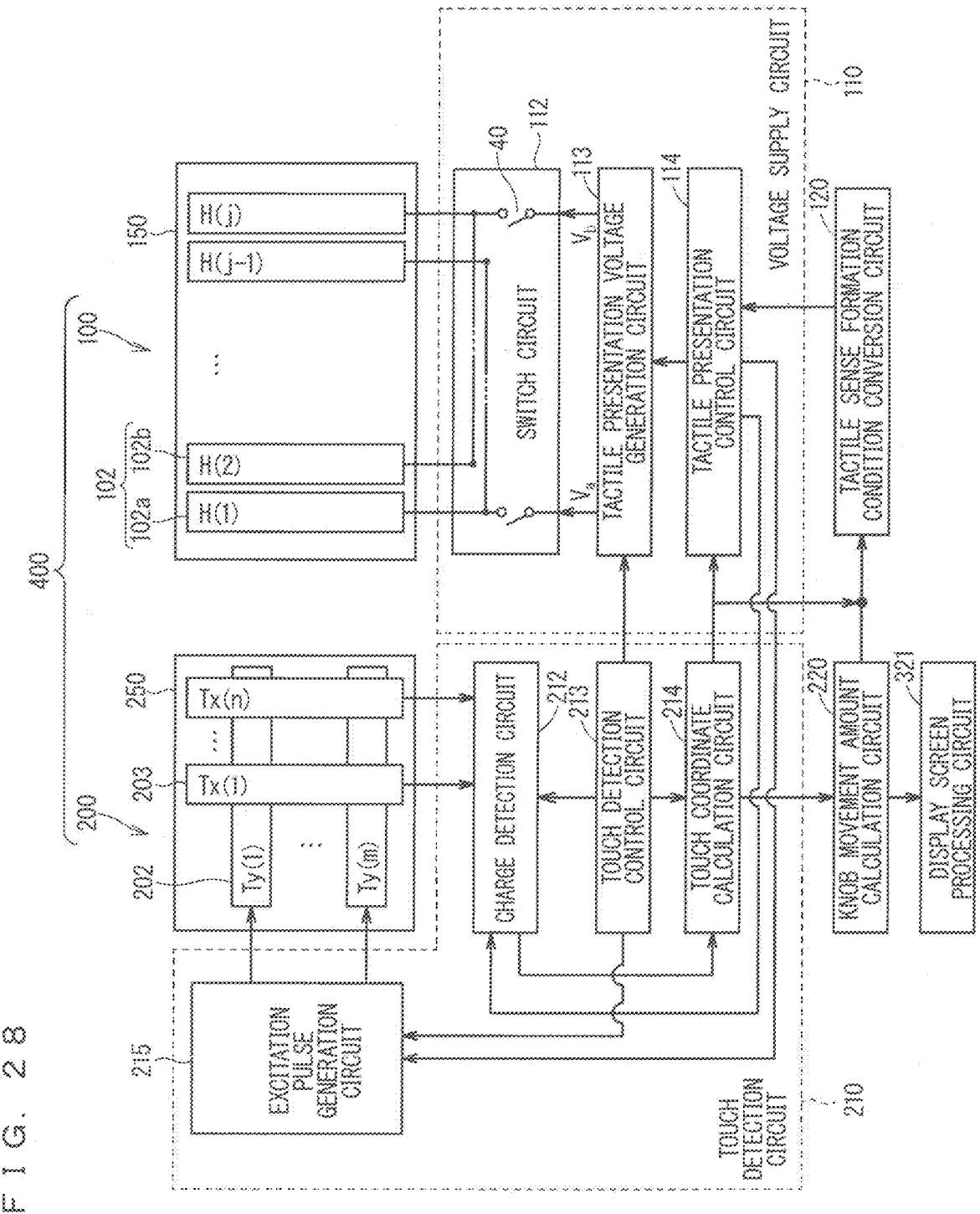
FIG. 28 is a block diagram schematically illustrating a configuration of the tactile presentation touch panel of FIG. 1.

FIG. 28 is a block diagram schematically illustrating a configuration of the tactile presentation touch panel 400. Here, it is assumed that excitation electrodes Ty(1) to Ty(m) are provided as a plurality of the excitation electrodes 202, detection electrodes Tx(1) to Tx(n) are provided as a plurality of the detection electrodes 203, and tactile electrodes H(1) to H(j) are provided as a plurality of the tactile electrodes 102. The tactile electrodes H(1) to H(j) are arranged in order according to the number in parentheses, the odd-numbered tactile electrode 102 corresponds to the first electrode 102a, and the even-numbered tactile electrode 102 corresponds to the second electrode 102b. Further, in order to simplify the description, it is assumed that one of the excitation electrode 202 constitutes one of the row direction wiring layer 206 (see FIG. 8 or 10), and one of the detection electrode 203 constitutes one of the column direction wiring layer 207 (see FIG. 8 or 10).

As described above, the tactile presentation touch panel 400 includes the touch panel 200 and the tactile presentation panel 100. The touch panel 200 includes a touch screen 250 and a touch detection circuit 210. The tactile presentation panel 100 includes a tactile presentation screen 150 and a voltage supply circuit 110.

The touch detection circuit 210 includes an excitation pulse generation circuit 215, a charge detection circuit 212, a touch coordinate calculation circuit 214, and a touch detection control circuit 213. The touch detection control circuit 213 controls operation of the excitation pulse generation circuit 215, the charge detection circuit 212, and the touch coordinate calculation circuit 214. The excitation pulse generation circuit 215 sequentially applies an excitation pulse signal to the excitation electrodes Ty(1) to Ty(m). The charge detection circuit 212 measures a signal obtained from each of the detection electrodes Tx(1) to Tx(n). In this manner, the charge detection circuit 212 detects a charge amount of each of the detection electrodes Tx(1) to Tx(n). Information of a charge detection result indicates a value corresponding to mutual capacitance between the excitation electrode Ty(k) and each of the detection electrodes Tx(1) to Tx(n) when an excitation pulse signal is applied to the excitation electrode Ty(k), where k is an integer of 1 or more and m or less. Note that the charge detection circuit 212 can recognize to which of the excitation electrodes Ty(1) to Ty(m) an excitation pulse signal is applied by a control signal from the touch detection control circuit 213. The touch coordinate calculation circuit 214 obtains data (hereinafter, referred to as "touch coordinate data") of coordinates touched by the indicator 2 on the basis of the charge detection result.

The touch coordinate calculation circuit 214 outputs the touch coordinate data to the knob movement amount calculation circuit 220, and also outputs the touch coordinate data as touch operation information to a tactile sense formation condition conversion circuit 120 and a tactile presentation control circuit 114. The knob movement amount calculation circuit 220 outputs information on a rotation angle, a rotation speed, and a horizontal movement distance as a movement amount of the knob to the tactile sense formation condition conversion circuit 120 and a display screen processing circuit 321. The tactile sense formation condition conversion circuit 120 outputs, to the tactile presentation control circuit 114, an electric signal condition for realizing the tactile strength (operation feeling strength) calculated on the basis of the input information. As described above, the touch detection circuit 210 has a function of a contact position detection unit that detects a contact position between the tactile presentation knob 3 and an operation surface of the tactile presentation panel 100. Note that the tactile presentation panel 100 may have a function of the contact position detection unit.

The voltage supply circuit 110 includes a switch circuit 112, the tactile presentation voltage generation circuit 113, and a tactile presentation control circuit 114. The tactile presentation voltage generation circuit 113 applies the voltage signal $V_a$ to the first electrode 102a and the voltage signal $V_b$ to the second electrode 102b among the tactile electrodes H(1) to H(j) via the switch circuit 112. In other words, the voltage signal $V_a$ and the voltage signal $V_b$ are alternately applied to the tactile electrodes H(1) to H(j) arranged in one direction (lateral direction in the diagram). The switch circuit 112 is set to an on state or an off state on the basis of a command from the tactile presentation voltage generation circuit 113. The switch circuit 112 connects the tactile electrode 102 to the tactile presentation voltage generation circuit 113 in the on state, and brings the tactile electrode 102 into a floating state in the off state. In the first embodiment, the switch circuit 112 includes two switches 40, one of which performs switching of an electrical path to all the first electrodes 102a, and the other of which performs switching of an electrical path to all the second electrodes 102b. These two of the switches 40 may be controlled in conjunction with each other. Note that the switch 40 corresponds to a switching unit.

The tactile presentation control circuit 114 refers to the information on the tactile strength calculated by the tactile sense formation condition conversion circuit 120. The tactile presentation control circuit 114 may control operation of the tactile presentation voltage generation circuit 113 based on this information. As described above, the voltage supply circuit 110 has a function of a tactile control unit that performs control to present, as a tactile sense, a frictional force between the tactile presentation knob 3 and the operation surface to a preset operation region when a contact position between the tactile presentation knob 3 and the operation surface of the tactile presentation panel 100 is present in the operation region.

<Operation of Tactile Presentation Touch Panel>

FIG. 29 is a schematic diagram illustrating an image of electrostatic capacitance between the excitation electrode 202 and the detection electrode 203 when the indicator 2 is not in contact with the tactile presentation knob 3. FIG. 30 is a timing chart schematically illustrating an operation timing of the tactile presentation touch panel 400 (see FIG. 28) when the indicator 2 is not in contact with the tactile presentation knob 3.

When the indicator 2 is not in contact with the tactile presentation knob 3, both the conductive elastic portion 6 and the tactile electrode 102 are in a floating state and at the same potential as the detection electrode 203, and the charge detection circuit 212 detects a charge amount mainly from electrostatic capacitance between the detection electrode 203 and the excitation electrode 202. The touch detection control circuit 213 outputs a control signal of the excitation electrode 202 also to the tactile presentation voltage generation circuit 113.

Based on this control signal, the tactile presentation voltage generation circuit 113 can recognize a touch detection period P1. In the touch detection period P1, the tactile presentation voltage generation circuit 113 disconnects the switch 40 of the switch circuit 112. In this manner, electrical connections between the tactile presentation voltage generation circuit 113 and all the tactile electrodes 102 are disconnected. As a result, the potential of all the tactile electrodes 102 becomes in a floating state.

Next, in a touch coordinate calculation period P2, the touch coordinate calculation circuit 214 determines whether or not there is touch by the indicator 2 on the basis of a charge detection result of mutual capacitance corresponding to each of the excitation electrodes Ty(1) to Ty(m) input from the charge detection circuit 212 and held, in other words, a charge detection result of capacitance of all intersections formed by the excitation electrodes Ty(1) to Ty(m) and the detection electrodes Tx(1) to Tx(n). Electric field coupling between the excitation electrode 202 and the detection electrode 203 is relaxed by proximity or contact of the indicator 2 such as a finger. As a result, charged charges in mutual capacitance are reduced. The touch coordinate calculation circuit 214 can determine the presence or absence of touch based on the degree of the reduction. In a case where touch is determined to be present, the touch coordinate calculation circuit 214 starts calculation of the touch coordinate data on the basis of the charge detection result. Specifically, the touch coordinate calculation circuit 214 can calculate the touch coordinate data by performing arithmetic processing such as gravity center calculation, for example, on a detection result of an intersection where the degree of reduction in charged charges is largest and an intersection around the intersection. In a case of determining that there is no touch, the touch coordinate calculation circuit 214 does not calculate the touch coordinate data, and waits until processing of a charge detection result performed next.

Here, description will be made below on operation in a case where a determination result indicating presence of contact of the indicator 2 with the tactile presentation knob 3 is obtained.

FIG. 31 is a schematic diagram illustrating an image of electrostatic capacitance between the excitation electrode 202 and the position detection unit 7 when the indicator 2 is in contact with the tactile presentation knob 3. FIG. 32 is a timing chart schematically illustrating an operation timing of the tactile presentation touch panel 400 (see FIG. 28) when the indicator 2 is in contact with the tactile presentation knob 3.

In a case where the indicator 2 is in contact with the tactile presentation knob 3, the conductive elastic portion 6 is in a state of being grounded via the tactile presentation knob 3 and the indicator 2, the detection electrode 203 forms electrostatic capacitance with the conductive elastic portion 6 via the tactile electrode 102, and electrostatic capacitance between the detection electrode 203 and the excitation electrode 202 decreases. As a result, a charge amount detected by the charge detection circuit 212 decreases, and it is detected that the indicator 2 comes into contact with the tactile presentation knob 3.

In the touch detection period P1, a control signal indicating a first conversion timing is output from the touch detection control circuit 213 to the excitation pulse generation circuit 215. Upon receiving this control signal, the excitation pulse generation circuit 215 gives an excitation pulse signal (charge pulse signal) to the excitation electrode Ty(1). In this manner, inter-electrode capacitance (mutual capacitance) between the excitation electrode Ty(1) and each of the detection electrodes Tx(1) to Tx(n) intersecting with the excitation electrode Ty(1) in plan view is charged. The charge detection circuit 212 detects a charge amount by the charging using the detection electrodes Tx(1) to Tx(n). Then, the charge detection circuit 212 performs analog/digital conversion (A/D conversion) on the detection result, and outputs digital information obtained by the analog/digital conversion to the touch coordinate calculation circuit 214 as a charge detection result of mutual capacitance corresponding to the excitation electrode Ty(1). Similarly, control signals indicating second to m-th conversion timings are sequentially output from the touch detection control circuit 213 to the excitation pulse generation circuit 215. In a manner corresponding to each of the second to m-th conversion timings, charge detection results of mutual capacitances corresponding to the excitation electrodes Ty(2) to Ty(m) are output to the touch coordinate calculation circuit 214.

The touch detection control circuit 213 also outputs the control signal to the tactile presentation voltage generation circuit 113. Based on this control signal, the tactile presentation voltage generation circuit 113 can recognize a touch detection period P1. In the touch detection period P1, the tactile presentation voltage generation circuit 113 disconnects the switch 40 of the switch circuit 112. In this manner, electrical connections between the tactile presentation voltage generation circuit 113 and all the tactile electrodes 102 are disconnected. As a result, the potential of all the tactile electrodes 102 becomes in a floating state.

Next, in a touch coordinate calculation period P2, the touch coordinate calculation circuit 214 determines whether or not there is touch by the indicator 2 on the basis of a charge detection result of mutual capacitance corresponding to each of the excitation electrodes Ty(1) to Ty(m) input from the charge detection circuit 212 and held, in other words, a charge detection result of capacitance of all intersections formed by the excitation electrodes Ty(1) to Ty(m) and the detection electrodes Tx(1) to Tx(n). Electric field coupling between the excitation electrode 202 and the detection electrode 203 is relaxed by proximity or contact of the indicator 2 such as a finger. As a result, charged charges in mutual capacitance are reduced. The touch coordinate calculation circuit 214 can determine the presence or absence of touch based on the degree of the reduction. In a case where touch is determined to be present, the touch coordinate calculation circuit 214 starts calculation of the touch coordinate data on the basis of the charge detection result. Specifically, the touch coordinate calculation circuit 214 can calculate the touch coordinate data by performing arithmetic processing such as gravity center calculation, for example, on a detection result of an intersection where the degree of reduction in charged charges is largest and an intersection around the intersection. When determining that there is no touch, the touch coordinate calculation circuit 214 does not calculate the touch coordinate data, and the processing returns to the touch detection period P1. In order to enable such processing, the touch coordinate calculation circuit 214 gives, to the touch detection control circuit 213, a signal indicating a determination result as to the presence or absence of touch.

Next, in a touch coordinate transmission period P3, according to a touch coordinate data transmission timing from the touch detection control circuit 213, the touch coordinate calculation circuit 214 outputs the touch coordinate data to the knob movement amount calculation circuit 220, and also outputs the touch coordinate data as the touch operation information to the tactile sense formation condition conversion circuit 120 and the tactile presentation control circuit 114.

Next, in a determination period P4, the tactile presentation control circuit 114 determines the position of the tactile presentation knob 3 from the touch coordinate data, and determines an area where a tactile sense is presented.

The tactile presentation control circuit 114 selects a tactile presentation signal waveform corresponding to coordinates of a display screen and the tactile presentation knob 3 based on input from the tactile sense formation condition conversion circuit 120. The "tactile presentation signal waveform" defines a waveform of the voltage signal $V_a$ and the voltage signal $V_b$. Note that a difference in waveform between the voltage signal $V_a$ and the voltage signal $V_b$ is typically a difference in frequency. The tactile presentation signal waveform is set inside or outside the tactile presentation control circuit 114. The number of types of the tactile presentation signal waveforms may be one or more than one.

In a case where there is only one type of the tactile presentation signal waveform, processing of selecting the tactile presentation signal waveform is not necessary. In a case where there is more than one type of the tactile presentation signal waveform, a type of the tactile presentation signal waveform is selected on the basis of input from the tactile sense formation condition conversion circuit 120.

Next, in a tactile presentation signal application period P5, the tactile presentation control circuit 114 generates a tactile presentation signal with the tactile presentation signal waveform. Further, the switch 40 connected to the tactile electrode 102 in a region where the tactile presentation signal is input of the switch circuit 112 is connected to the tactile presentation voltage generation circuit 113, and the switch 40 connected to the tactile electrode 102 in a region where the tactile presentation signal is not input is connected to GND, or the tactile electrode 102 is left floating without turning on the switch. In this manner, a signal is applied to the tactile electrode 102, and a tactile sense is presented. In the example of FIG. 32, an AC signal having the H level (high level) and the L level (low level) is applied to the tactile electrode 102. The tactile electrode 102 is charged at a high voltage of the positive electrode, typically plus tens of volts, in a period of the H level, discharged in a period of a zero level, and charged at a high voltage of the negative electrode, typically minus tens of volts, at the L level. A generation cycle and a generation period of a pulse signal may be appropriately set on the basis of input from the tactile sense formation condition conversion circuit 120.

After the tactile presentation signal application period P5, the processing returns to the touch detection period P1. By the above, the above-described operation is repeated. In this manner, the tactile presentation touch panel 400 can perform the position detection of the tactile presentation knob 3 and the tactile presentation according to the position of the tactile presentation knob 3 and a display screen.

Figure 33:
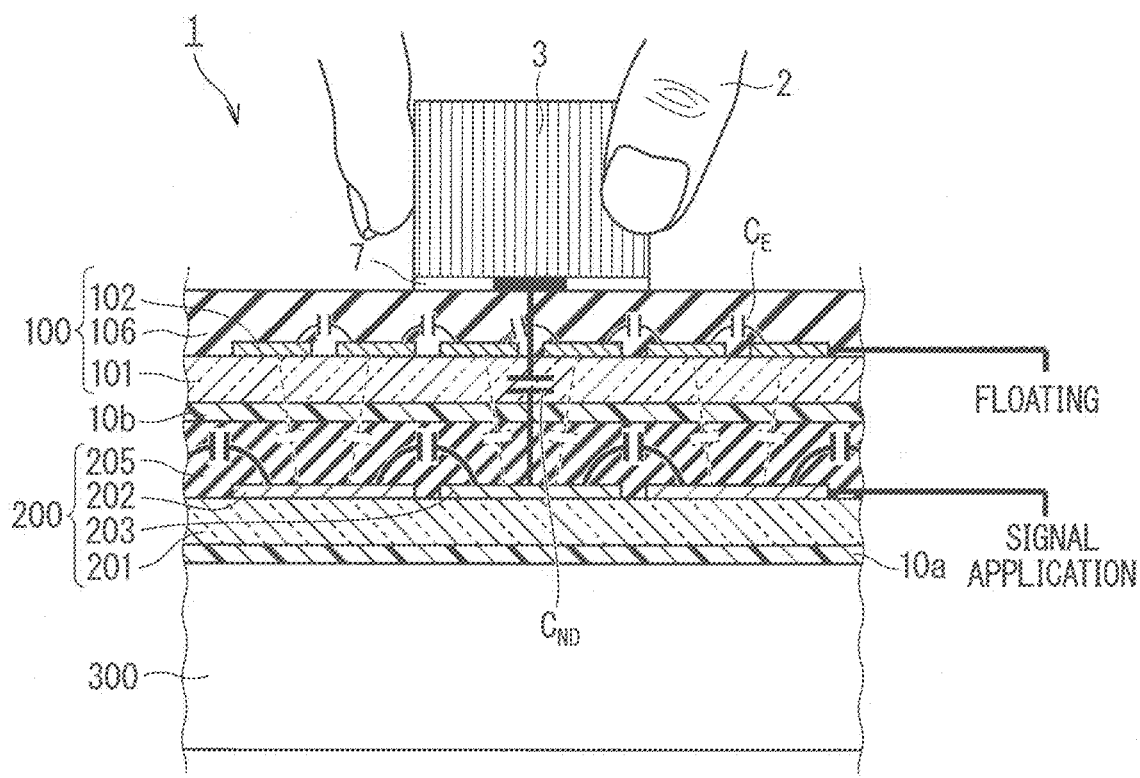
FIG. 33 is a schematic diagram for explaining electrostatic capacitance formed in the tactile presentation touch panel in FIG. 1 when the tactile presentation touch panel detects a touch position.

FIG. 33 is a schematic diagram illustrating formation of electrostatic capacitance in the tactile presentation touch display 1 in the touch detection period P1 (see FIG. 32). In the touch detection period P1, electrostatic capacitance $C_{ND}$ is formed between the indicator 2 and the detection electrode 203. During this period, the potential of all the tactile electrodes 102 is in a floating state. This prevents the tactile electrode 102 from functioning as a shield. Therefore, the sensitivity of touch detection can be enhanced.

Figure 34:
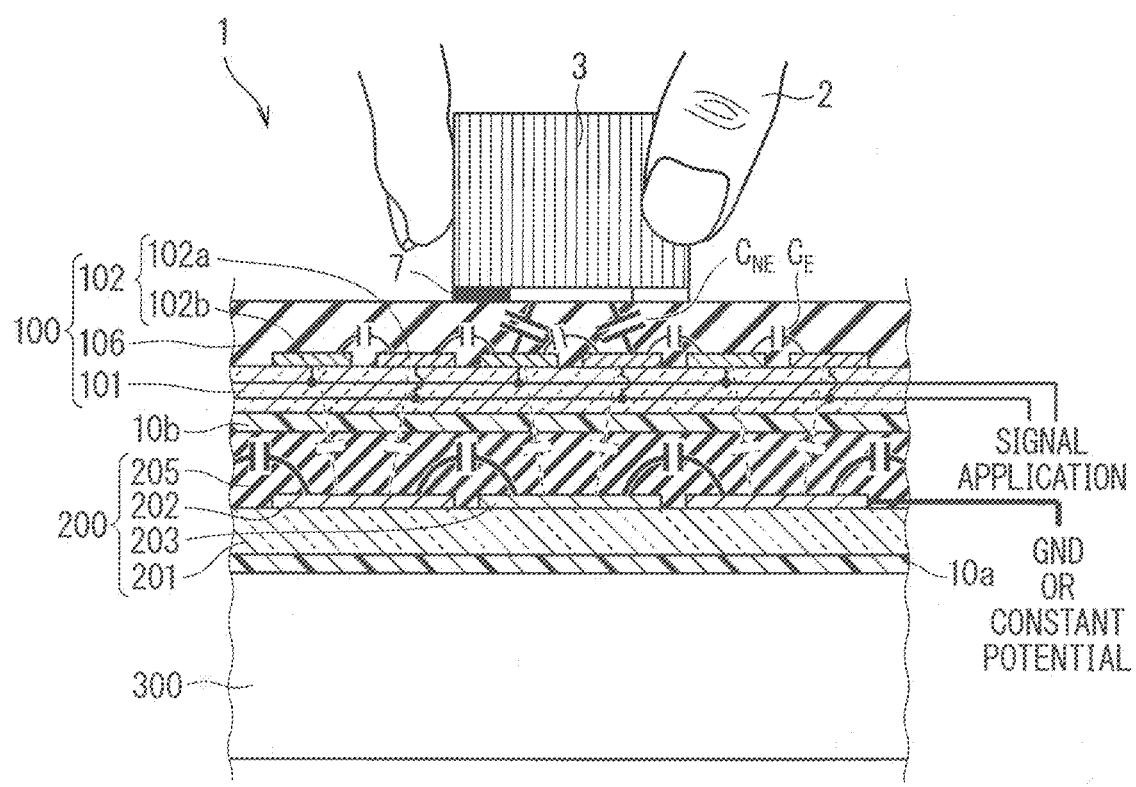
FIG. 34 is a schematic diagram for explaining electrostatic capacitance formed in the tactile presentation touch panel in FIG. 1 when the tactile presentation touch panel generates a tactile sense.

FIG. 34 is a schematic diagram illustrating formation of electrostatic capacitance in the tactile presentation touch display 1 in the tactile presentation signal application period P5 (see FIG. 32). In the tactile presentation signal application period P5, potential of the excitation electrode 202 and the detection electrode 203 of the touch panel 200 may be in a floating state. In this manner, it is possible to suppress the influence of the capacitance formation by the excitation electrode 202 and the detection electrode 203 on the electrostatic capacitance $C_{NE}$. Alternatively, the potential of the excitation electrode 202 and the detection electrode 203 of the touch panel 200 may be substantially constant potential, and for example, the excitation electrode 202 and the detection electrode 203 may be connected to ground potential with low impedance. In this manner, the excitation electrode 202 and the detection electrode 203 can function as a shield between the tactile electrode 102 and the display panel 300. Therefore, generation of noise in the display panel 300 due to a high voltage signal applied to the tactile electrode 102 is suppressed. Therefore, display defects due to noise can be prevented. Conversely, generation of noise in the tactile electrode 102 due to the display panel 300 is suppressed. When a tactile presentation signal is applied to the tactile electrode 102, the conductive elastic portion 6 forms electrostatic capacitance with the tactile electrode 102, and charges having potential opposite to voltage of the tactile electrode 102 are accumulated on a surface in contact with the dielectric layer 106 of the conductive elastic portion 6, and an electrostatic force is generated between the conductive elastic portion 6 and the dielectric layer 106. As a result, a frictional force between the conductive elastic portion 6 and the dielectric layer 106 changes, and torque of the knob changes when the tactile presentation knob 3 is rotated due to the change in the frictional force, which is felt as an operation feeling when the tactile presentation knob 3 is rotated.

Note that, in a case where a floating state is used, both the excitation electrode 202 and the detection electrode 203 may be in the floating state, or one of them may be in the floating state. Further, in a case where constant potential is used, both the excitation electrode 202 and the detection electrode 203 may be set to the constant potential, or one of them may be set to the constant potential. The configuration may be such that one of the excitation electrode 202 and the detection electrode 203 is set to be in a floating state, and the other is set at the constant potential. When distances between each of the excitation electrode 202 and the detection electrode 203 and the tactile electrode 102 are different, one of the excitation electrode 202 and the detection electrode 203 that is closer to the tactile electrode 102 may be in the floating state, and the other that is farther may be in the constant potential.

Note that, in the example illustrated in FIG. 28, the touch coordinate data is sent from the touch detection circuit 210 to the voltage supply circuit 110. However, as a variation, information on a charge detection result may be sent from the charge detection circuit 212 to the voltage supply circuit 110. In this case, the tactile presentation control circuit 114 performs determination of the presence or absence of touch and calculation of touch coordinates by using the information on a charge detection result.

In a case where the position where the tactile presentation knob 3 is placed on the tactile presentation panel 100 is changed during operation or for each operation, the bottom surface portion 15 may have a surface adhered and fixed onto the tactile presentation panel 100. Further, in a case where the position where the tactile presentation knob 3 is placed on the tactile presentation panel 100 is not changed during operation or for each operation (in a case where the position of the tactile presentation knob 3 is fixed and used), the bottom surface portion 15 may be bonded and fixed onto the tactile presentation panel 100 by an adhesive portion 17.

<Suppression of Charge Accumulation in Conductive Elastic Portion>

Figure 35:
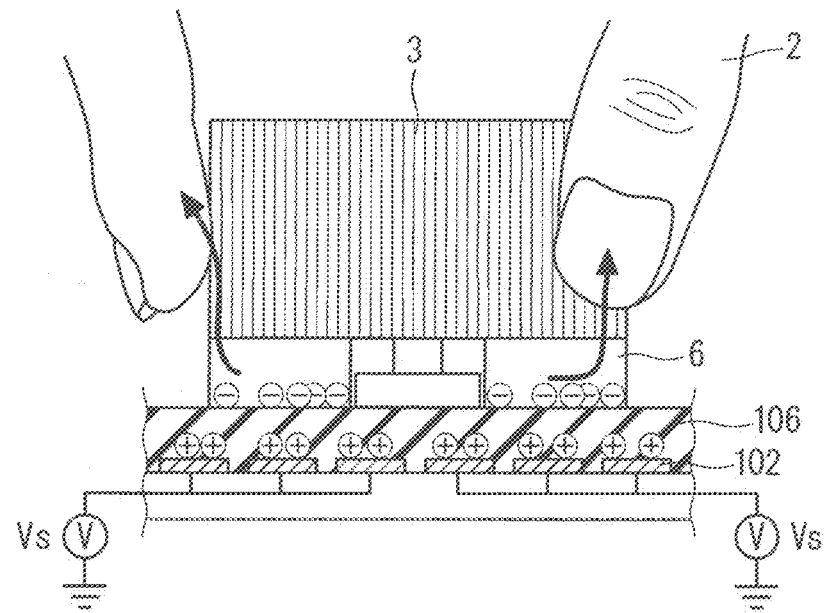
FIG. 35 is an image diagram schematically illustrating movement of charges accumulated in the conductive elastic portion when the tactile presentation knob is connected to the ground via the indicator at the time of signal voltage application according to the first embodiment.
Figure 36:
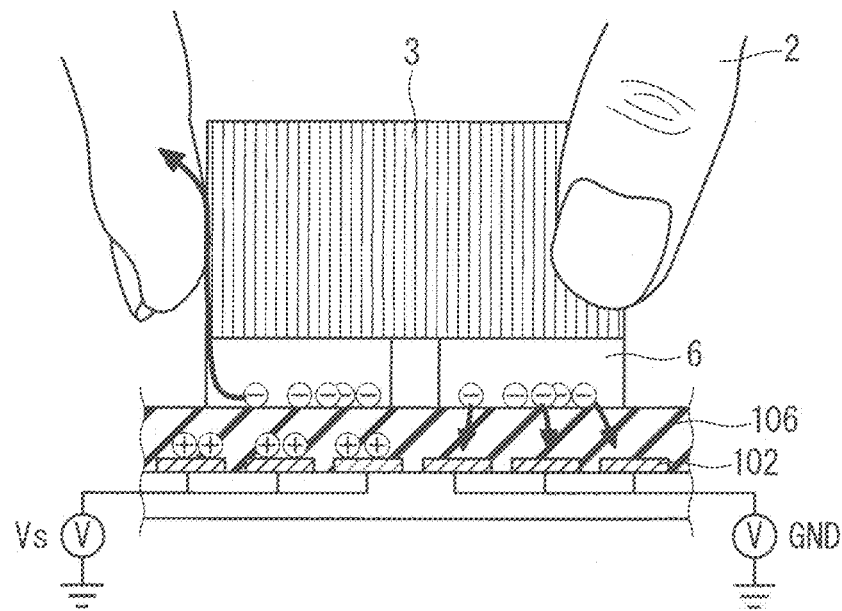
FIG. 36 is an image diagram schematically illustrating movement of charges accumulated in the conductive elastic portion when a part of tactile electrodes with which the tactile presentation knob is in contact via a dielectric layer is connected to the ground at the time of signal voltage application according to the first embodiment.

FIG. 35 is an image diagram schematically illustrating movement of charges accumulated in the conductive elastic portion 6 when the charges are grounded via the indicator 2 at the time of voltage signal application. FIG. 36 is an image diagram schematically illustrating movement of charges accumulated in the conductive elastic portion 6 when a part of the tactile electrodes 102 with which the tactile presentation knob 3 is in contact via the dielectric layer 106 is connected to the ground at the time of voltage signal application. The conductive elastic portion 6, which is formed by mixing conductive carbon black or metal particles with insulating resin, has relatively high resistance and easily accumulates electric charges. When charges are accumulated in the conductive elastic portion 6, an electrostatic force between the conductive elastic portion 6 and the tactile electrode 102 does not change due to a voltage signal, and the tactile strength decreases. When the conductive elastic portion 6 and a surface of the rotation portion 4 are electrically connected to each other, the indicator 2 is connected to the ground via the indicator 2 when the indicator 2 comes into contact with the rotation portion 4. In this manner, electric charges accumulated in the conductive elastic portion 6 are released, and accumulation of electric charges can be suppressed.

In a case where resistance of the conductive elastic portion 6 is high, charges hardly move in the conductive elastic portion 6, and charges cannot be sufficiently released only by releasing the charges via the indicator 2 as described above. In that case, the tactile electrode 102 is driven so that at least one of the conductive elastic portions 6 divided into two or more when a voltage signal is applied forms electrostatic capacitance with the tactile electrode 102, and a charge discharge portion 115 (see FIG. 37 to be described later) of which at least one is connected to the ground is connected to the tactile electrode 102 via the dielectric layer 106. In this manner, charges accumulated in the conductive elastic portion 6 are directly released to the tactile electrode 102 via the dielectric layer 106, so that accumulation of charges is prevented. The tactile electrode 102 connected to the charge discharge portion 115 does not need to be fixed, and application of a voltage signal and connection to the charge discharge portion 115 may be switched and driven in the same tactile electrode 102, or the tactile electrode 102 to which a voltage signal is applied and the tactile electrode 102 connected to the charge discharge portion 115 may be alternately arranged. However, no electrostatic force is generated in the tactile electrode 102 connected to the charge discharge portion 115. Therefore, in order to prevent a decrease in a tactile sense, the number of the tactile electrodes 102 to which a voltage signal is applied is made larger than the number of the tactile electrodes 102 connected to the charge discharge portion 115, or time for connecting to the charge discharge portion 115 is made shorter than time for applying a voltage signal. In this manner, an effective area of the conductive elastic portion 6 that generates an electrostatic force with the tactile electrode 102 is preferably made larger than an effective area of the conductive elastic portion 6 that forms capacitance with the charge discharge portion 115.

FIG. 37 is a block diagram illustrating a configuration in a case where the tactile electrode 102 is driven such that at least one of the conductive elastic portions 6 divided into two or more as in FIG. 36 forms electrostatic capacitance with the tactile electrode 102, and at least one is connected to the tactile electrode 102 connected to the ground via the dielectric layer 106. In the determination period P4 (see FIG. 32), the tactile presentation control circuit 114 determines the position where the tactile presentation knob 3 is placed from the touch coordinate data, determines an area where a tactile sense is presented, divides the area into two or more areas, and determines an area where a tactile presentation signal is input and an area connected to GND.

The tactile presentation control circuit 114 selects a tactile presentation signal waveform corresponding to coordinates of a display screen and the tactile presentation knob 3 based on input from the tactile sense formation condition conversion circuit 120. The "tactile presentation signal waveform" defines a waveform of the voltage signal $V_a$ and the voltage signal $V_b$. Note that a difference in waveform between the voltage signal $V_a$ and the voltage signal $V_b$ is typically a difference in frequency. The tactile presentation signal waveform is set inside or outside the tactile presentation control circuit 114. The number of types of the tactile presentation signal waveforms may be one or more than one. In a case where there is only one type of the tactile presentation signal waveform, processing of selecting the tactile presentation signal waveform is not necessary. In a case where there is more than one type of the tactile presentation signal waveform, a type of the tactile presentation signal waveform is selected on the basis of input from the tactile sense formation condition conversion circuit 120.

Next, in the tactile presentation signal application period P5 (see FIG. 32), the tactile presentation control circuit 114 generates a tactile presentation signal with the tactile presentation signal waveform. Further, the switch 40 connected to the tactile electrode 102 in a region where the tactile presentation signal is input of the switch circuit 112 is connected to the tactile presentation voltage generation circuit 113, and the switch 40 connected to the tactile electrode 102 in a region connected to GND is connected to GND. The switch 40, which is connected to the tactile electrode 102 in a region where no tactile presentation signal is input, is connected to GND, or the tactile electrode 102 is kept floating without the switch 40 is switched on. In this manner, a signal is applied to the tactile electrode 102, and a tactile sense is presented. In the example of FIG. 24, an AC signal having an H level (high level) and an L level (low level) is applied to the tactile electrode 102. The tactile electrode 102 is charged at a high voltage of the positive electrode, typically plus tens of volts, in a period of the H level, discharged in a period of a zero level, and charged at a high voltage of the negative electrode, typically minus tens of volts, at the L level. A generation cycle and a generation period of a pulse signal may be appropriately set on the basis of input from the tactile sense formation condition conversion circuit 120.

After the tactile presentation signal application period P5, the processing returns to the touch detection period P1. By the above, the above-described operation is repeated. In this manner, the tactile presentation touch panel 400 can perform the position detection of the tactile presentation knob 3 and the tactile presentation according to the position of the tactile presentation knob 3 and a display screen.

Note that, in the first embodiment, a GND terminal is used as the charge discharge portion 115. However, other configurations may be used as long as electric charges accumulated in the conductive elastic portion 6 can be discharged. For example, positive voltage or negative voltage for efficiently discharging charges may be applied instead of a GND terminal according to the conduction degree of electric charges accumulated in the conductive elastic portion 6.

In the present disclosure, in the tactile presentation signal application period P5, a waveform of a voltage signal, time during which the voltage signal is applied, and a signal formation cycle are changed to stop rotation operation of the tactile presentation knob 3 for an optional period. In this manner, an operable region that have not been able to be presented by the conventional tactile presentation knob, and a neutral position serving as an operation reference are presented. A specific example of these will be described later.

<Difference between Electrode Structure of Tactile Presentation Screen and Electrode Structure of Touch Screen>

As a preferable condition of the tactile electrode 102, firstly, a configuration in which the indicator 2 can be in contact with the tactile electrode 102 without a member other than the dielectric layer 106 interposed between them is desired. Therefore, the tactile electrode 102 covered with the dielectric layer 106 is preferably arranged on an outermost surface of the tactile presentation touch panel 400.

Secondly, the shorter a distance between the indicator 2 and the tactile electrode 102, the larger a tactile sense can be generated. From this viewpoint, the thickness of the dielectric layer 106 is preferably small, and the dielectric constant of the dielectric layer 106 is preferably large.

Thirdly, it is desirable that the tactile electrodes 102 densely exist in order to make the electrostatic capacitance $C_{NE}$ (see FIG. 34) large at the time of generation of a tactile sense, while it is preferable that capacitance $C_E$ between the tactile electrodes 102, that is, inter-electrode capacitance be small at the time of detection of a touch position (see FIG. 32) so that the formation of the capacitance $C_{ND}$ is not hindered.

In a case where the tactile presentation touch panel 400 is larger in size than the tactile presentation knob 3, and an area where the tactile presentation knob 3 is not placed is used as a touch panel that does not present a tactile sense, when the indicator 2 is not in contact with the tactile presentation knob 3, an operation timing (see FIG. 30) of when the indicator 2 is not in contact with the tactile presentation knob 3 is repeated for an entire surface of the tactile presentation touch panel 400. When touch is detected in an area used as a touch panel that does not perform tactile presentation, a touch position is calculated and output. When the indicator 2 comes into contact with the tactile presentation knob 3, touch detection is stopped in an area where the tactile presentation knob 3 is not placed, and operation is performed at an operation timing when the indicator 2 comes into contact with the tactile presentation knob 3 as described above (see FIG. 32) only in an area where the tactile presentation knob 3 is placed.

In a case where an area where the tactile presentation knob 3 is not placed is used as a touch panel that presents a tactile sense, when the indicator 2 is not in contact with the tactile presentation knob 3, an operation timing (see FIG. 30) of when the indicator 2 is not in contact with the tactile presentation knob 3 is repeated for an entire surface of the tactile presentation touch panel 400. When touch detection is performed on an area used as a touch panel that performs tactile presentation, operation is performed at an operation timing of when the indicator 2 is in contact with the tactile presentation knob 3 as described above (see FIG. 32). When the indicator 2 comes into contact with the tactile presentation knob 3, touch detection is stopped in an area where the tactile presentation knob 3 is not placed, and operation is performed at an operation timing when the indicator 2 comes into contact with the tactile presentation knob 3 as described above (see FIG. 32) only in an area where the tactile presentation knob 3 is placed.

As a preferable condition of the excitation electrode 202 and the detection electrode 203, firstly, in order to ensure sensitivity and linearity of touch position detection, a matrix structure by which a touch position can be identified accurately is required. Secondly, since the indicator 2 and the detection electrode 203 detect the touch position by the electrostatic capacitance $C_{ND}$ formed through the tactile presentation screen 150, it is necessary to provide a predetermined distance (several hundred μm or more and several mm or less) between the excitation electrode 202 and the detection electrode 203 so that an electric field spreads in the lateral direction.

As described above, there is a difference between a preferable condition of the tactile electrode 102 and a preferable condition of the excitation electrode 202 and the detection electrode 203. In order to optimize both conditions, it is not desirable to apply similar structures to them.

<Details of Lead-Out Wiring Layer>

The lead-out wiring layers 105 (FIG. 15) of the tactile presentation screen 150 specifically include lead-out wiring layers Ld(1) to Ld(j) and lead-out wiring layers Lu(1) to Lu(j). Assuming that an integer of any of numbers 1 to j is k, each of the lead-out wiring layers Ld(k) and Lu(k) is connected to the k-th tactile electrode 102. Each of the lead-out wiring layers Ld(k) and Lu(k) is connected to a first end and a second end in an extending direction of one of the tactile electrode 102.

Wiring resistance of each of the tactile electrodes 102 provided on the tactile presentation screen 150 is desirably high resistance from the viewpoint of not hindering touch detection by the touch screen 250, and is desirably, for example, $10^4 \Omega$ or more. In a case where wiring resistance is high as described above, propagation delay of a voltage signal in a wiring layer is likely to occur. As described above, the lead-out wiring layer 105 is connected to each of the first end and the second end of the tactile electrode 102, so that propagation delay can be suppressed.

The lead-out wiring layers Ld(1) to Ld(j) are arranged outside the tactile presentable area, and extend to corresponding electrodes in order from one closer to the center of an array of the tactile presentation panel terminal portions 107 so that a substantially shortest distance from the tactile presentation panel terminal portions 107 can be obtained. The tactile presentation panel terminal portion 107 is arranged in the vicinity of the center of a long side of the transparent insulating substrate 101 along the long side. The lead-out wiring layers Ld(1) to Ld(j) are arranged as densely as possible while securing mutual insulation. The lead-out wiring layers Lu(1) to Lu(j) are similarly arranged outside a region occupied by the lead-out wiring layers Ld(1) to Ld(j). With such arrangement, it is possible to suppress an area of a portion outside the tactile presentable area of the transparent insulating substrate 101.

The lead-out wiring layers 105, specifically, the lead-out wiring layers Ld(1) to Ld(j) and the lead-out wiring layers Lu(1) to Lu(j) are preferably composed of either a metal single-layer film or a laminated film of a metal single-layer and a non-metal single-layer. In a case where the laminated film has a lower layer and an upper layer covering the lower layer, the upper layer may have a function as a protective layer of the lower layer. For example, the upper layer as a protective layer may protect the lower layer from an etchant in an etching process used to manufacture the tactile presentation screen 150. Alternatively, the upper layer may function as a cap layer that prevents corrosion of the lower layer during manufacture or use of the tactile presentation screen 150. When a material of the lower layer is a material having more excellent adhesion to the transparent insulating substrate 101 than a material of the upper layer, the occurrence of peeling of the lead-out wiring layer 105 can be suppressed.

<Tactile Presentation Touch Panel Including Display Panel>

Figure 38:
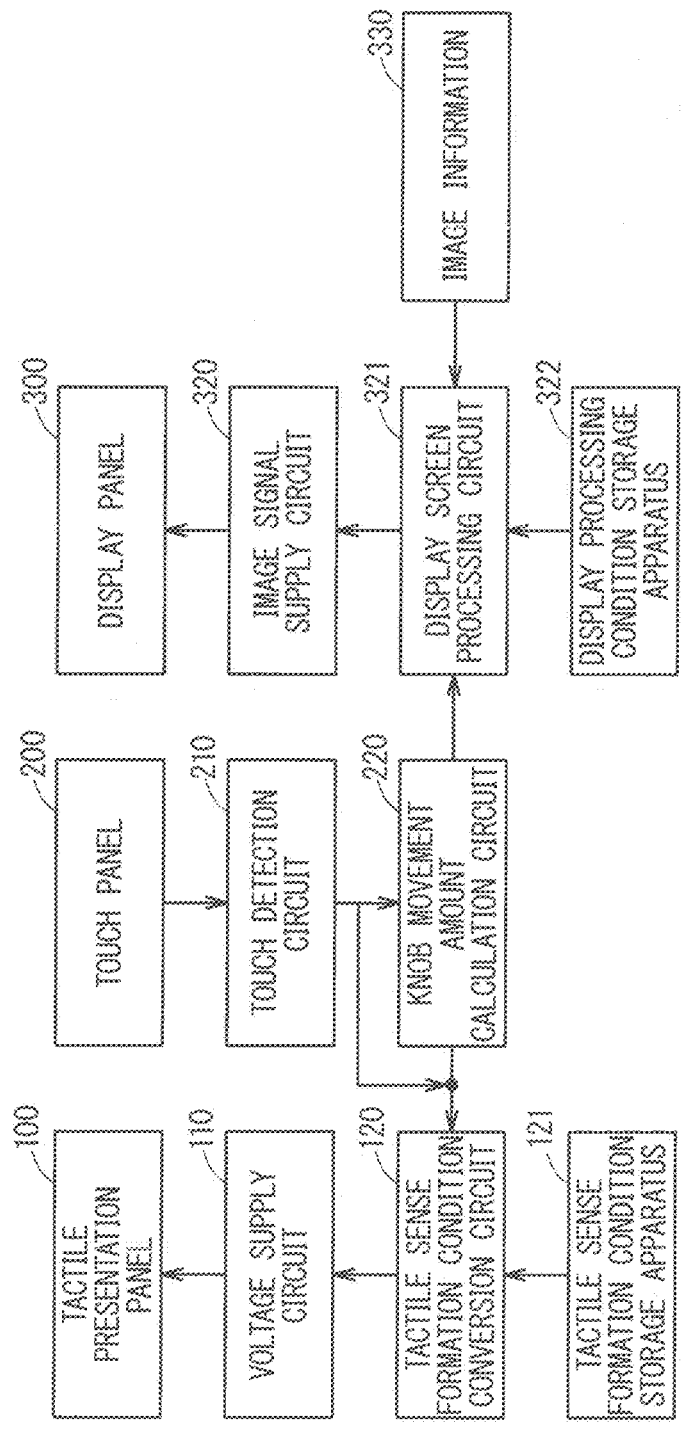
FIG. 38 is a block diagram illustrating an outline of a relationship between a display panel, a touch panel, and the tactile presentation panel according to the first embodiment.

FIG. 38 is a block diagram illustrating an outline of a relationship between a display panel, a touch panel, and the tactile presentation panel. The knob movement amount calculation circuit 220 (See FIGS. 28 and 37) outputs information (rotation information) on a movement amount (rotation angle) of the knob to the tactile sense formation condition conversion circuit 120 and the display screen processing circuit 321 based on coordinates on the touch panel 200 of the knob obtained by the touch detection circuit 210.

The display screen processing circuit 321 selects a display processing condition corresponding to a movement amount of the knob in a pattern stored in advance in a display processing condition storage apparatus 322 (display condition storage apparatus). Then, image information 330 is edited based on the selected display processing condition, and image data is transferred to an image signal supply circuit 320.

The tactile sense formation condition conversion circuit 120 selects a tactile sense formation condition corresponding to a movement amount of the knob in a pattern stored in advance in a tactile sense formation condition storage apparatus 121 (tactile sense condition storage apparatus), for example, a tactile strength. Then, the voltage supply circuit 110 supplies a voltage signal to the tactile presentation panel 100 based on the selected tactile sense formation condition. Therefore, a display change of the display panel according to a rotation amount of the tactile presentation knob 3 is synchronized with a tactile sense obtained from the knob.

FIG. 39 is a flowchart illustrating the synchronization processing. The synchronization processing is started when the indicator 2 (see FIG. 31) is in contact with the tactile presentation knob 3 (see FIG. 31) (knob touch) or power is applied to the tactile presentation touch panel 400 (power on), and position coordinates of the tactile presentation knob 3 on the touch panel 200 at the time the synchronization processing is started or at the time an initialization signal of the tactile presentation knob 3 is provided to the tactile presentation touch panel 400 are stored as an initial position (Step S0).

In a case where a contact state between the tactile presentation knob 3 and the indicator 2 is determined at a predetermined cycle (Step S1) and the tactile presentation knob 3 and the indicator 2 are determined not to be in contact with each other (in a case of No), it is determined that hand releasing operation (contact release) is performed, and the processing proceeds to hand releasing operation processing (Step S14). In contrast, in a case where the contact state is determined (in a case of Yes), the position of the tactile presentation knob 3 on the touch panel 200 is detected, and current coordinates are acquired (Step S2). Then, a movement amount (rotation angle) of the tactile presentation knob 3 is calculated from the acquired current coordinates and initial coordinates (Step S3), and presence or absence of movement is determined from the movement amount (Step S4).

In a case where the tactile presentation knob 3 is determined not to be moved (in a case of No), whether operation in a previous cycle is rotation or translation is determined (Step S11). In the case of translation, the processing proceeds to translational operation processing (Step S15). In contrast, in the case of rotation, an angle-tactile sense conversion table is referred to with a rotation angle at a previous cycle (Step S12), and a signal is applied to the tactile electrode under a condition where the same tactile sense as in the previous cycle is formed (Step S8).

Further, in a case where operation in the previous cycle is rotation, display processing according to a rotation angle of the previous cycle is performed (Step S13).

In contrast, in a case where it is determined in Step S4 that the tactile presentation knob 3 is moving (in a case of Yes), whether or not rotation operation is performed is determined (Step S5). This determination is made by a method described with reference to FIG. 26, for example. In a case where it is determined that the operation is not the rotation operation (in a case of No), the operation is determined to be translational operation, and the processing proceeds to translational operation processing (Step S15). In contrast, in a case where the operation is determined to be the rotation operation (in a case of Yes), it is determined whether the rotation direction is the same as the rotation direction in the previous cycle (Step S6). Further, in the case of the rotation operation, display processing according to the rotation angle calculated in Step S3 is performed (Step S9).

In a case where it is determined to be the same as the rotation direction in Step S6 (in a case of Yes), the same angle-tactile sense conversion table as in the previous cycle is referred to (Step S7), and a signal is applied to the tactile electrode 102 (Step S8).

In contrast, in a case where it is determined in Step S6 that the rotation direction is not the same as the rotation direction in the previous cycle (in a case of No), the rotation is considered to be performed in a reverse direction, and a change is made to a conversion table from a rotation angle for a reverse direction to a tactile sense (Step S10), the changed angle-tactile sense conversion table is referred to (Step S7), and a signal is applied to the tactile electrode 102 (Step S8).

After voltage is applied to the tactile electrode 102, the processing proceeds to check of a contact state between the tactile presentation knob 3 and the indicator 2 in a next cycle.

Figures 40, 41:
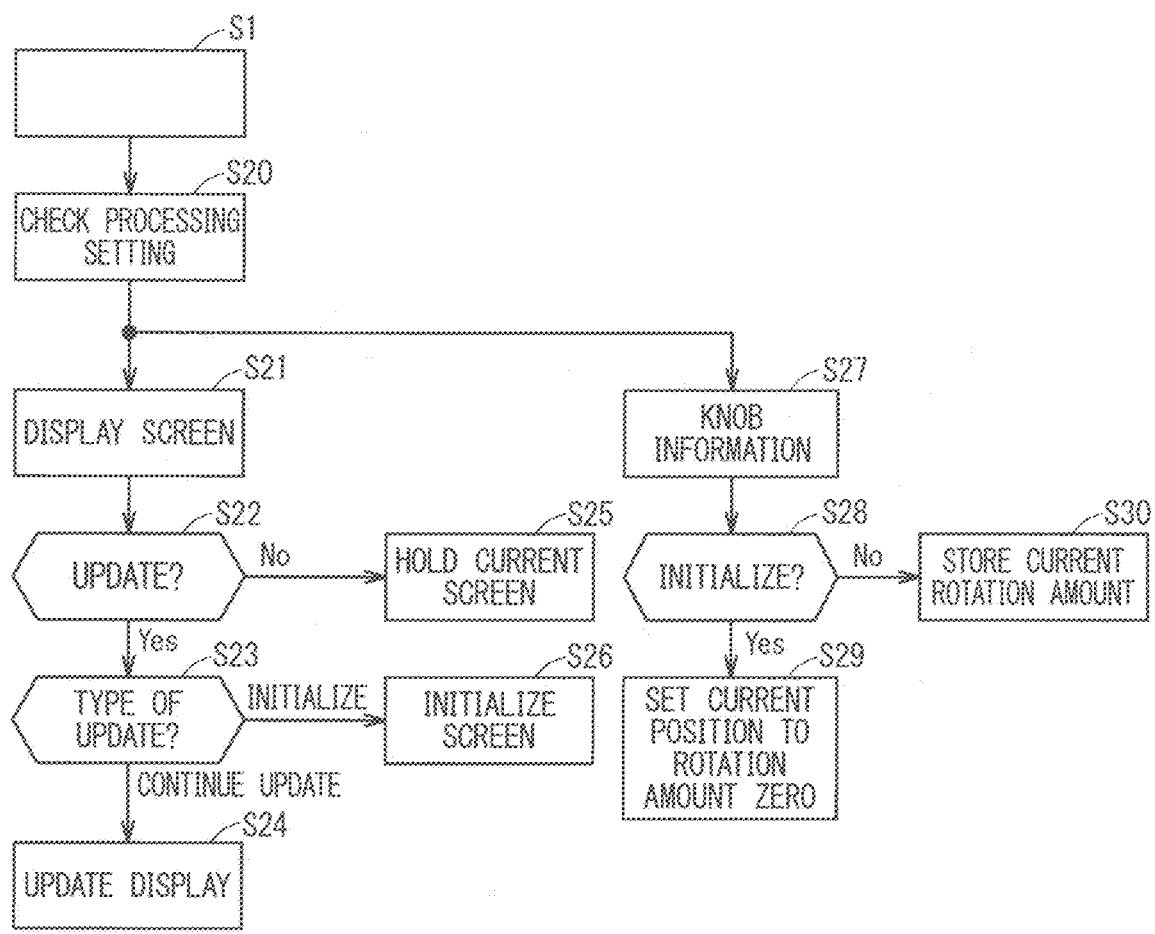
FIG. 40 is a flowchart illustrating hand releasing operation processing according to the first embodiment.
FIG. 41 is a diagram illustrating a processing setting example of the hand releasing operation processing according to the first embodiment.

FIG. 40 is a flowchart illustrating hand releasing operation processing in Step S14 after proceeding from Step S1 in FIG. 39. In the hand releasing operation processing, a matrix in which processing of a rotation amount of the tactile presentation knob 3 and image processing of the display panel 300 are associated with each other as illustrated in FIG. 41 is prepared in advance, and the processing is performed. As illustrated in FIG. 41, examples of a pattern of screen display include a pattern in which the screen display is continuously updated, a pattern in which the screen (current screen) display of a previous cycle is held and continuously displayed, and a pattern in which the screen display is initialized (the initial screen is displayed).

FIG. 40 is a flowchart illustrating an example of display processing by operation of the tactile presentation knob. In the hand releasing operation processing illustrated in FIG. 40, image processing performed after processing settings as shown in the above-described matrix is checked (Step S20) and a display screen is checked (Step S21), and processing of a rotation amount performed after knob information is checked (Step S27).

In the image processing, whether or not the display screen is updated is determined (Step S22), and in a case where the display screen is not updated (in a case of No), the currently displayed display screen is held (Step S25). In contrast, in a case where the display screen is updated (in a case of Yes), a type of update is determined (Step S23).

As a type of update, as illustrated in FIG. 41, there are a case of initialization and a case of continuation of update. In the case of initialization, the display screen is updated using the display information of the initial screen (Step S26). In the case of continuation of update, the display screen is updated according to a display operation amount based on the current rotation angle (the same as the rotation angle of the previous cycle) (Step S24).

In contrast, as illustrated in FIG. 41, the processing of a rotation amount includes processing of storing a rotation amount to continue processing up to the present for next operation of the tactile presentation knob 3 (current rotation amount storage) and processing of initializing a rotation amount and setting the rotation amount to zero (rotation amount zero setting) in order to perform next operation of the tactile presentation knob 3 from the initial state (rotation amount zero), and first, whether or not initialization is performed is determined (Step S28).

If it is determined in Step S28 that initialization is performed (in a case of Yes), a rotation amount is initialized at the current position of the tactile presentation knob 3 and set to zero (Step S29). In contrast, in a case where initialization is determined not to be performed (in a case of No), the rotation amount is stored (Step S30). The translational operation processing illustrated in Step S15 of FIG. 39 will be described later with reference to FIG. 80.

Figure 42:
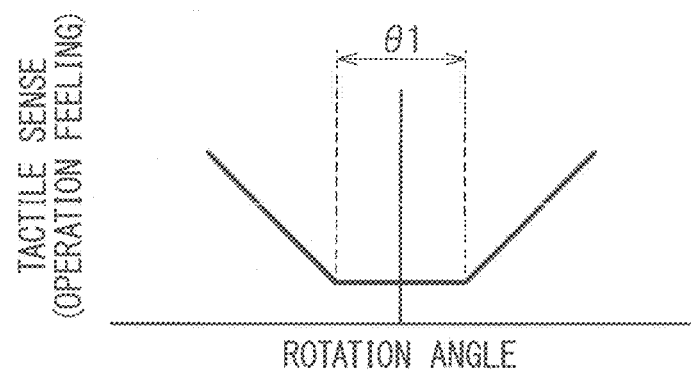
FIG. 42 is a diagram illustrating a conversion table of a rotation angle and a tactile sense (operation feeling) of the tactile presentation knob according to the first embodiment.

As the angle-tactile sense conversion table used in Step S7 of FIG. 39, for example, in a case where a rotation direction away from the initial position is a forward direction (first direction), and a rotation direction approaching the initial position is a backward direction (second direction), an example of the conversion table (first pattern) from the rotation angle in the forward direction to a tactile sense is illustrated in FIG. 42. In FIG. 42, the conversion table is illustrated as a graph of a tactile sense (operation feeling) with respect to a rotation angle for the sake of convenience. In the graph, in a case where the tactile presentation knob 3 is in the vicinity of the initial position (in the vicinity of a rotation angle of zero), a state in which an operation feeling is low is maintained, and when a movement amount (rotation angle) from the initial position increases, an operation feeling (resistance feeling) proportional to a rotation angle is presented.

An angle width $\theta 1$ at which a state where an operation feeling is low is maintained and an inclination in a proportional portion may be appropriately set according to a display setting state, the size of the tactile presentation knob 3, and the like. The conversion table illustrated in FIG. 42 contributes to prevention of erroneous operation when the rotation angle is increased.

Figure 43:
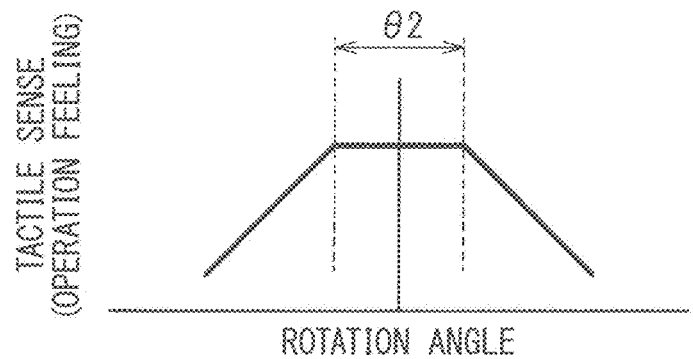
FIG. 43 is a diagram illustrating a conversion table of a rotation angle and a tactile sense (operation feeling) of the tactile presentation knob according to the first embodiment.

Similarly, another example of the conversion table from a rotation angle in the forward direction to a tactile sense is illustrated in FIG. 43. In the table (graph) illustrated in FIG. 43, in a case where the tactile presentation knob 3 is in the vicinity of the initial position (in the vicinity of a rotation angle of zero), a state in which an operation feeling is high is maintained, and when a movement amount (rotation angle) from the initial position increases, an operation feeling (resistance feeling) proportional to a rotation angle is lowered. An angle width $\theta 2$ at which a state where an operation feeling is high is maintained and an inclination in a proportional portion may be appropriately set according to a display setting state, the size of the tactile presentation knob 3, and the like.

Note that an operation feeling at a rotation angle at which an operation feeling in a high state turns to be lowered may be discontinuous. The conversion table illustrated in FIG. 43 contributes to prevention of erroneous operation when the indicator 2 comes into contact with the tactile presentation knob 3.

In the conversion table illustrated in FIG. 42, a rate of increase in an operation feeling is constant (proportional). However, the conversion table may be such that the rate of increase in an operation feeling is lowered as a rotation angle is increased as illustrated in FIG. 44, or may be such that the rate of increase in an operation feeling increases as a rotation angle is increased as illustrated in FIG. 45.

Figure 44:
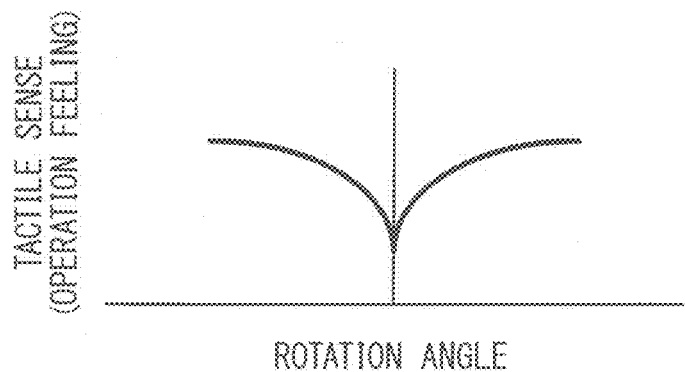
FIG. 44 is a diagram illustrating a conversion table of a rotation angle and a tactile sense (operation feeling) of the tactile presentation knob according to the first embodiment.
Figure 45:
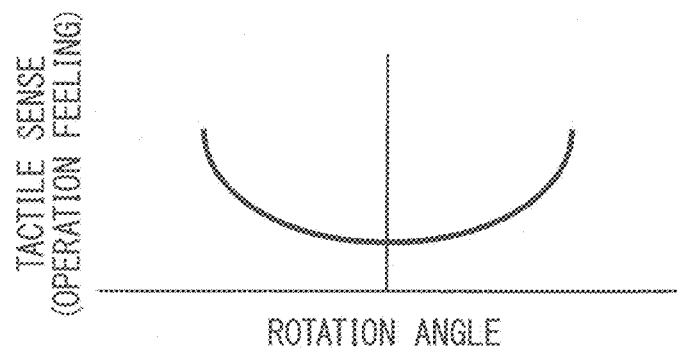
FIG. 45 is a diagram illustrating a conversion table of a rotation angle and a tactile sense (operation feeling) of the tactile presentation knob according to the first embodiment.

The conversion table illustrated in FIG. 44 is effective in a case where a rotation operable range is wide but a rotation range suitable for display processing operation is small, and the conversion table illustrated in FIG. 45 is effective in a case where the rotation range suitable for the display processing operation is large. Note that in FIGS. 44 and 45, a case where the angle width θ1=0 is illustrated.

Figure 46:
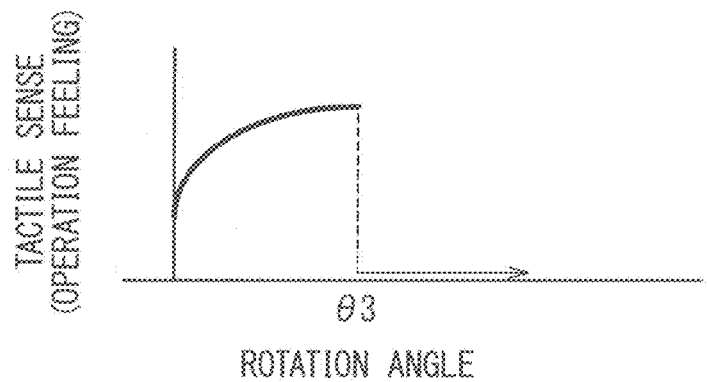
FIG. 46 is a diagram illustrating a conversion table of a rotation angle and a tactile sense (operation feeling) of the tactile presentation knob according to the first embodiment.

Further, another example of the conversion table is illustrated in FIG. 46. The table (graph) illustrated in FIG. 46 is a table in which an operation feeling increases up to a predetermined rotation angle θ3, the operation feeling greatly decreases when the rotation angle θ3 is exceeded, and the operation feeling does not change after that. This is effective for recognizing the fact that the operation range is exceeded, and preventing that signal intensity for providing an operation feeling becomes excessive in a region exceeding the operation range and the tactile presentation touch panel is damaged. Note that in FIG. 46, a relationship between a rotation angle up to the rotation angle θ3 and an operation feeling may be one as illustrated in FIG. 42 or 45.

Figure 47:
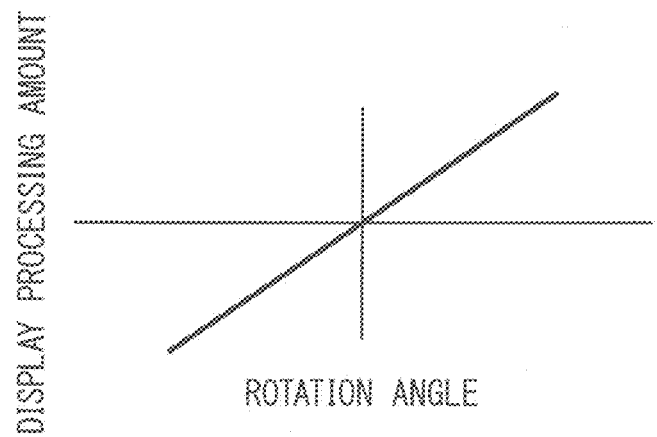
FIG. 47 is a diagram illustrating a conversion table of a rotation angle and a display processing amount of the tactile presentation knob according to the first embodiment.

The provision of an operation feeling by the conversion table illustrated in FIGS. 42 to 45 is linked with display operation of the display panel, and is represented by a graph of a rotation angle and a display processing amount as illustrated in FIG. 47, for example. In the graph illustrated in FIG. 47, a display processing amount increases or decreases as a rotation angle increases or decreases. As described above, since operation of the tactile presentation knob 3, an operation feeling, and a display state are linked, erroneous operation can be suppressed.

The provision of an operation feeling by the conversion table illustrated in FIG. 46 may be linked with display operation of the display panel, and for example, a relationship as illustrated in FIGS. 48 and 49 may be employed. In the case of the graph illustrated in FIG. 48, a rotation angle and a display processing amount are synchronized up to the predetermined rotation angle θ3, and a display processing amount is fixed when the rotation angle θ3 is exceeded. Therefore, in a case where, as the display processing amount, for example, the order of icons (items) (hereinafter, described as a list) arranged in optional order is indicated, linkage of position (coordinate) information of data in which a range is determined is supported such that display is fixed to an icon at the end of a list (a first icon in a case where the rotation angle is −θ3) even if rotation operation is performed beyond the last icon. In the case of the graph illustrated in FIG. 49, the rotation angle and the display processing amount are synchronized up to the predetermined rotation angle θ3, and the display processing amount becomes zero when the predetermined rotation angle θ3 is exceeded. For this reason, for example, in a case where a speed of a change from a current icon to a next icon or a speed of repeating a list (hereinafter, described as a feed speed) in an operation of repeatedly displaying a list (icons or the like arranged in optional order) is indicated as the display processing amount, movement speed information of display data is supported such that the feed speed is set to zero when rotation operation exceeding a set feed speed is performed. In a case where operation is performed by an operator beyond a limit, it is possible to obtain operation invalidation information from both a visual sense and a tactile sense.

FIG. 50 illustrates an example of the conversion table (second pattern) of a case where the rotation in the forward direction by the conversion table illustrated in FIG. 42 is changed to the rotation in the backward direction. FIG. 50 is a graph in which an operation feeling decreases to a preset operation feeling (first tactile strength) at a rotation angle θ4 at which switching is made from the forward direction to the backward direction, and the operation feeling increases as the tactile presentation knob 3 is returned to the initial position (angle=zero). Therefore, it is possible to recognize from the tactile presentation knob 3 that the initial position is close.

Similarly, the conversion table illustrated in FIG. 50 is also applicable in a case where the rotation in the forward direction by the conversion table illustrated in FIGS. 44 and 45 is changed to the rotation in the backward direction.

Figure 51:
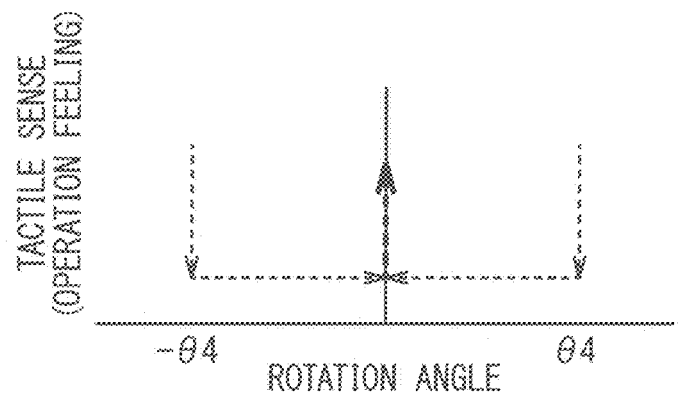
FIG. 51 is a diagram illustrating a conversion table of a rotation angle and a tactile sense (operation feeling) of the tactile presentation knob according to the first embodiment.

Further, another example of the conversion table in a case where the rotation in the forward direction is changed to the rotation in the backward direction is illustrated in FIG. 51. FIG. 51 is a graph in which, after the operation feeling is decreased to the preset operation feeling at the rotation angle θ4 at which switching is made from the forward direction to the backward direction, the operation feeling continues up to the initial position, and a preset operation feeling (second tactile strength) is presented at the initial position. The conversion table is effective in a case where the operation is smoothly performed up to the initial position.

Figure 52:
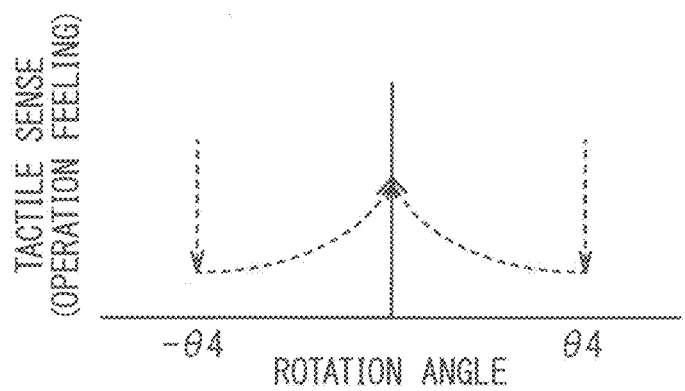
FIG. 52 is a diagram illustrating a conversion table of a rotation angle and a tactile sense (operation feeling) of the tactile presentation knob according to the first embodiment.

Similarly, another example of the conversion table in a case where the rotation in the forward direction is changed to the rotation in the backward direction is illustrated in FIG. 52. FIG. 52 is a graph in which the operation feeling decreases to the preset operation feeling at the rotation angle θ4 at which switching is made from the forward direction to the backward direction, and then an increase rate of the operation feeling increases as the rotation angle approaches zero (initial position). This conversion table is effective in a case where the operation is smoothly performed up to the vicinity of the initial position and approaching to the initial position is caused to be sensed in the vicinity of the initial position.

Figure 53:
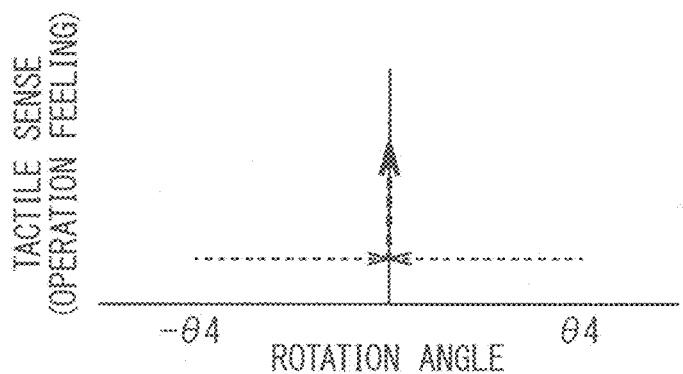
FIG. 53 is a diagram illustrating a conversion table of a rotation angle and a tactile sense (operation feeling) of the tactile presentation knob according to the first embodiment.

FIG. 53 illustrates an example of the conversion table in a case where a change is made from a terminal of an operation range in the conversion table illustrated in FIG. 43 and a rotation angle exceeding the rotation angle θ3 in the conversion table illustrated in FIG. 46 to the rotation in the backward direction. FIG. 53 is a graph in which the operation feeling at the time of switching is continued up to the initial position, and a preset sensed operation feeling is presented at the initial position. Note that, in a case of making correspondence to the conversion table illustrated in FIG. 46, the operation feeling is maintained at zero.

Further, an operation feeling in the case of returning to the initial position may be changed depending on a rotation angle as illustrated in FIG. 50 or 52.

Figure 54:
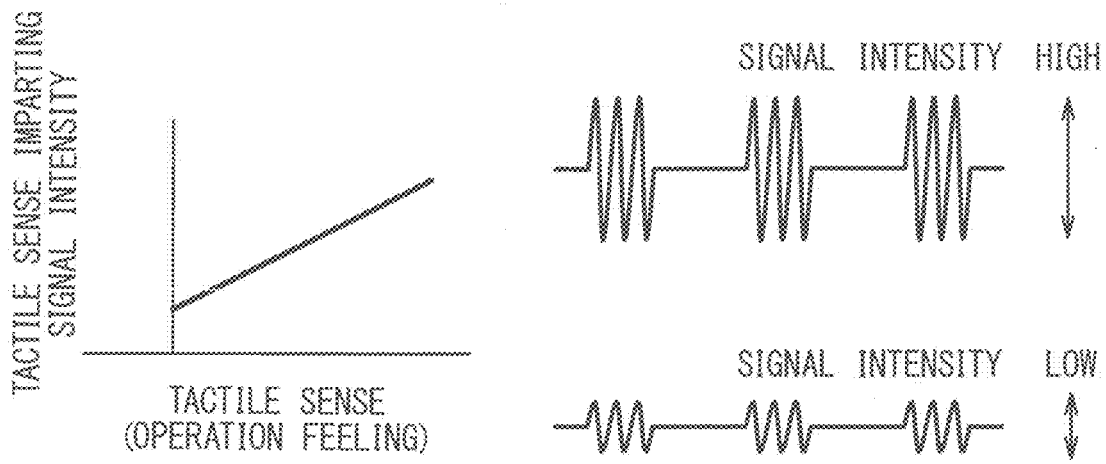
FIG. 54 is a diagram illustrating a conversion table between a tactile sense (operation feeling) and a tactile sense imparting signal of the tactile presentation knob according to the first embodiment.
Figure 55:
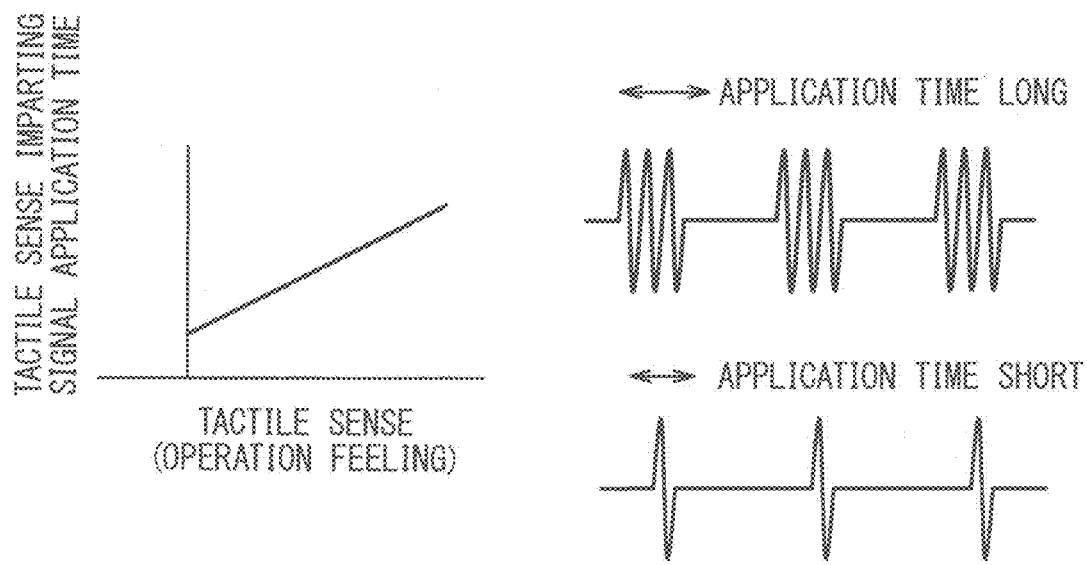
FIG. 55 is a diagram illustrating a conversion table between a tactile sense (operation feeling) and a tactile sense imparting signal of the tactile presentation knob according to the first embodiment.

FIGS. 54 and 55 illustrate examples of an operation feeling converted in the conversion table and a voltage application condition to the tactile electrode 102. A graph of the tactile sense imparting signal intensity with respect to a tactile sense (operation feeling) is illustrated on the left side of FIG. 54, a graph of tactile sense imparting signal application time with respect to a tactile sense (operation feeling) is illustrated on the left side of FIG. 55, and a waveform diagram of the tactile sense imparting signal is illustrated on the right side of both diagrams.

In FIG. 54, as illustrated in the waveform diagram, a maximum value (maximum amplitude) of tactile signal voltage to be applied is increased in accordance with improvement in the operation feeling. A tactile sense can be clearly changed by changing the applied voltage of the tactile signal to be applied.

In contrast, in FIG. 55, as illustrated in the waveform diagram, time for applying a tactile signal is increased in accordance with the improvement in the operation feeling. The tactile sense can be clearly changed by changing the application time of the tactile signal to be applied.

Figure 56:
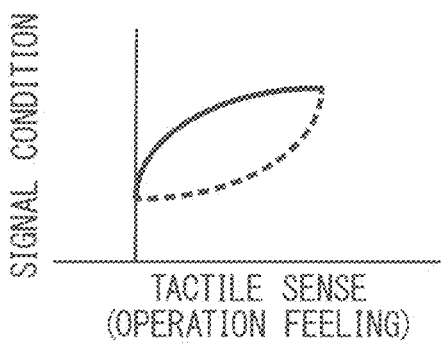
FIG. 56 is a diagram illustrating a conversion table between a tactile sense (operation feeling) and a tactile sense imparting signal of the tactile presentation knob according to the first embodiment.

Note that, in FIG. 54, a relationship between an operation feeling and a signal intensity is represented as a pattern having a specific slope with a specific signal intensity as an intercept, and in FIG. 55, a relationship between an operation feeling and signal application time is represented as a pattern having a specific slope with specific application time as an intercept. However, the intercept and the slope can be appropriately selected depending on a state of the tactile presentation panel 100, the tactile presentation knob 3, and the indicator 2. Furthermore, as indicated by a solid line in FIG. 56, a pattern in which a change amount in a signal condition decreases with an increase in an operation feeling may be used, or as indicated by a broken line, a pattern in which a change amount in a signal condition increases with an increase in an operation feeling may be used.

Anther Application Examples

Figure 57:
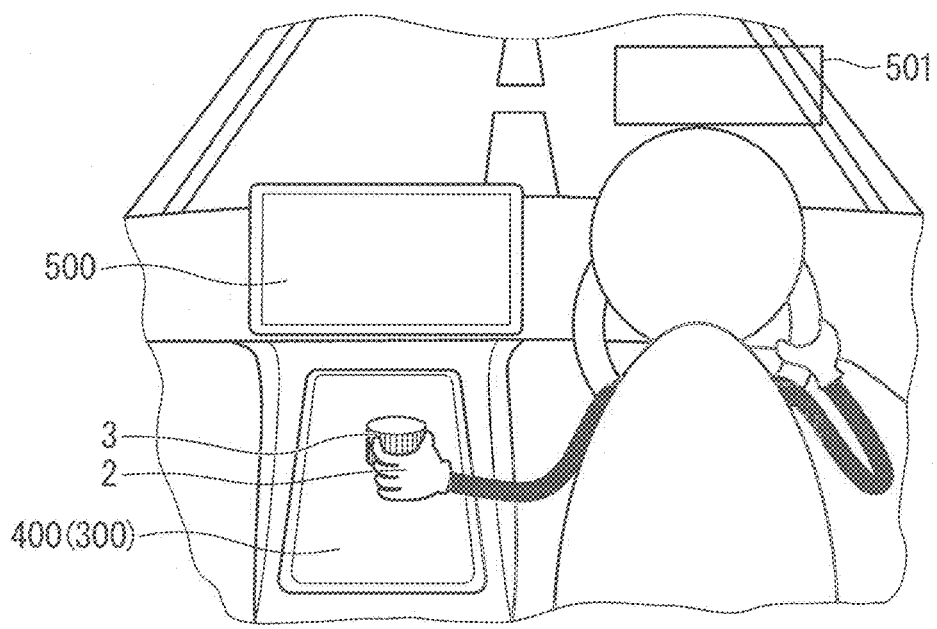
FIG. 57 is a conceptual diagram illustrating another application example of the first embodiment.

In the above description, a visually recognized image is displayed on the display panel 300 incorporated in the tactile presentation touch panel 400. However, as illustrated in FIG. 57, an image different from the display panel 300, for example, map information or the like may be displayed on a display 500 installed separately from the tactile presentation touch panel 400, and the display may be linked with operation of the tactile presentation knob 3 arranged on the tactile presentation touch panel 400. Furthermore, a region where information is projected on a windshield by a projection method or the like may be used as a display 501 installed separately. In this manner, the use of the tactile presentation knob 3 can be expanded.

<Information to be Displayed>

Examples of the image information 330 in the block diagram of FIG. 38 include an icon list, indoor environment setting values such as temperature, humidity, and volume, a place, an area, a facility name, a TV broadcast station name, a radio broadcast station name and a broadcast frequency, a character list of music, video titles, news, website names, a telephone directory, and the like, map information (2D, 3D), and video information such as route information, drama, a movie, animation, news, and recording.

Examples of editing processing of the image information 330 by the display screen processing circuit 321 include a change of the position of a display list, list display according to an update speed of the display list, movement of map information in the left-right and up-down directions, map display according to a movement speed of map information in the left-right and up-down directions, scaling display of map information, map information display according to the position of route trace, stereoscopic display according to a visual field rotation amount on a three-dimensional map, stereoscopic display according to speed setting of visual field rotation, display of a time point of time-axis movement according to setting of video (skip), display according to setting of a time-axis movement speed of video (fast-forward, fast-reverse), and the like.

<Effect>

According to the first embodiment, when the user performs operation by using the tactile presentation knob 3 on the tactile presentation touch panel 400, a tactile sense of an operation feeling and an operation amount of the tactile presentation knob 3 is presented to the user, and an operation feeling of the dial knob that allows intuitive operation based on a tactile sense by the user is possible and is user-friendly is obtained, so that operational accuracy based on a tactile sense can be improved and reliability of operation can be obtained.

Furthermore, display is updated according to an operation amount of the tactile presentation knob 3, so that a sense of fullness of operation can be further obtained.

Further, by appropriately setting the conversion table of a rotation amount and an operation feeling, operability of the tactile presentation knob 3 is improved by erroneous operation prevention at the time of touching the tactile presentation knob 3 and at the time of starting operation, clarification of a rotation setting range, invalidation of processing in a case where rotation operation is performed to the outside of a rotation setting range, and provision of a feeling of returning to the initial position.

Further, since a tactile sense is electrostatically presented to the user, a tactile sense can be accurately presented.

Second Embodiment

A second embodiment has a configuration in which information on a knob movement amount in the first embodiment is replaced from a rotation angle to a rotation speed. Therefore, the tactile presentation touch panel 400, the tactile presentation knob 3, and the like are structurally the same, and redundant description will be omitted.

Synchronization processing of a display change of the display panel according to a rotation amount of the tactile presentation knob 3 and a tactile sense obtained from the knob will be described with reference to a flowchart illustrated in FIG. 58.

Figure 58:
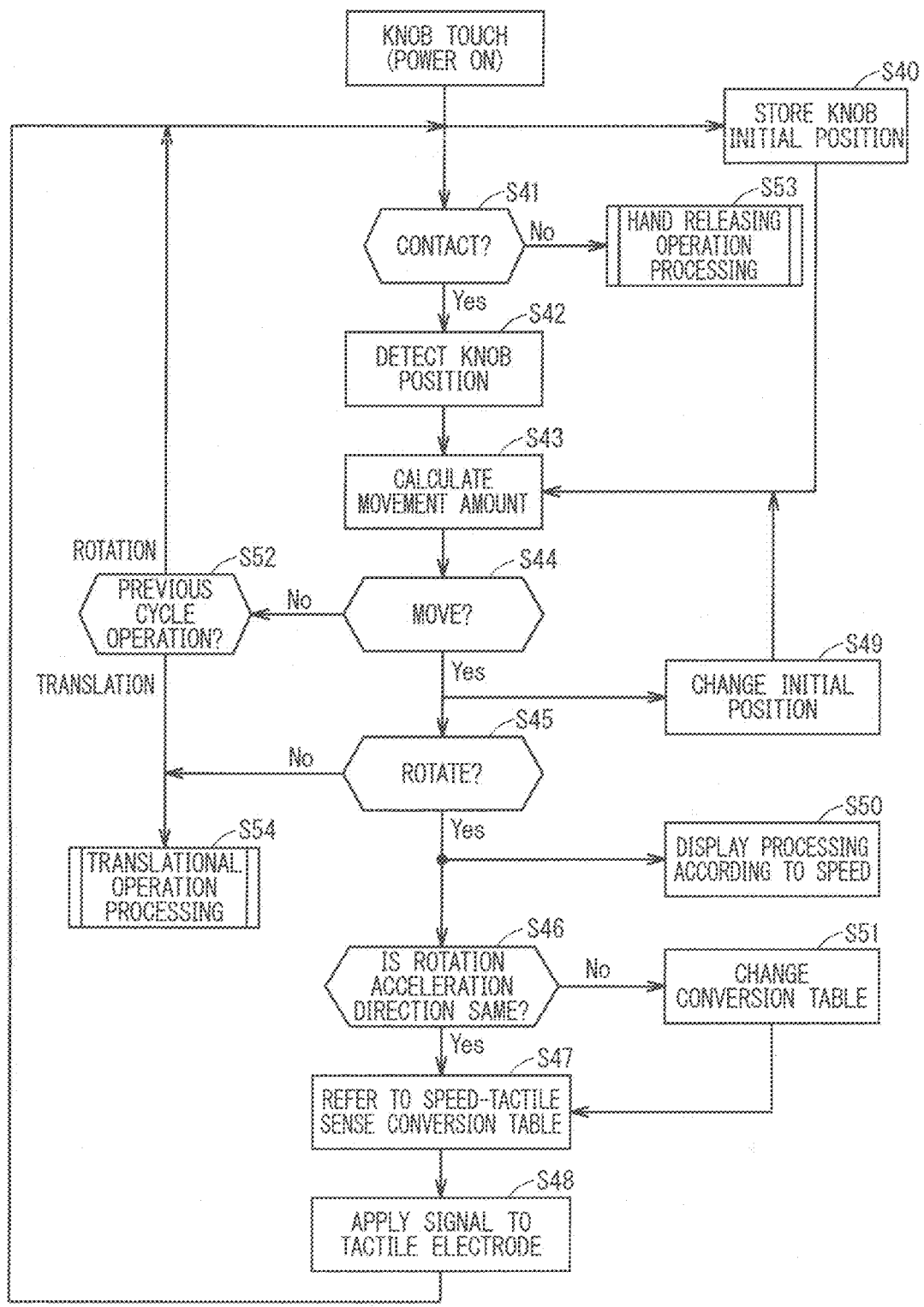
FIG. 58 is a flowchart illustrating processing of tactile presentation according to a second embodiment.

In FIG. 58, the synchronization processing is started when the indicator 2 (see FIG. 31) is in contact with the tactile presentation knob 3 (see FIG. 31) or power is applied to the tactile presentation touch panel 400 (power on), and position coordinates of the tactile presentation knob 3 on the touch panel 200 at the time the synchronization processing is started or at the time an initialization signal of the tactile presentation knob 3 is provided to the tactile presentation touch panel 400 are stored as an initial position (Step S40).

In a case where a contact state between the tactile presentation knob 3 and the indicator 2 is determined at a predetermined cycle (Step S41) and the tactile presentation knob 3 and the indicator 2 are determined not to be in contact with each other (in a case of No), it is determined that hand releasing operation is performed, and the processing proceeds to hand releasing operation processing (Step S53). In contrast, in a case where the contact state is determined (in a case of Yes), the position of the tactile presentation knob 3 on the touch panel 200 is detected, and current coordinates are acquired (Step S42). Then, a movement amount (rotation speed) of the tactile presentation knob 3 is calculated from the acquired current coordinates and initial coordinates (Step S43), and presence or absence of movement is determined from the movement amount (Step S44).

In a case where the tactile presentation knob 3 is determined not to be moved (in a case of No), whether operation in a previous cycle is rotation or translation is determined (Step S52). In the case of translation, the processing proceeds to translational operation processing (Step S54). In contrast, in the case of rotation, the processing proceeds to check of a contact state between the tactile presentation knob 3 and the indicator 2 in a next cycle.

In contrast, in a case where it is determined in Step S44 that the tactile presentation knob 3 is moving (in a case of Yes), whether or not rotation operation is performed is determined (Step S45). This determination is made by a method described with reference to FIG. 26, for example. In a case where it is determined that the operation is not the rotation operation (in a case of No), the operation is determined to be translational operation, and the processing proceeds to translational operation processing (Step S54). Further, in a case where the tactile presentation knob 3 is moving, an initial position in a next cycle is replaced with the current position of the tactile presentation knob 3, and a rotation speed in the next cycle is calculated.

In a case where the operation is determined to be the rotation operation (in a case of Yes) in Step S45, it is determined whether the rotation direction is the same as a rotation acceleration direction in the previous cycle (Step S46). In a case where it is determined to be the same as the rotation acceleration direction (in a case of Yes), the same speed-tactile sense conversion table as in the previous cycle is referred to (Step S47), and a signal is applied to the tactile electrode 102 (Step S48). Further, in the case of the rotation operation, display processing according to the rotation speed calculated in Step S43 is performed (Step S50).

Note that, as the speed-tactile sense conversion table used in Step S47, for example, in a case where a direction of accelerating rotation of the tactile presentation knob 3 is defined as an acceleration direction (first direction), and a direction of stopping rotation of the tactile presentation knob 3 is defined as a stop direction (second direction), a conversion table (first pattern) from a rotation speed in the acceleration direction to a tactile sense is obtained.

In contrast, in a case where it is determined in Step S46 that the rotation direction is not the same as the rotation acceleration direction in the previous cycle (in a case of No), the rotation is considered to be performed in the stop direction, and a change is made to a conversion table (second pattern) from a rotation speed for a deceleration direction to a tactile sense (Step S51), the changed speed-tactile sense conversion table is referred to (Step S47), and a signal is applied to the tactile electrode 102 (Step S48).

After voltage is applied to the tactile electrode 102, the processing proceeds to check of a contact state between the tactile presentation knob 3 and the indicator 2 in a next cycle.

In the first embodiment, since a rotation angle of the tactile presentation knob 3 is used as information on a movement amount, an operation feeling and the display screen are updated even in a case where the tactile presentation knob 3 is not moved. However, the rotation speed is zero in a case where the tactile presentation knob 3 is not moved. Therefore, in the second embodiment, in a case where there is no movement in the determination of movement and operation is determined to be the rotation operation in the determination of operation in a previous cycle, tactile sense formation and update of the display screen according to a rotation speed are not performed, and a next cycle is waited for.

Further, since calculation of a rotation speed is performed by comparison between the position in the previous cycle with the current position also in the movement amount calculation, the position of the tactile presentation knob 3 in the previous cycle is replaced as the initial position in a cycle after shifting from the initial state, and the rotation speed is calculated.

Note that in order to reduce an error due to influence of noise or the like, the rotation speed may be calculated using the positions of the tactile presentation knob 3 in a plurality of cycles. In a case where the positions of the tactile presentation knobs 3 in a plurality of cycles are used, for example, there are a moving average method and a frequency filtering method.

Figure 59:
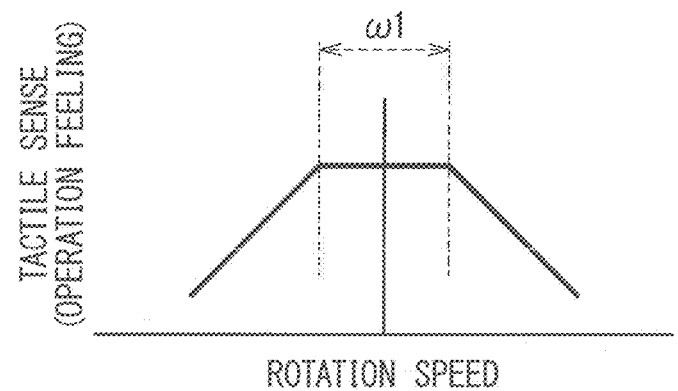
FIG. 59 is a diagram illustrating a conversion table of a rotation speed and a tactile sense (operation feeling) of the tactile presentation knob according to the second embodiment.

FIG. 59 illustrates an example of the speed-tactile sense conversion table used in Step S47 of FIG. 58. In FIG. 59, the conversion table is illustrated as a graph of a tactile sense (operation feeling) with respect to a rotation speed for the sake of convenience. In the graph, in a case where the rotation speed of the tactile presentation knob 3 is in the vicinity of zero, a state in which an operation feeling is high is maintained, and when a rotation speed increases, an operation feeling (resistance feeling) is lowered proportional to a rotation speed. A rotation speed width w 1 by which a state where an operation feeling is high is maintained and an inclination in a proportional portion may be appropriately set according to a display setting state, the size of the tactile presentation knob 3, and the like.

A particularly notable point in the conversion table of FIG. 59 is that the rotation speed becomes constant when a force for accelerating the rotation of the tactile presentation knob 3 and the resistance due to an operation feeling are balanced, and thus it is not necessary to intentionally increase the operation feeling in order to limit the range of the rotation speed.

Figure 60:
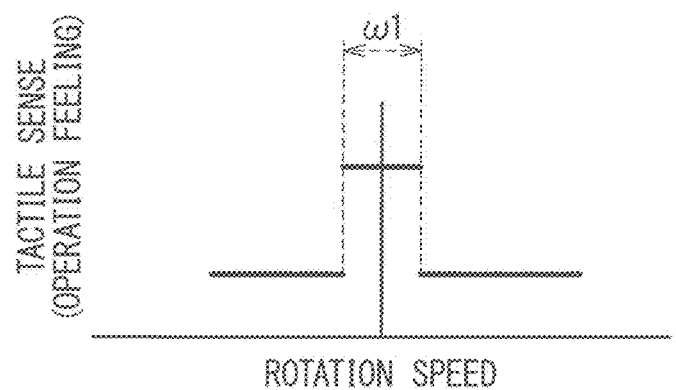
FIG. 60 is a diagram illustrating a conversion table of a rotation speed and a tactile sense (operation feeling) of the tactile presentation knob according to the second embodiment.

Note that an operation feeling at a rotation speed at which an operation feeling in a high state turns to be lowered may be discontinuous as in the conversion table illustrated in FIG. 60, and is effective for, for example, fast page feed operation of a document or the like in a case where it is desired to prevent erroneous operation at the start of rotation and lower the operation load during the rotation operation.

Figure 61:
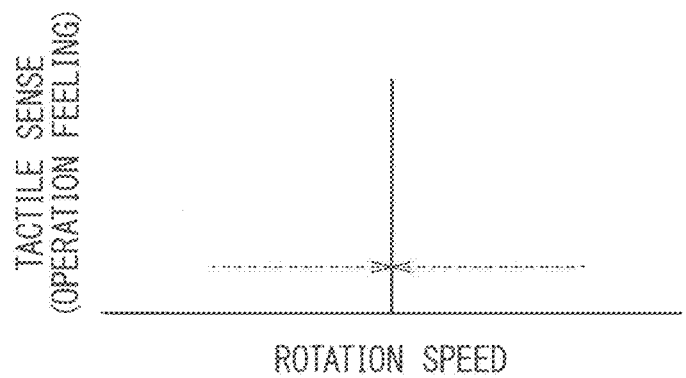
FIG. 61 is a diagram illustrating a conversion table of a rotation speed and a tactile sense (operation feeling) of the tactile presentation knob according to the second embodiment.

In contrast, when the rotation speed decreases, it is not necessary to return to the initial position as in the conversion table illustrated in FIG. 61, and thus, it is not necessary to form a different operation feeling in the vicinity of the rotation speed of zero.

Figure 62:
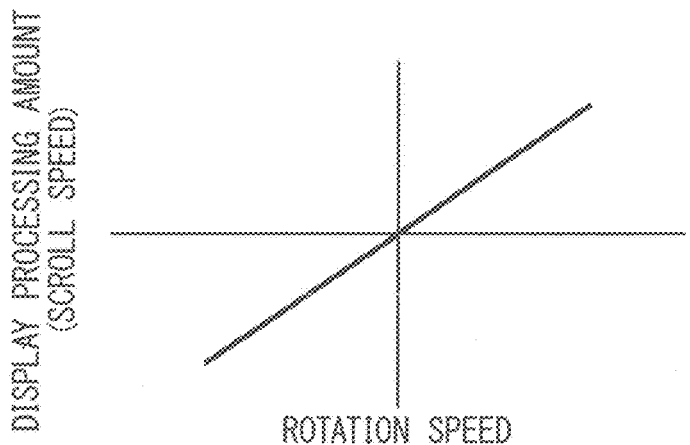
FIG. 62 is a diagram illustrating a conversion table of a rotation speed and a display processing amount of the tactile presentation knob according to the second embodiment.

As described above, the conversion table of a rotation speed and an operation feeling in the second embodiment is different from that in the first embodiment. However, a relationship between a rotation speed and a display processing amount in the second embodiment is represented by the graph of a rotation angle and a display processing amount (scroll speed) illustrated in FIG. 62, and is in the same pattern as the graph of a rotational angle and a display processing amount illustrated in FIG. 47. For example, by using the conversion table in a case where a continuous hit speed changes in accordance with a rotation speed or in a case where a motion speed of a character changes from walking to running, for example, according to a rotation speed in a game operation scene, or in a case where a reproduction speed of slow reproduction or fast-forward reproduction changes in accordance with a rotation speed in a moving image appreciation scene, it leads to a sense of unity between operation and the display screen.

Figure 63:
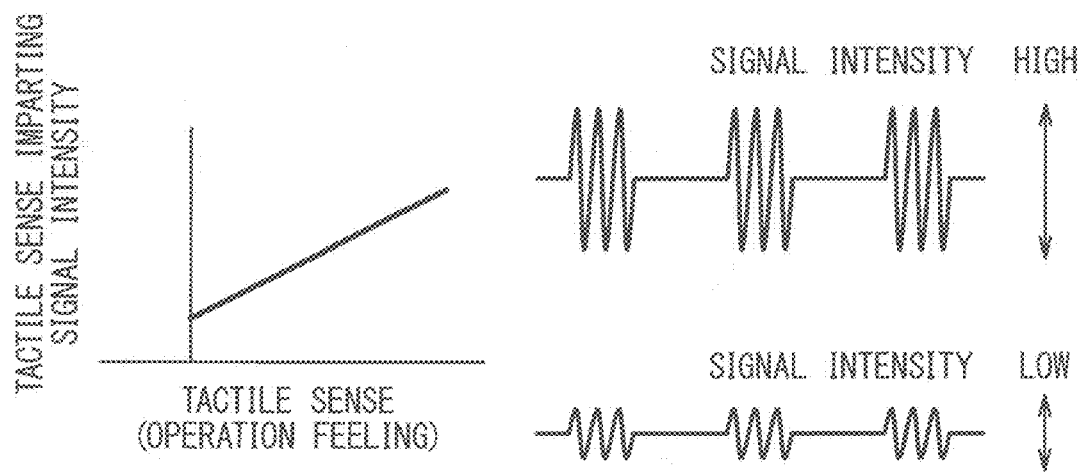
FIG. 63 is a diagram illustrating a conversion table between a tactile sense (operation feeling) and a tactile sense imparting signal of the tactile presentation knob according to the second embodiment.
Figure 64:
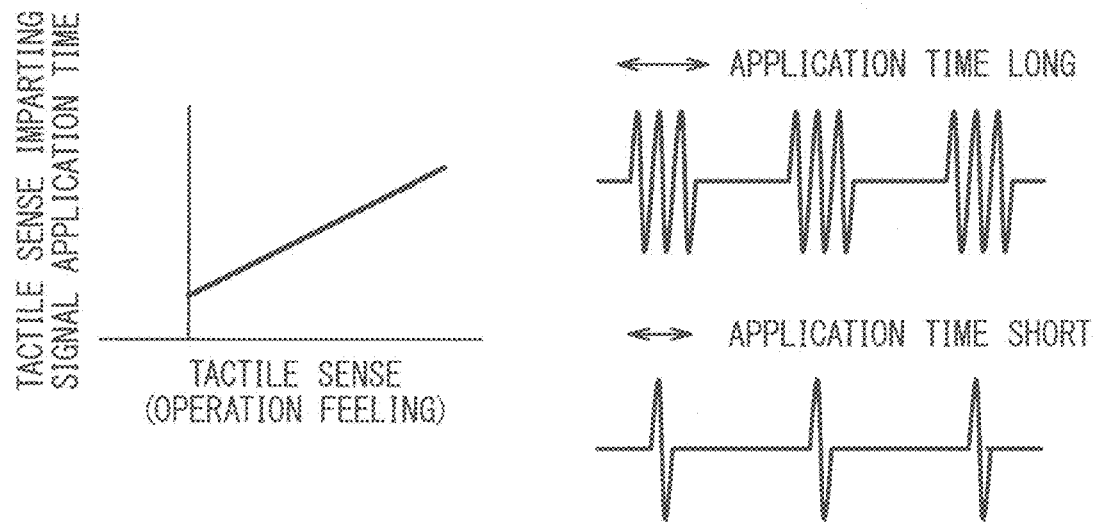
FIG. 64 is a diagram illustrating a conversion table between a tactile sense (operation feeling) and a tactile sense imparting signal of the tactile presentation knob according to the second embodiment.
Figure 65:
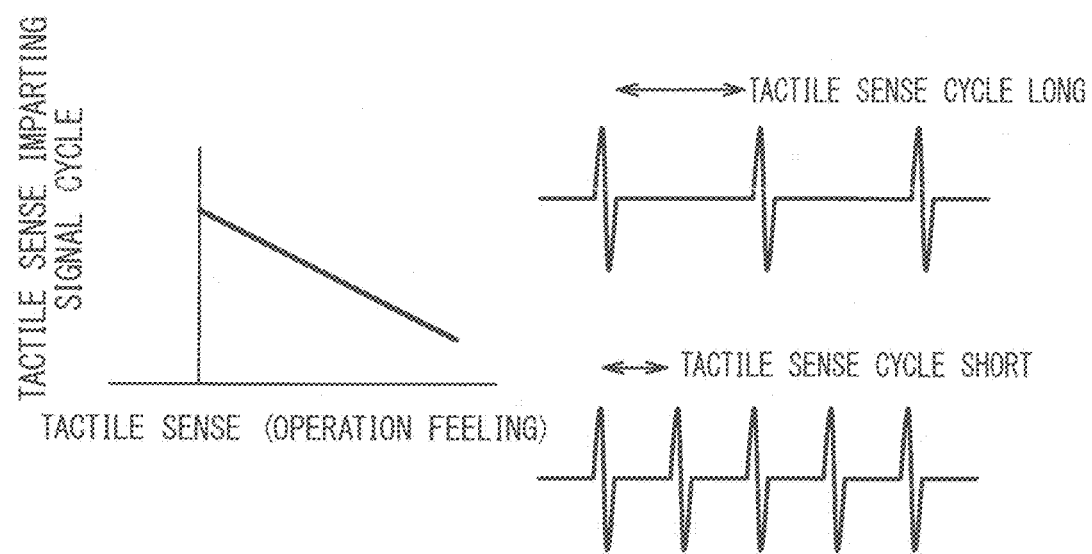
FIG. 65 is a diagram illustrating a conversion table between a tactile sense (operation feeling) and a tactile sense imparting signal of the tactile presentation knob according to the second embodiment.

FIGS. 63 and 65 illustrate examples of an operation feeling converted in the conversion table and a voltage application condition to the tactile electrode 102. A graph of the tactile sense imparting signal intensity with respect to a tactile sense (operation feeling) is illustrated on the left side of FIG. 63, a graph of tactile sense imparting signal application time with respect to a tactile sense (operation feeling) is illustrated on the left side of FIG. 64, a graph of a tactile sense imparting signal cycle with respect to a tactile sense (operation feeling) is illustrated on the left side of FIG. 65, and a waveform diagram of the tactile sense imparting signal is illustrated on the right side of all the diagrams.

In FIG. 63, a maximum value of tactile signal voltage to be applied is increased in accordance with improvement in an operation feeling as illustrated in the waveform diagram, and in FIG. 64, time for applying a tactile signal is increased in accordance with the improvement in an operation feeling as illustrated in the waveform diagram, and a method for forming a difference in a tactile sense is the same as that in the first embodiment.

In contrast, in FIG. 65, an operation feeling is reduced by increasing an output cycle of applied voltage for forming a tactile sense as illustrated in the waveform diagram. A tactile sense can be clearly changed by changing a cycle between applications of a tactile signal to be applied.

<Effect>

According to the second embodiment, when the user performs operation by using the tactile presentation knob 3 on the tactile presentation touch panel 400, a tactile sense of an operational feeling and an operation amount of the tactile presentation knob 3 is presented to the user, and the conversion table of a rotation amount and an operation feeling is appropriately set, so that the reliability of operation by erroneous operation prevention at a time point at which the tactile presentation knob 3 is touched and at the time of operation start can be obtained. Furthermore, display is updated according to an operation amount of the tactile presentation knob 3, so that a sense of fullness of operation can be further obtained.

<Effect of Combined Use of Rotation Speeds>

Note that, in the second embodiment, the configuration in which a rotation angle is replaced by a rotation speed as the information on a knob moving amount in the first embodiment is described. However, both the rotation angle and the rotation speed in the first embodiment and the second embodiment may be used. In this case, for example, processing of performing track name feed in an album of music based on a rotation angle, and alternately selecting track name feed and album feed by processing of a rotation angle by operation of rapidly increasing the rotation speed to a predetermined speed or more is performed, so that it is possible to present different tactile senses according to the way of operating the tactile presentation knob, and further, it is possible to obtain a sense of fullness of the operation.

Third Embodiment

FIG. 66 is a block diagram illustrating an outline of a relationship between a display panel, a touch panel, the tactile presentation panel, and a moving body according to a third embodiment. A relationship between the display panel, the touch panel, and the tactile presentation panel is the same as that in the first embodiment, and thus, description of the relationship is omitted, and different portions will be described.

Information on a movement amount (rotation angle) of the knob is output to a drive supply control circuit 611 (drive control circuit) in addition to the tactile sense formation condition conversion circuit 120 and the display screen processing circuit 321.

The drive supply control circuit 611 selects a drive supply condition corresponding to a movement amount of the knob in a pattern stored in advance in a drive control condition storage apparatus 612, and outputs drive condition data created based on the selected drive supply condition to a drive supply apparatus 610. The drive supply apparatus 610 controls a moving state of a moving body 600 based on the drive condition data.

FIG. 67 is a flowchart illustrating synchronization processing of a display change of the display panel according to a rotation amount of the tactile presentation knob 3 and a tactile sense obtained from the knob, and control of the moving body 600 described above. Note that the same step as that in the flowchart of the first embodiment illustrated in FIG. 39 is denoted by the same step number, and redundant description will be omitted.

In a case where it is determined in Step S5 of FIG. 67 that the operation is the rotation operation, display processing in accordance with the rotation angle calculated in Step S3 is performed (Step S9), and further, drive control of the moving body 600 in accordance with the rotation angle is performed (Step S110).

Further, in a case where it is determined in Step S11 that the operation is rotation, display processing in accordance with a rotation angle in a previous cycle is performed (Step S13), and further, drive control of the moving body 600 in accordance with the rotation angle of the previous cycle is performed (Step S111).

As described above, in the third embodiment, an operation feeling of the tactile presentation knob 3, change of the image display, and drive control of the moving body 600 can be performed according to the rotation angle of the tactile presentation knob 3.

Figure 68:
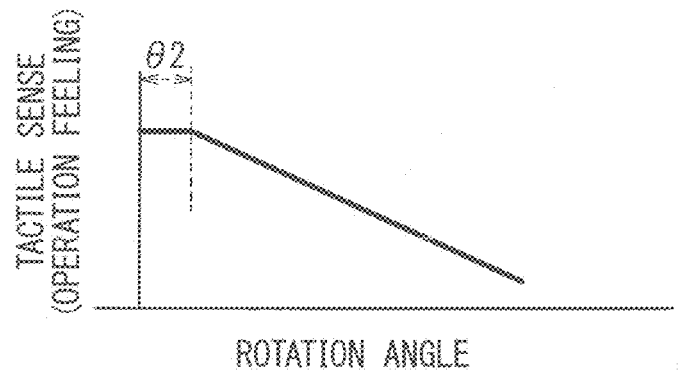
FIG. 68 is a diagram illustrating a conversion table of a rotation angle and a tactile sense (operation feeling) of the tactile presentation knob according to the third embodiment.

FIG. 68 illustrates an example of a conversion table from a rotation angle in the forward direction of the tactile presentation knob 3 to a tactile sense. In the third embodiment, since a moving state of the moving body 600 is controlled, as illustrated in FIG. 68, a graph in which a high operation feeling is presented in order to prevent erroneous operation until the rotation angle reaches a predetermined angle θ2 (first rotation angle) in the vicinity of the initial state and when θ2 is exceeded, the operation feeling is lowered as the rotation angle increases is obtained.

Figure 69:
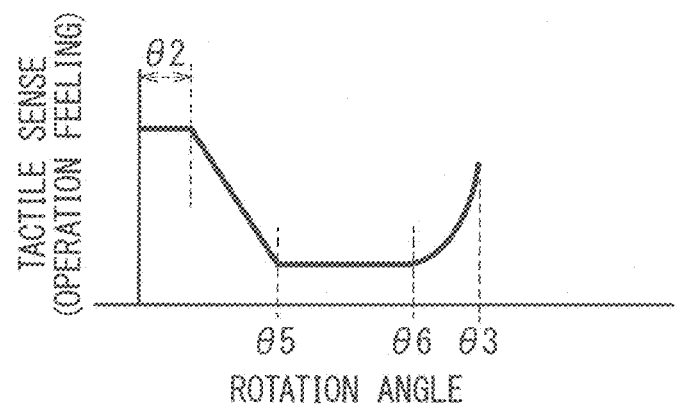
FIG. 69 is a diagram illustrating a conversion table of a rotation angle and a tactile sense (operation feeling) of the tactile presentation knob according to the third embodiment.

Similarly, another example of the conversion table from a rotation angle in the forward direction to a tactile sense is illustrated in FIG. 69. The table (graph) illustrated in FIG. 69 is a graph in which a decrease in an operation feeling after the rotation angle exceeds the predetermined angle θ2 in the vicinity of the initial state becomes constant when the rotation angle exceeds a predetermined angle θ5 (second rotation angle), and the operation feeling rapidly increases from a predetermined rotation angle θ6 (third rotation angle) close to a terminal of an operation range toward the rotation angle θ3 at the terminal of the operation range. This is a pattern that can be applied to operation of depressing an accelerator in a case where the moving body 600 is a vehicle or the like.

Figure 70:
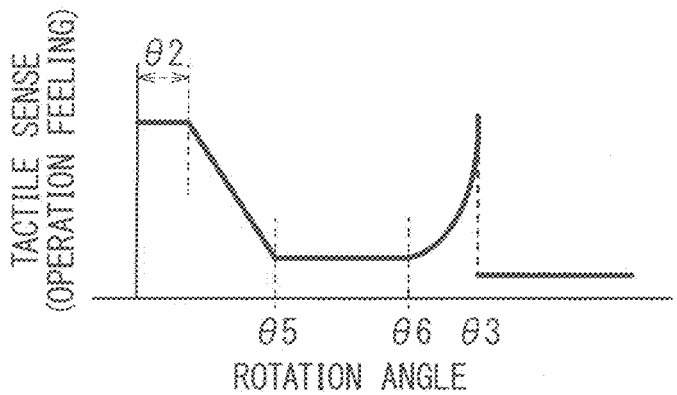
FIG. 70 is a diagram illustrating a conversion table of a rotation angle and a tactile sense (operation feeling) of the tactile presentation knob according to the third embodiment.

Similarly, another example of the conversion table from a rotation angle in the forward direction to a tactile sense is illustrated in FIG. 70. The table (graph) illustrated in FIG. 70 is a graph in which an operation feeling is greatly reduced beyond the rotation angle θ3 (fourth rotation angle) at the terminal of the operation range, and after that, the operation feeling is not changed. It is possible to know that the operation range is exceeded due to the disappearance of the operation feeling.

An example of the conversion table in a case where the rotation in the forward direction by the conversion table illustrated in FIG. 68 is changed to the rotation in the backward direction is illustrated in FIG. 71, an example of the conversion table in a case where the rotation in the forward direction by the conversion table illustrated in FIG. 69 is changed to the rotation in the backward direction is illustrated in FIG. 72, and an example of the conversion table in a case where the rotation in the forward direction by the conversion table illustrated in FIG. 70 is changed to the rotation in the backward direction is illustrated in FIG. 73.

In FIGS. 71 to 73, an operation feeling is set to a low state so as to facilitate the operation until the position reaches the initial position, and a clear operation feeling is provided in the initial state in order to allow returning to the initial state to be recognized. Note that, as in the conversion table of FIG. 52 illustrated in the first embodiment, the pattern may be such that an operation feeling is provided from the vicinity of the initial state.

Figure 74:
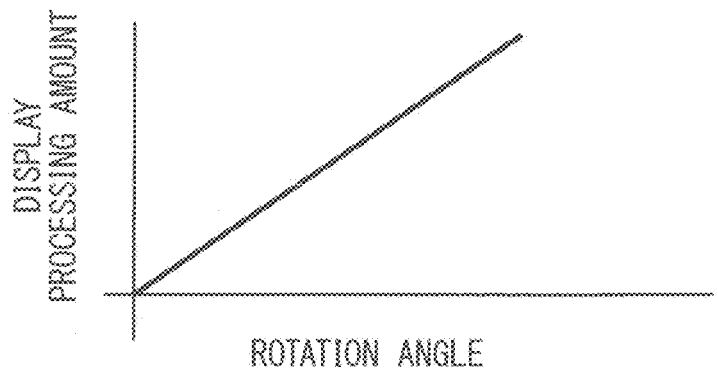
FIG. 74 is a diagram illustrating a conversion table of a rotation angle and a display processing amount of the tactile presentation knob according to the third embodiment.

Further, in the third embodiment, the provision of an operation feeling is linked with display operation and a drive control amount of the display panel. Further, the provision of an operation feeling by the conversion table illustrated in FIGS. 68 to 69 is represented by a graph of a rotation angle and a display processing amount as illustrated in FIG. 74, for example.

Figure 75:
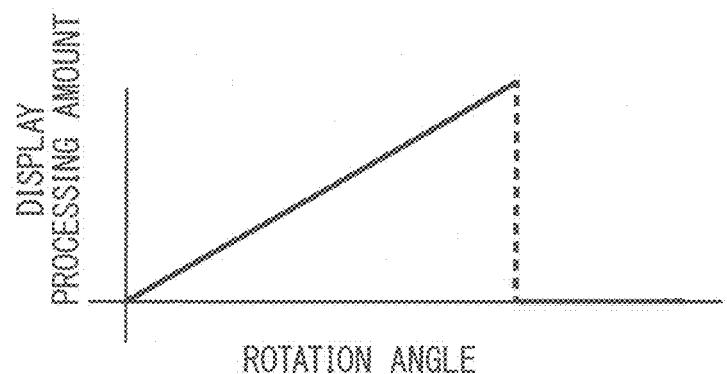
FIG. 75 is a diagram illustrating a conversion table of a rotation angle and a display processing amount of the tactile presentation knob according to the third embodiment.

Further, the provision of an operation feeling by the conversion table illustrated in FIG. 70 is represented by a graph of a rotation angle and a display processing amount as illustrated in FIG. 75, for example. When the rotation angle θ3, which is an operation range, is exceeded, the display processing is also in the initial state in conjunction with the disappearance of the operation feeling.

Figure 76:
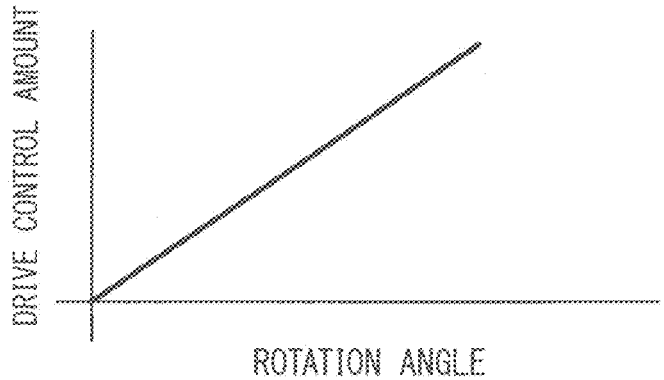
FIG. 76 is a diagram illustrating a conversion table of a rotation angle and a drive control amount of the tactile presentation knob according to the third embodiment.

In contrast, a drive control amount by the conversion table illustrated in FIGS. 68 to 69 is represented by a graph of a rotation angle and a drive control amount as illustrated in FIG. 76, for example.

Figure 77:
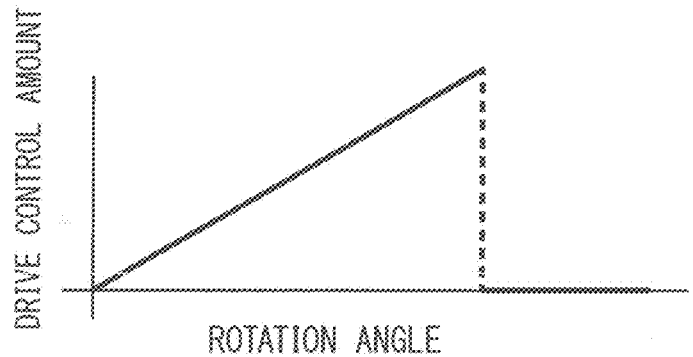
FIG. 77 is a diagram illustrating a conversion table of a rotation angle and a drive control amount of the tactile presentation knob according to the third embodiment.

Further, a drive control amount by the conversion table illustrated in FIG. 70 is represented by a graph of a rotation angle, a display processing amount, a drive control amount as illustrated in FIG. 77, for example. When the rotation angle θ3, which is an operation range, is exceeded, a drive control amount is also in the initial state in conjunction with the disappearance of the operation feeling. Note that setting a drive control amount to the initial state includes a state in which the moving body 600 can be safely controlled and operated depending on a drive target.

Examples of the moving body controlled in the third embodiment include an automobile, a railway vehicle, a ship, and a flying object in relation to driving operation. Examples include robots of agricultural equipment, construction equipment, processing equipment, and medical equipment in relation to drive operation of an accompanying tool, and can be used in a wide range of applications.

Therefore, it is necessary to assign the hand releasing operation processing and the translational operation processing in the processing flow of FIG. 67 and pushing operation processing described in a fourth embodiment to be described later to driving operation and tool operation, and the assignment information is stored in the drive control condition storage apparatus 612 (see FIG. 66).

Examples of operation stored as assignment of driving operation of an automobile or the like include driving force release (accelerator off), braking (brake), gear change shift-up, gear change shift-down, forward movement (driving device normal rotation), reverse movement (driving device reverse), flap-up, flap-down, right rotation, and left rotation.

Note that since operation related to movement of agricultural equipment, construction equipment, and processing equipment varies depending on the application, as a generalization method, an equipment name, a use application of equipment, and operation content are stored in the drive control condition storage apparatus 612 in a tree-like list. When the tactile presentation touch panel is installed in the equipment, corresponding equipment, application, and operation are selected from the list, and the correspondence between the operation of the equipment and the operation of the tactile presentation knob 3 is set, so that the conversion table of an operation amount (rotation angle and translation amount) of the tactile presentation knob 3 and the operation content of equipment can be used from the drive control condition storage apparatus 612.

Note that, in the third embodiment, description is made by assuming a movement amount of the knob as a rotation angle. Alternatively, the movement amount of the knob may be a rotation speed as in the second embodiment, or both a rotation angle and a rotation speed may be used.

Note that, in the first to third embodiments, only the tactile presentation knob 3 is shown as the input apparatus. However, in order to improve the safety of the moving body, for example, in a case where a proximity sensor, a human sensor, or the like is installed, a process of performing processing such as displaying an alarm screen, increasing an operation feeling in an acceleration direction, and decreasing a drive control amount by issuing an alarm based on danger prediction information using the danger prediction information from these sensors as an input may be added.

<Effect>

According to the third embodiment, in a case where various pieces of equipment are operated by the tactile presentation knob 3, it is possible to obtain reliability due to an operation feeling and to prevent erroneous operation. Further, since various operations are stored in advance, an operation panel and an operation lever can be simplified, and cost in designing and manufacturing of an apparatus can be reduced.

Fourth Embodiment

Figure 78:
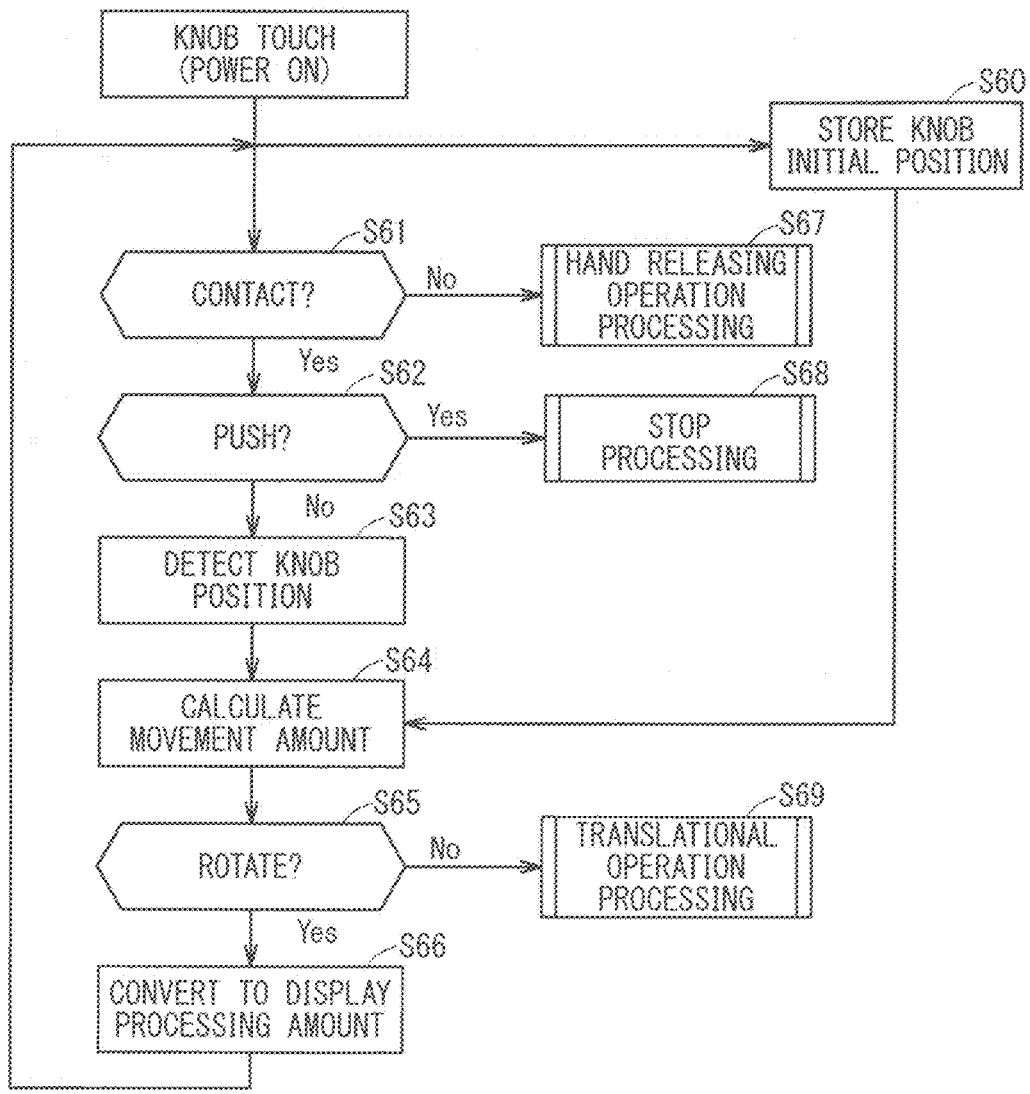
FIG. 78 is a flowchart illustrating processing of tactile presentation according to a fourth embodiment.

FIG. 78 is a flowchart illustrating synchronization processing of a display change of the display panel according to a rotation amount of the tactile presentation knob 3 and a tactile sense obtained from the knob. Note that, in FIG. 78, operation not related to the fourth embodiment is illustrated in a simplified manner.

The synchronization processing is started when the indicator 2 (see FIG. 31) is in contact with the tactile presentation knob 3 (see FIG. 31) or power is applied to the tactile presentation touch panel 400 (power on), and position coordinates of the tactile presentation knob 3 on the touch panel 200 at the time the synchronization processing is started or at the time an initialization signal of the tactile presentation knob 3 is provided to the tactile presentation touch panel 400 are stored as an initial position (Step S60).

In a case where a contact state between the tactile presentation knob 3 and the indicator 2 is determined at a predetermined cycle (Step S61) and the tactile presentation knob 3 and the indicator 2 are determined not to be in contact with each other (in a case of No), it is determined that hand releasing operation is performed, and the processing proceeds to hand releasing operation processing (Step S67).

In contrast, in a case where the tactile presentation knob 3 and the indicator 2 are determined to be in a contact state (in a case of Yes), it is determined whether operation of pushing the tactile presentation knob 3 is performed (Step S62). In a case where the operation of pushing the tactile presentation knob 3 is not performed (in a case of No), the position of the tactile presentation knob 3 on the touch panel 200 is detected, and current coordinates are acquired (Step S63). Then, a movement amount (rotation angle) of the tactile presentation knob 3 is calculated from the acquired current coordinates and initial coordinates (Step S64).

In contrast, in a case where it is determined in Step S62 that the operation of pushing the tactile presentation knob 3 is performed (in a case of Yes), processing that is performed according to the conversion table of a rotation angle and a display processing amount up to a previous cycle, for example, stop processing (Step S68) of setting an update speed setting (scrolling operation) of list display to zero is performed.

After a movement amount of the tactile presentation knob 3 is calculated in Step S64, whether or not rotation operation is performed is determined (Step S65). This determination is made by a method described with reference to FIG. 26, for example. In a case where it is determined that the operation is not the rotation operation (in a case of No), the operation is determined to be translational operation, and the processing proceeds to translational operation processing (Step S69). In contrast, in a case where the operation is determined to be the rotation operation (in a case of Yes), it is determined whether the rotation direction is the same as the rotation direction in the previous cycle (Step S6). Further, in a case of the rotation operation, the rotation angle calculated in Step S64 is converted into a display processing amount using the conversion table (Step S66).

Note that, for the processing performed according to the conversion table of a rotation angle and a display processing amount up to a previous cycle in a case where the operation of pushing the tactile presentation knob 3 is performed, in the first embodiment, a pattern that is not selected in the first embodiment may be selected from the pattern of screen display described with reference to FIGS. 40 and 41. For example, in a case where "current rotation angle storage"—"screen display update continuation" is selected as operation of the hand releasing operation processing, "rotation angle zero setting"—"screen display initialization" may be selected and assigned as pushing operation processing.

Further, in a case where a rotation angle corresponds to an item position in the display list, operation of selecting a corresponding item in the list may be performed. For example, the operation may be such that a facility corresponding to a rotation angle is displayed in a list in which facility names are arranged in order, and the displayed facility is registered as a destination in route guidance by the pushing operation.

Further, in a case of application to the third embodiment, operation processing of equipment corresponding to pushing operation stored in the drive control condition storage apparatus 612 (see FIG. 66) is performed.

Note that, in the fourth embodiment, description is made by assuming a movement amount of the knob as a rotation angle. Alternatively, the movement amount of the knob may be a rotation speed as in the second embodiment, or both a rotation angle and a rotation speed may be used.

<Effect>

According to the fourth embodiment, the pushing operation can be added to the display operation in addition to the rotating operation, the translation operation, and the hand releasing operation of the tactile presentation knob 3, so that versatility of the tactile presentation knob 3 can be expanded.

Fifth Embodiment

Figure 79:
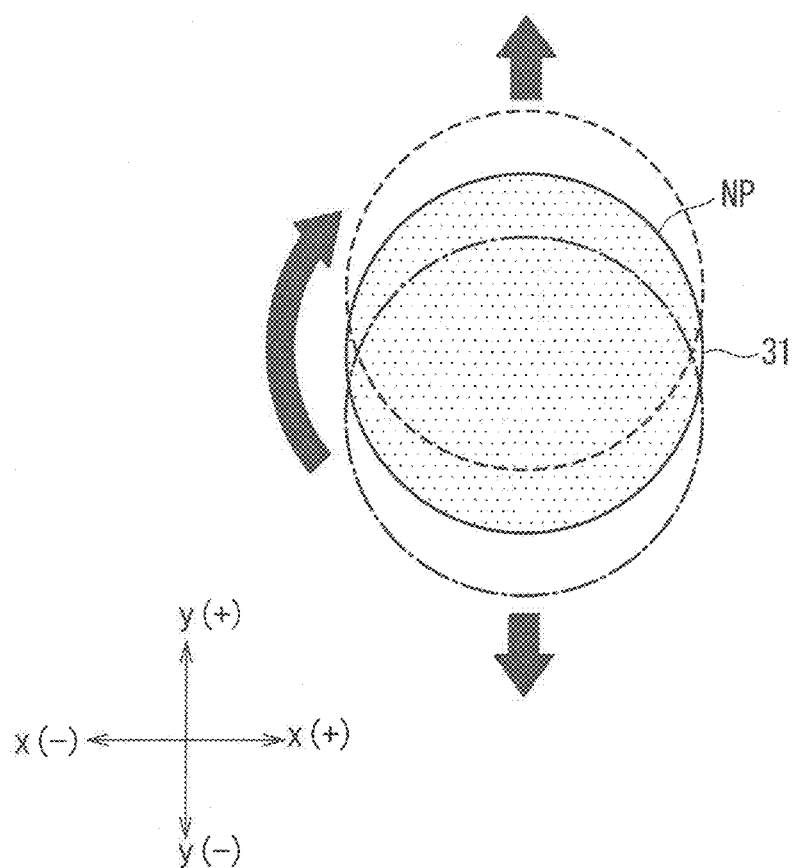
FIG. 79 is a diagram illustrating an operation image of the tactile presentation knob according to a fifth embodiment.

FIG. 79 is a diagram schematically illustrating operation of a tactile presentation knob 31 arranged on the tactile presentation touch panel according to a fifth embodiment. As illustrated in FIG. 79, the tactile presentation knob 31 has a configuration in which joystick-like operation in moving operation, that is, reciprocating operation of up, down, left, and right without rotation toward the surface of the tactile presentation touch panel can be performed. In this manner, in the tactile presentation knob 3 of the first to fourth embodiments, screen update (scrolling operation) is roughly performed by rotation operation for a list in which several tens of music titles are arranged for every five titles on a screen on which a selection target title and two titles before and after the selection target title are displayed. In contrast, in the fifth embodiment, detailed screen update (display frame advance) in minimum unit (for each title) can be performed by joystick operation of the tactile presentation knob 31. The detailed screen update in the minimum unit is performed, for example, in a case where joystick operation of moving the tactile presentation knob 31 in an upper direction (+y direction) is performed, it is moved to a next list item, and in a case where joystick operation of moving to a lower direction (−y direction) is performed, display processing of moving to a previous list item is performed.

Figure 80:
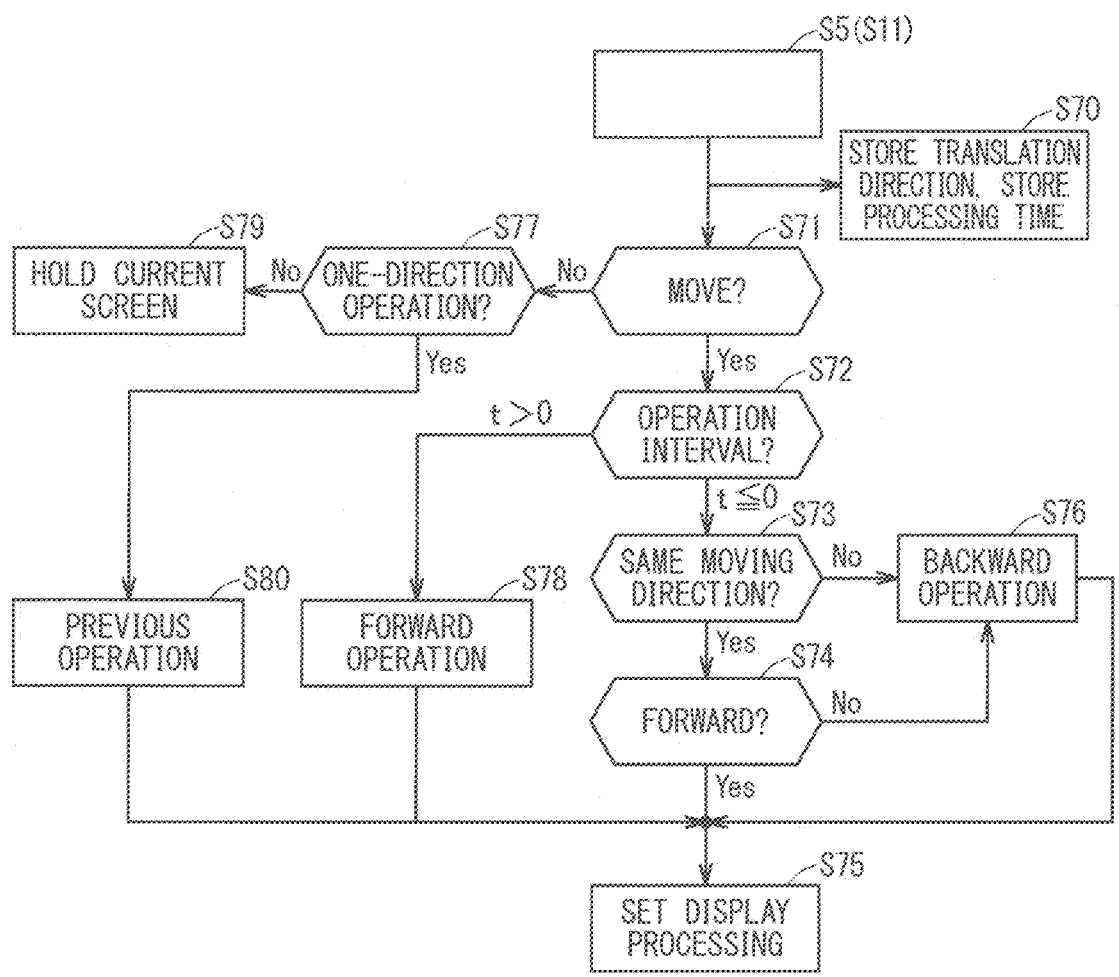
FIG. 80 is a flowchart illustrating display processing by operation of the tactile presentation knob according to the fifth embodiment.

FIG. 80 is a flowchart of display processing by the joystick operation. The joystick operation corresponds to the translational operation processing in the first to fourth embodiments, and corresponds to, for example, the translational operation processing in Step S15 proceeding from Step S5 or Step S11 in FIG. 39 of the first embodiment.

In a case of proceeding to the translational operation processing, a translation direction and processing time at the time of proceeding are stored (Step S70). Since there is a case where there is no movement from a previous cycle in the translational operation processing, whether or not there is movement is determined (Step S71). In a case where there is no movement (in a case of No), a current operation type is determined from the content of the conversion table of translational operation and display processing in the previous cycle illustrated in FIG. 82 (Step S77). In a case of a series of reciprocating operations (in a case of No), the display screen in the previous cycle, that is, the currently displayed display screen (current screen) is held (Step S79). In contrast, in a case of one-direction operation (in a case of Yes), the same display processing as the operation in the previous cycle is set based on the conversion table of a movement amount and display processing in the previous cycle (Step S80), and the set display processing is performed (Step S75).

In a case where it is determined in Step S71 that there is movement (in a case of Yes), a magnitude relationship between elapsed time t from previous movement and a predetermined interval t0 is determined, and it is determined whether a series of translational operations is performed or a new translational operation is performed (Step S72). Then, in a case where it is determined that new translational operation is performed (in a case of t>t0), the display processing of the forward operation is set based on the conversion table of a movement amount and display processing as the forward operation (Step S78), and the set display processing is performed (Step S75).

Figure 100:
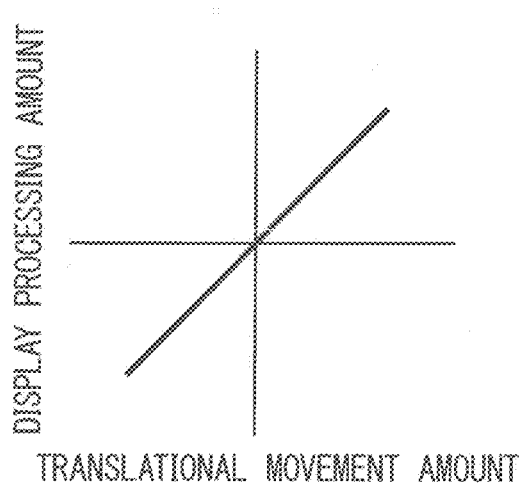
FIG. 100 is a diagram illustrating a conversion table of a translational movement amount and a display processing amount during one-way operation of the tactile presentation knob in the fifth embodiment.
Figure 101:
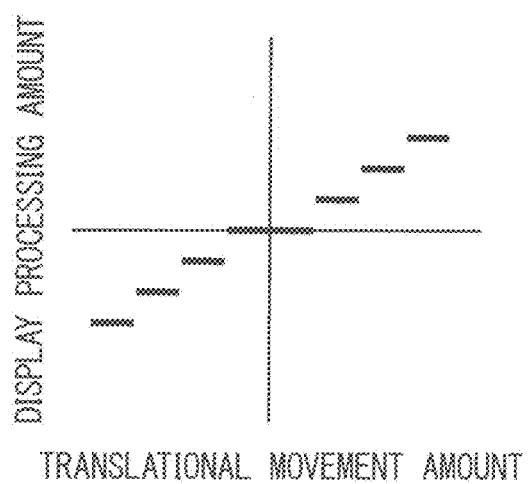
FIG. 101 is a diagram illustrating a conversion table of a translational movement amount and a display processing amount during one-way operation of the tactile presentation knob in the fifth embodiment.

In contrast, in a case where it is determined in Step S72 that a series of translational operations are performed (in a case of t≤t0), it is determined whether or not the corresponding operation is the same as a movement direction in the previous cycle (Step S73). In a case where the movement direction is not the same (in a case of No), display processing determined based on the operation type is set (Step S76), and the set display processing is performed (Step S75). In a case where the operation type is the one-direction operation, as illustrated in FIGS. 100 and 101, a display processing amount is set based on the conversion table of a translational movement amount and a display processing amount. That is, in FIG. 100, a display processing amount continuously changes with a change in a translational movement amount, and in FIG. 101, a display processing amount discretely changes with a change in a translational movement amount.

In contrast, in the case of a series of reciprocating operations, a predetermined display processing amount is set only in a cycle in which operation is turned from the forward operation to the backward operation, and a display processing amount is set to zero (display is not updated) in other cycles.

In contrast, in a case where the movement direction is the same in Step S73 (in a case of Yes), it is determined whether the moving route is the forward direction or the backward direction (Step S74), and in a case where the moving route is the forward direction (in a case of Yes), display processing determined based on an operation type is set, and the set display processing is performed (Step S75). In a case where the operation type is the one-direction operation, as illustrated in FIGS. 100 and 101, a translational movement amount and a display processing amount are set. That is, in FIG. 100, a display processing amount continuously changes with a change in a translational movement amount, and in FIG. 101, a display processing amount discretely changes with a change in a translational movement amount. In contrast, in the case of a series of reciprocating operations, the display processing amount is set to zero (the display is not updated).

In contrast, in a case where it is determined in Step S74 that the movement direction is in the backward direction (in a case of No), the same display processing as that in the case of changing the movement direction is set as the backward operation (Step S76), and the set display processing is performed (Step S75).

Figures 81, 82:
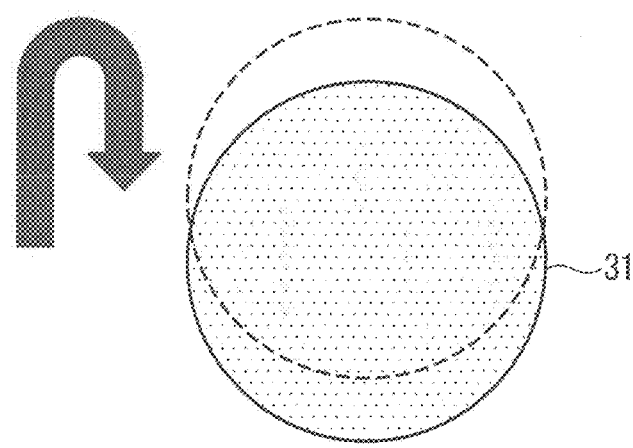
FIG. 81 is a diagram illustrating a series of translational operations of the tactile presentation knob according to the fifth embodiment.
FIG. 82 is a diagram illustrating a conversion table of update of display processing and operation of the tactile presentation knob according to the fifth embodiment.

FIG. 81 is a diagram schematically illustrating an example of a series of reciprocating operations of the tactile presentation knob 31. FIG. 81 illustrates joystick operation in which the tactile presentation knob 31 continuously performs the backward operation of moving in a direction opposite to the forward direction from the forward operation as indicated by an arrow.

Further, FIG. 82 illustrates a conversion table between update of the display screen and the display processing and operation of the tactile presentation knob 31. As illustrated in FIG. 82, in a case where the one-direction operation is performed, the display screen and the display processing are updated according to a translational movement amount, and in a series of reciprocating operations, the display screen and the display processing are updated only in a cycle in which the reversal of the route occurs.

Figure 83:
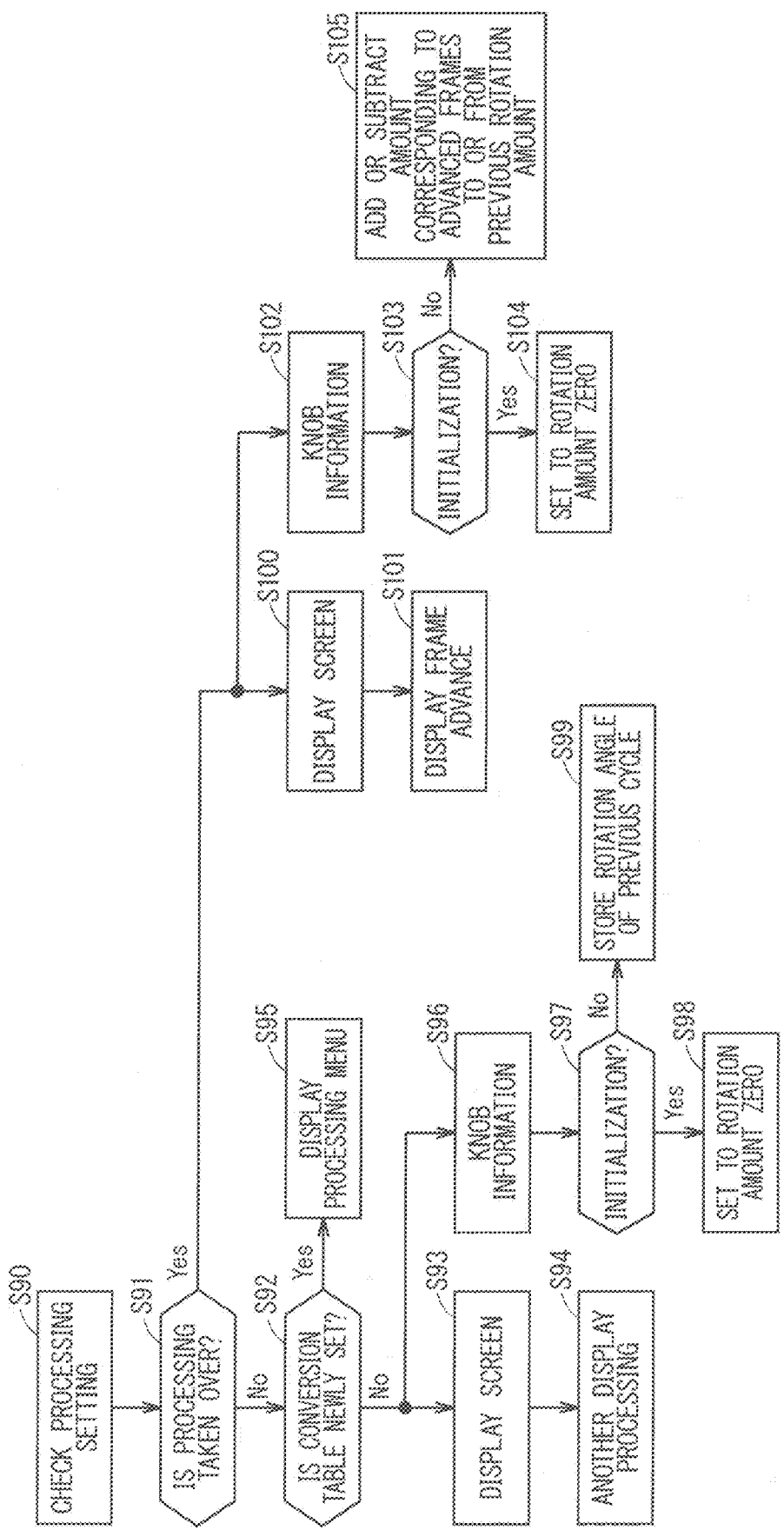
FIG. 83 is a flowchart illustrating an example of display processing by operation of the tactile presentation knob according to the fifth embodiment.

FIG. 83 is a flowchart illustrating an example of display processing by operation of the tactile presentation knob. In the processing of the translational operation as illustrated in FIG. 80, the setting of the translational operation is checked (Step S90), and it is determined whether or not to take over the processing based on the conversion table of a rotation angle and display processing (Step S91). Then, in a case where the processing is taken over (in a case of Yes), image processing performed by checking a display screen (Step S100) and processing of a rotation amount performed by checking knob information (Step S102) are performed.

As an example of the image processing, as illustrated in FIG. 101, list display feeding in a minimum unit, that is, display frame advance operation of moving and displaying items in a list arranged in order one by one is performed (Step S101). In contrast, for the processing of a rotation amount, it is determined whether to initialize or update rotation angle information on the basis of a preset condition (Step S103). In a case where it is determined that initialization is to be performed (in a case of Yes), a rotation angle of the tactile presentation knob 31 at the current position is set to the initial angle (zero) (Step S104). In contrast, in a case where it is determined that update is to be performed (in a case of No), a rotation amount corresponding to list display feed in the minimum unit is added to or subtracted from a rotation amount in a previous cycle to obtain a rotation angle at the current position (Step S105).

Even in a case where fine adjustment operation is performed by translational operation, it is possible to create a continuous feeling of update of screen display according to a rotation amount by rotation operation by the update processing in Step S105. For example, in operation of scrolling map display on a map screen and checking the topography and the like around a location, when a minimum scroll amount of the map display in the rotation operation is moved by 200 m, the minimum scroll amount is moved (by fine adjustment operation) in units of 10 m by performing the translational operation, and when the rotation operation is performed again, the movement can be started from a moved location by the fine adjustment operation. Note that a map scale at the time of the rotation operation and a map scale at the time of the translational operation may be changed according to a minimum scroll unit.

In contrast, in a case where it is determined in Step S91 that the processing based on the conversion table of a rotation angle and display processing is not taken over, it is determined whether or not to newly set the content of the conversion table of a movement amount and display processing (Step S92). Then, in the case of newly setting the content (in a case of Yes), a processing menu is displayed (Step S95), and the processing proceeds to selection operation in a next cycle. Note that the processing menu includes information stored in the display processing condition storage apparatus 322, information newly transmitted from the outside, and the like.

In contrast, in a case where it is determined in Step S92 that the content is not newly set (in a case of No), the display screen is checked (Step S93), and display processing is performed according to the conversion table of a movement amount and display processing that has already been set, and another display screen is displayed (Step S94).

Further, knob information is checked (Step S96), and it is determined whether to hold or initialize the movement information (rotation angle) of the tactile presentation knob 3 (Step S97). When it is determined to initialize the movement information (in a case of Yes), a rotation angle at the current position of the tactile presentation knob 31 is set to the initial angle (zero) (Step S98). In contrast, in a case where it is determined that the initialization is not performed (in a case of No), a rotation angle of a previous cycle is stored (Step S99).

Anther Application Examples

In the above description, the joystick operation is described using the fine adjustment operation of the list display feed. However, the joystick operation can be applied to other scenes. For example, in a case where route tracing is performed by rotation operation on a map information screen, a trace movement distance may be reduced to a predetermined ratio of that at the time of rotation by changing to joystick operation. Further, in a case where a list at the time of the rotation operation is displayed as large classification items, list movement of small classification items may be performed by the joystick operation.

In contrast, as an example of changing the processing, there is an example of changing trace processing at a point during tracing in the route tracing processing by the rotation operation to processing of scaling map information by the joystick operation.

<Effect>

According to the fifth embodiment, in addition to the rotating operation, the translation operation, the hand releasing operation, and the pushing operation of the tactile presentation knob, the joystick operation can be added to display operation content, so that versatility of the tactile presentation knob can be further expanded. Further, by applying the joystick operation to the fine adjustment processing of the rotation operation, it is possible to provide less stressful operation.

<Configuration of Tactile Presentation Knob Enabling Joystick Operation>

In a case where joystick-like operation is performed, it is difficult to realize the joystick-like operation with the tactile presentation knob to which a base of a shaft is fixed. The tactile presentation knob 31 of the fifth embodiment has a configuration described below in order to enable the joystick-like operation.

Figure 84:
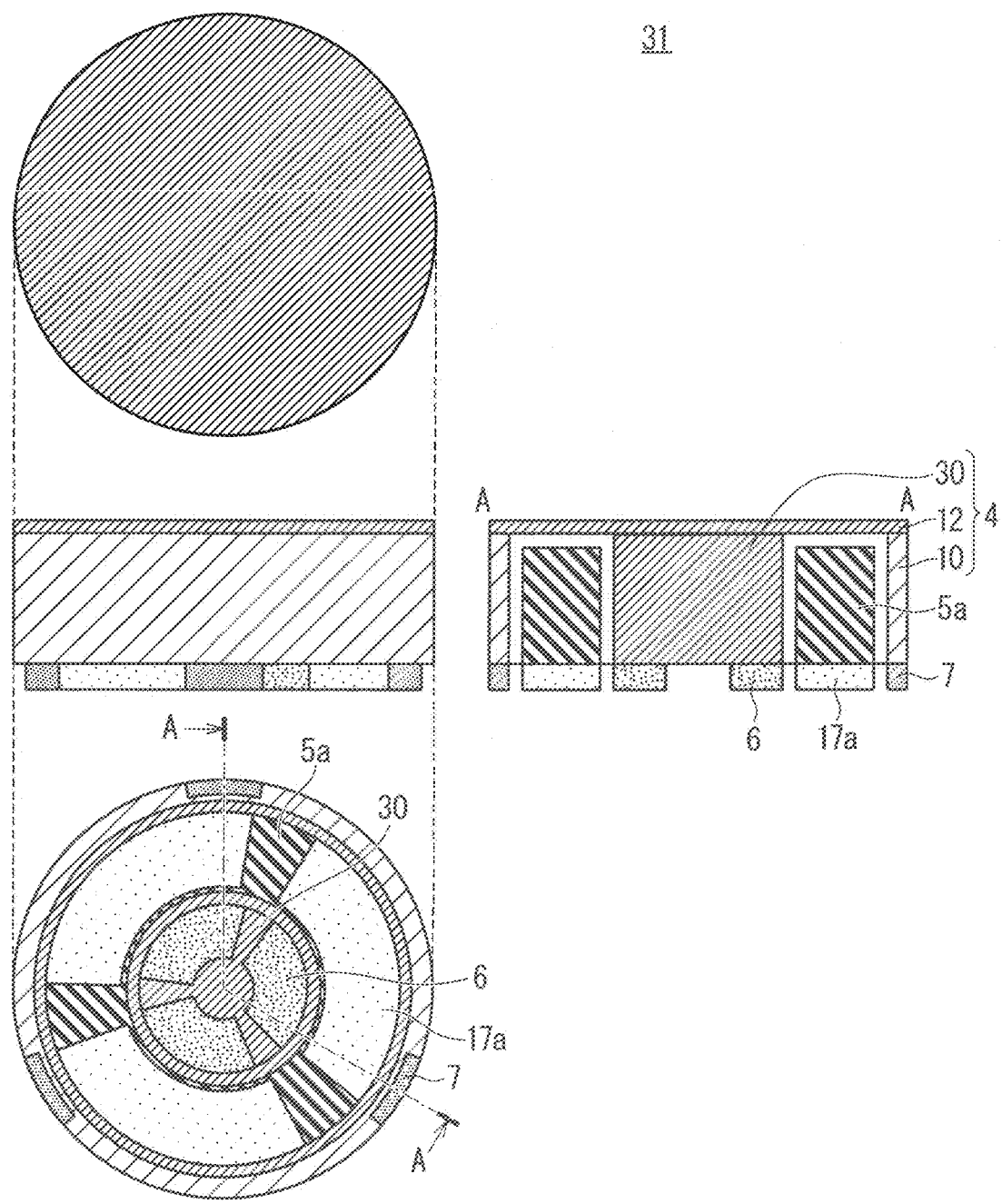
FIG. 84 is a diagram illustrating an example of a configuration of the tactile presentation knob according to the fifth embodiment.

FIG. 84 is a diagram illustrating an example of the configuration of the tactile presentation knob 31. A top view, a side view, and a bottom view are illustrated in this order from the top on the left side of the diagram, and a cross-sectional view in an arrow direction taken along line A-A in the bottom view is illustrated on the right side of the diagram.

As illustrated in FIG. 84, since the rotation shaft portion 5a is also movable, when the rotation portion 4 is rotated, the rotation shaft portion 5a is desirably not moved during the rotation in order to perform stable rotation operation. Therefore, a static force of the rotation shaft portion 5a when rotation portion 4 rotates is preferably larger than a static force of the rotation portion 4. That is, a region where the rotation shaft portion 5a is in contact with the tactile presentation panel is arranged outside a region where the rotation portion 4 is in contact with the tactile presentation panel as viewed from a rotation center. In contrast, in order to detect an optional position of the rotation portion 4 during the rotation operation, it is preferable that the position detection unit 7 be arranged at a position farther than the rotation center for calculation of a rotation amount, and the position detection unit 7 is configured to be provided in the vicinity of the outer periphery of the tactile presentation knob 31.

The rotation portion 4 includes a rotation portion inner shaft portion 30 (first rotating body), a rotation portion side surface 10 (second rotating body), and a rotation portion upper surface plate 12, and the rotation shaft portion 5a is provided so as to surround the rotation portion inner shaft portion 30. A plurality of the conductive elastic portions 6 having a fan shape in plan view are provided on a bottom surface of the rotation portion inner shaft portion 30, and a plurality of shaft structure holding portions 17a (first structure holding portions) having a fan shape in plan view are provided on a bottom surface of the rotation shaft portion 5a.

Providing a plurality of the position detection units 7 improves the accuracy of position detection of the tactile presentation knob 31, and providing a plurality of the shaft structure holding portions 17a enables holding of the tactile presentation knob 31 without hindering movement of the tactile presentation knob 31.

With such a configuration, the tactile presentation knob 31 allows joystick operation.

Figure 85:
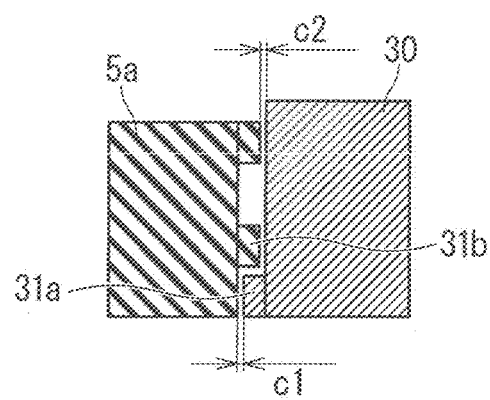
FIG. 85 is a diagram illustrating a partial configuration of the tactile presentation knob according to the fifth embodiment.

Further, since the rotation shaft portion 5a is detachable from the tactile presentation panel, a structure in which a shaft portion projection 31b is formed on an inner wall of the rotation shaft portion 5a, and a rotation portion projection 31a is formed on an outer wall of the rotation portion inner shaft portion 30 may be employed as illustrated in FIG. 85, for example, so that the rotation shaft portion 5a and the rotation portion 4 are not detached from each other.

Note that clearance c1 between the rotation shaft portion 5a and the rotation portion projection 31a and clearance c2 between the rotation portion inner shaft portion 30 and the shaft portion projection 31b are in the same range as the inner diameter dimensional tolerance 0 to +0.5 mm of the fixing hole 9 of the tactile presentation knob 3 described in the first embodiment. In this manner, the rotation portion 4 can smoothly rotate.

Figure 86:
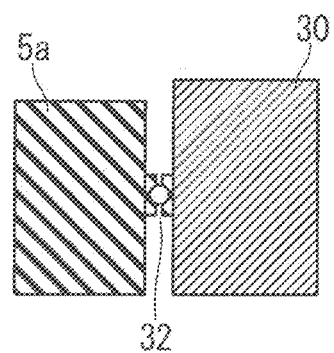
FIG. 86 is a diagram illustrating a partial configuration of the tactile presentation knob according to the fifth embodiment.

Further, as illustrated in FIG. 86, a bearing 32 may be provided between the rotation portion inner shaft portion 30 and the rotation shaft portion 5a to connect the rotation shaft portion 5a and the rotation portion 4. By employing the above configuration, rattling due to a gap between the rotation shaft portion 5a and the rotation portion inner shaft portion 30 and a frictional force between each other at the time of contact are reduced, so that unintended movement of the rotation shaft portion 5a can be suppressed.

Figure 87:
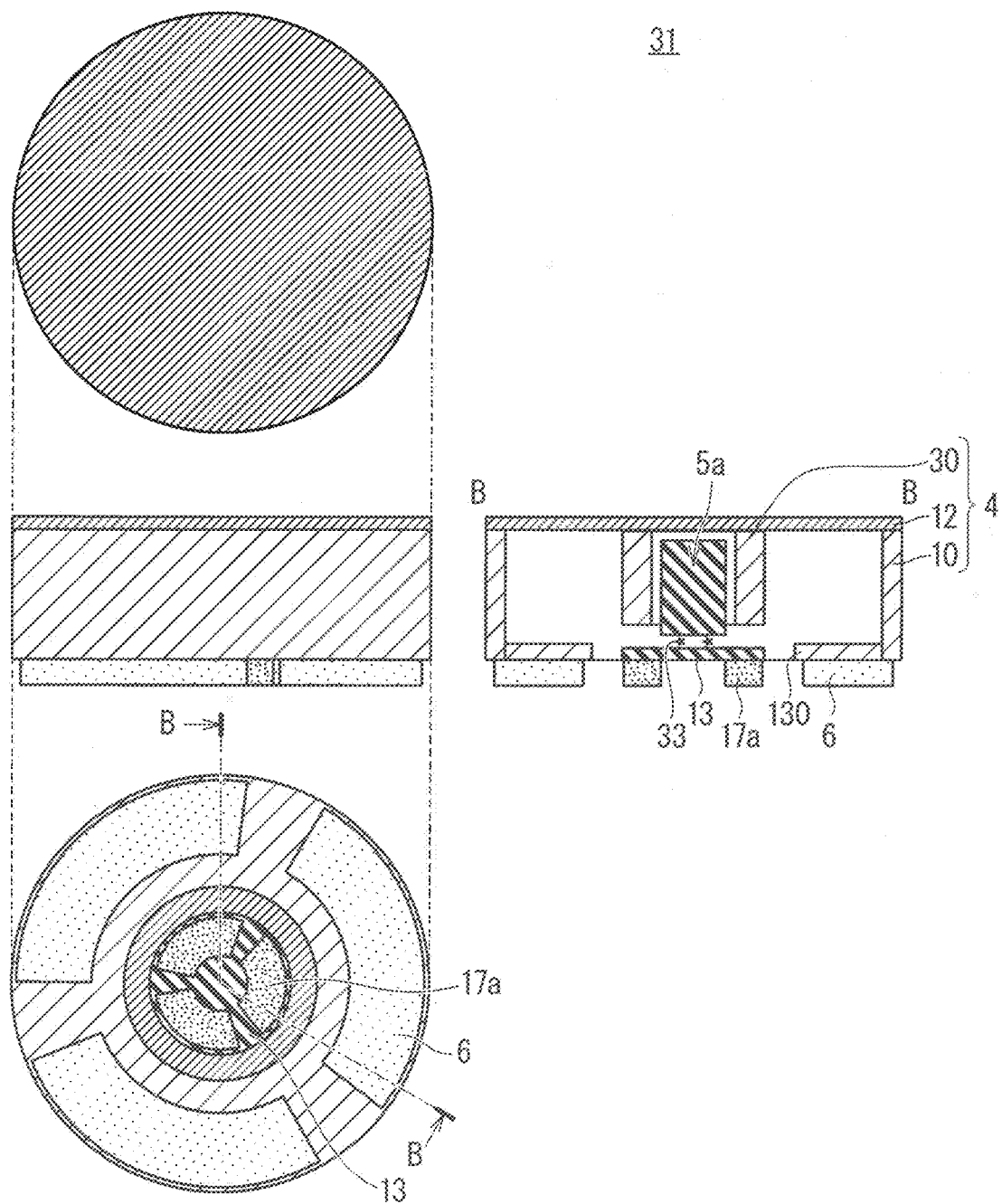
FIG. 87 is a diagram illustrating an example of a configuration of the tactile presentation knob according to the fifth embodiment.

FIG. 87 is a diagram illustrating another example of the configuration of the tactile presentation knob 31, and the arrangement in the diagram is the same as that in FIG. 84. In FIG. 87, the rotation shaft portion 5a is provided inside the rotation portion inner shaft portion 30, and the shaft portion 14 of the rotation shaft portion 5a is surrounded by the rotation portion inner shaft portion 30. Then, the shaft portion 14 and the fixing table 13 are connected via an elastic member 33. For this reason, the rotation portion 4 can be moved forward, backward, left, and right. Note that, as a type of the elastic member 33, a combination of a coil spring and a flat plate spring is suitable.

A plurality of shaft structure holding portions 17a having a fan shape in plan view are provided on a bottom surface of the fixing table 13, and a plurality of conductive elastic portions 6 having a fan shape in plan view are provided on a rotation portion bottom surface 130 on the outer side than the shaft structure holding portion 17a.

Figure 88:
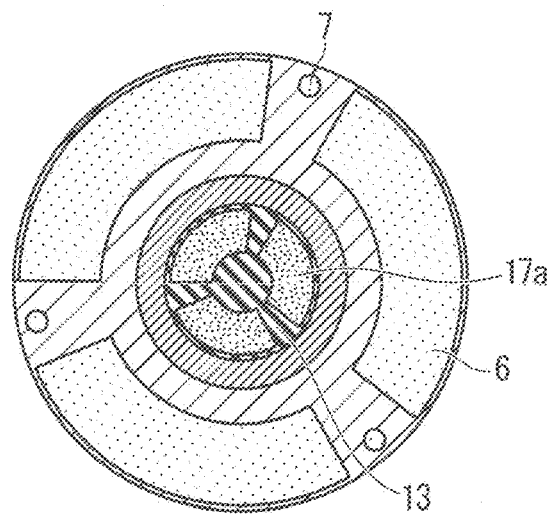
FIG. 88 is a diagram illustrating an example of a configuration of the tactile presentation knob according to the fifth embodiment.

In a case of employing such a configuration, the conductive elastic portion 6 can be used as the position detection unit 7. However, as illustrated in FIG. 88, a plurality of the position detection units 7 may be provided at positions sandwiched by the conductive elastic portions 6 on the rotation portion bottom surface 130 as far as possible from a rotation center. By providing a plurality of the position detection units 7, accuracy of the detection of a rotation angle is improved.

Figure 89:
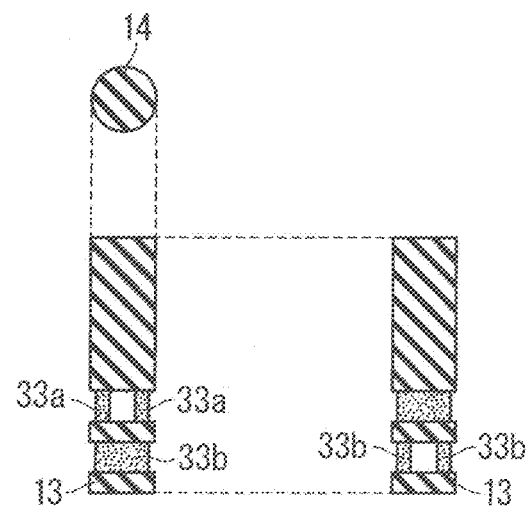
FIG. 89 is a diagram illustrating a partial configuration of the tactile presentation knob according to the fifth embodiment.

FIG. 89 is a diagram illustrating an example of a configuration of the elastic member 33 that connects the shaft portion 14 and the fixing table 13, and illustrates a side view and a top view in two directions in a state where the shaft portion 14 and the fixing table 13 are connected by the elastic member 33.

As illustrated in FIG. 89, the elastic member 33 includes a left and right bending leaf spring 33a (first flat plate spring) and a front and rear bending leaf spring 33b (second flat plate spring), and can move the rotation portion 4 forward, backward, left, and right. Note that, although FIG. 89 illustrates an example in which the left and right bending leaf spring 33a is arranged on the shaft portion 14 side and the front and rear bending leaf spring 33b is arranged below the left and right bending leaf spring 33a, the leaf springs may be arranged upside down.

Figure 90:
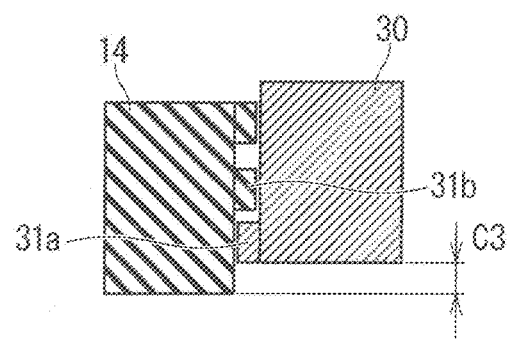
FIG. 90 is a diagram illustrating a partial configuration of the tactile presentation knob according to the fifth embodiment.

Further, since the rotation shaft portion 5a is detachable from the tactile presentation panel, a structure in which the shaft portion projection 31b is formed on an outer wall of the shaft portion 14, and the rotation portion projection 31a is formed on an inner wall of the rotation portion inner shaft portion 30 may be employed as illustrated in FIG. 90, for example, so that the rotation shaft portion 5a and the rotation portion 4 are not detached from each other.

In this case, as a bottom surface of the shaft portion 14 and a bottom surface of the rotation portion inner shaft portion 30 are configured to be separated by a distance c3, it is possible to prevent the rotation portion projection 31a from protruding to a portion forming the elastic member 33 on the fixing table 13 side by operation of the tactile presentation knob 31.

In a case of employing a configuration in which the shaft portion 14 and the fixing table 13 are connected by the elastic member 33, there is a possibility that the shaft portion 14 comes into contact with the rotation portion 4 in an inclined state by the elastic member 33, and there is a possibility that the rotation of the rotation portion 4 is hindered when the shaft portion 14 is inclined. In view of the above, as illustrated in FIG. 91, a shaft portion 34 (second rotation shaft) is provided outside the shaft portion 14 (first rotation shaft), and the rotation portion 4 is provided outside the shaft portion 34. By providing the shaft portion 34, it is possible to suppress the influence of a case where the shaft portion 14 is inclined. Note that a shaft structure holding portion 35 (second structure holding portion) protruding toward the tactile presentation panel side is provided on a bottom outer edge of the shaft portion 34, and contributes to holding of the shaft portion 34.

Figure 92:
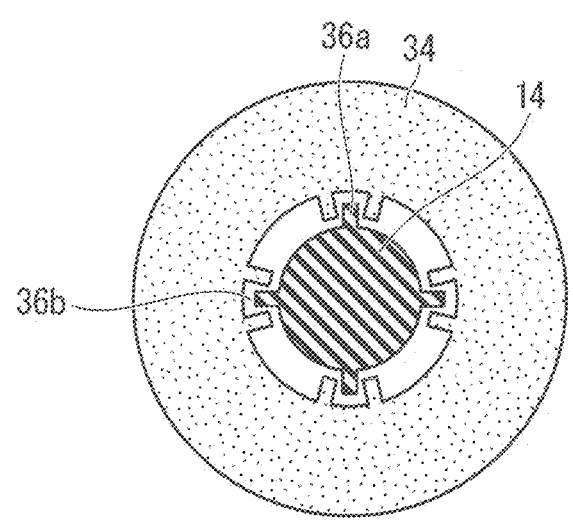
FIG. 92 is a diagram illustrating a partial configuration of the tactile presentation knob according to the fifth embodiment.

Further, as illustrated in FIG. 92, in a case where a shaft portion guide 36a (first shaft portion guide) that changes its shape along the shaft portion 34 in a case where the shaft portion 14 is inclined may be provided on a side surface of the shaft portion 14, and a shaft portion guide 36b (second shaft portion guide) may be provided at a position corresponding to the shaft portion guide 36a on an inner surface of the shaft portion 34 so as to sandwich the shaft portion guide 36a. The engagement of the shaft portion guide 36a and the shaft portion guide 36b contributes to the holding of the shaft portion 34.

Figure 93:
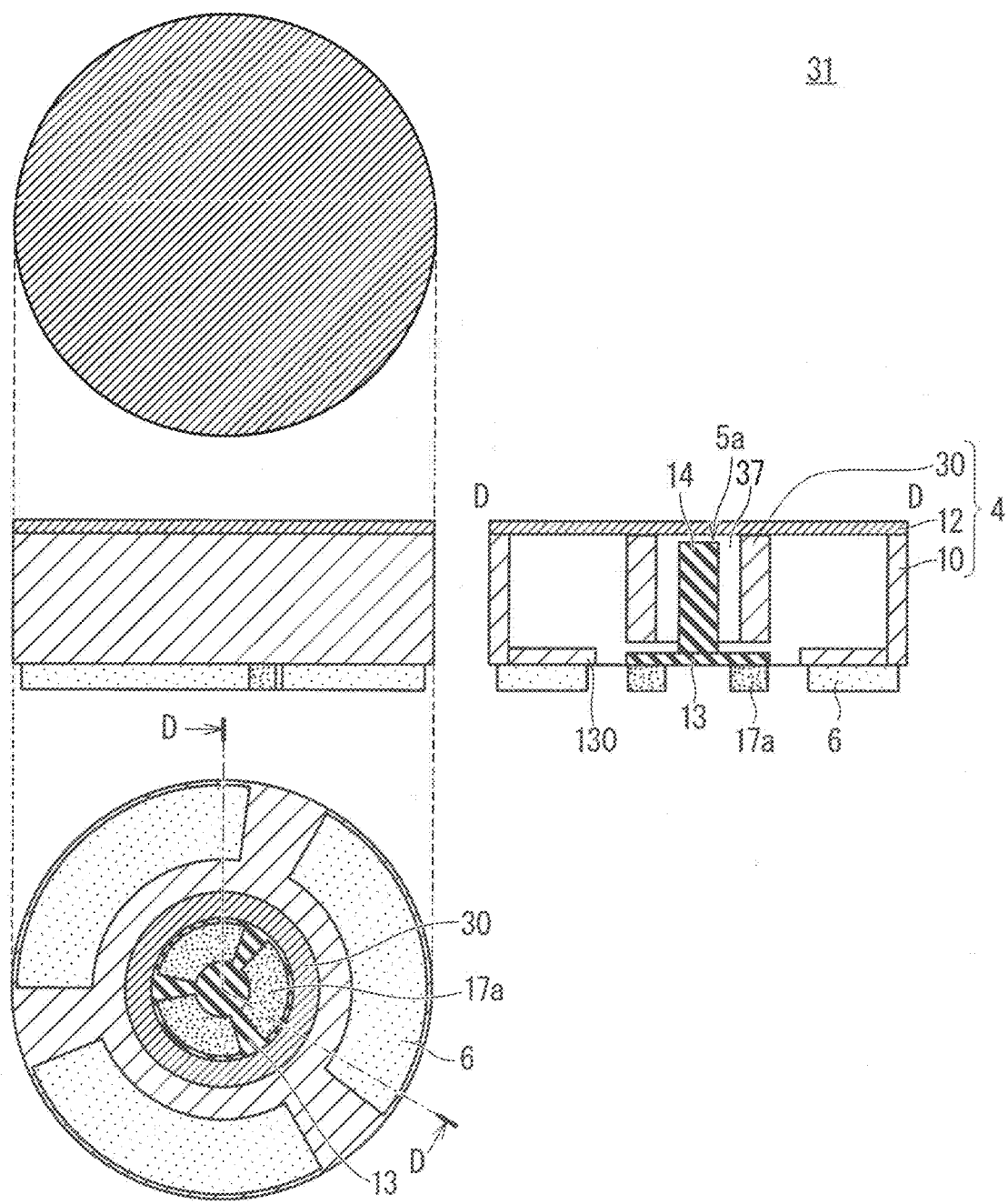
FIG. 93 is a diagram illustrating an example of a configuration of the tactile presentation knob according to the fifth embodiment.

FIG. 93 is a diagram illustrating another example of the configuration of the tactile presentation knob 31. A top view, a side view, and a bottom view are illustrated in this order from the top on the left side of the diagram, and a cross-sectional view in an arrow direction taken along line D-D in the bottom view is illustrated on the right side of the diagram.

As illustrated in FIG. 93, the shaft portion 14 is connected to the fixing table 13, the shaft portion 14 is inserted into a hollow portion of the rotation portion inner shaft portion 30 and has a gap 37 with the rotation portion inner shaft portion 30, and the rotation portion 4 is configured to be able to be moved back and forth and right and left within a distance range of the gap 37.

Figure 94:
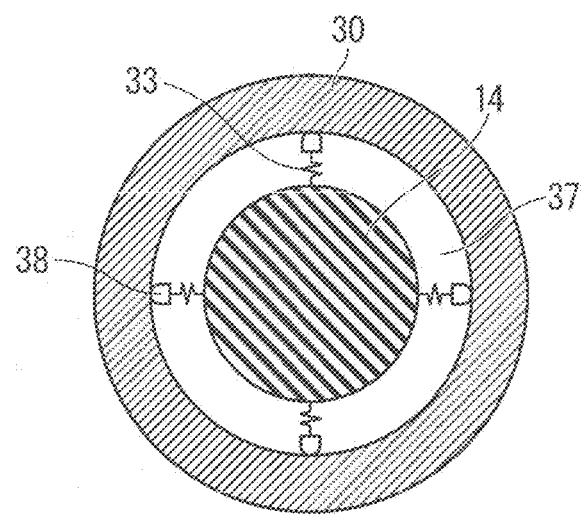
FIG. 94 is a diagram illustrating a partial configuration of the tactile presentation knob according to the fifth embodiment.

Note that, in order to form a feeling of returning a joystick, a suspension may be formed in the gap 37 as illustrated in FIG. 94. As the suspension, a plurality of the elastic members 33 are connected to a side surface of the shaft portion 14, and a sliding portion 38 that contacts an inner surface of the rotation portion inner shaft portion 30 of the rotation portion 4 during rotation to reduce catching is provided at the tip of the elastic member 33. The suspensions are provided at at least two or more locations, and are arranged so that forces by the elastic members 33 are balanced.

Figure 95:
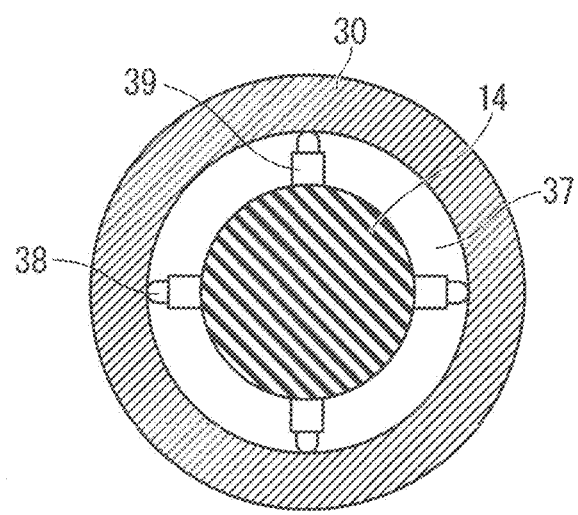
FIG. 95 is a diagram illustrating a partial configuration of the tactile presentation knob according to the fifth embodiment.

Further, as illustrated in FIG. 95, a plurality of piezoelectric elements 39 may be arranged on a side surface of the shaft portion 14, and operation in a translation direction may be configured to be detected by a motion detection circuit separately provided on the tactile presentation touch panel side by using voltage information of the piezoelectric elements 39. Note that, since the tactile presentation knob 31 is separated from the motion detection circuit provided on the tactile presentation touch panel side, a signal is preferably transmitted to the motion detection circuit using an electromagnetic field or the like.

Figure 96:
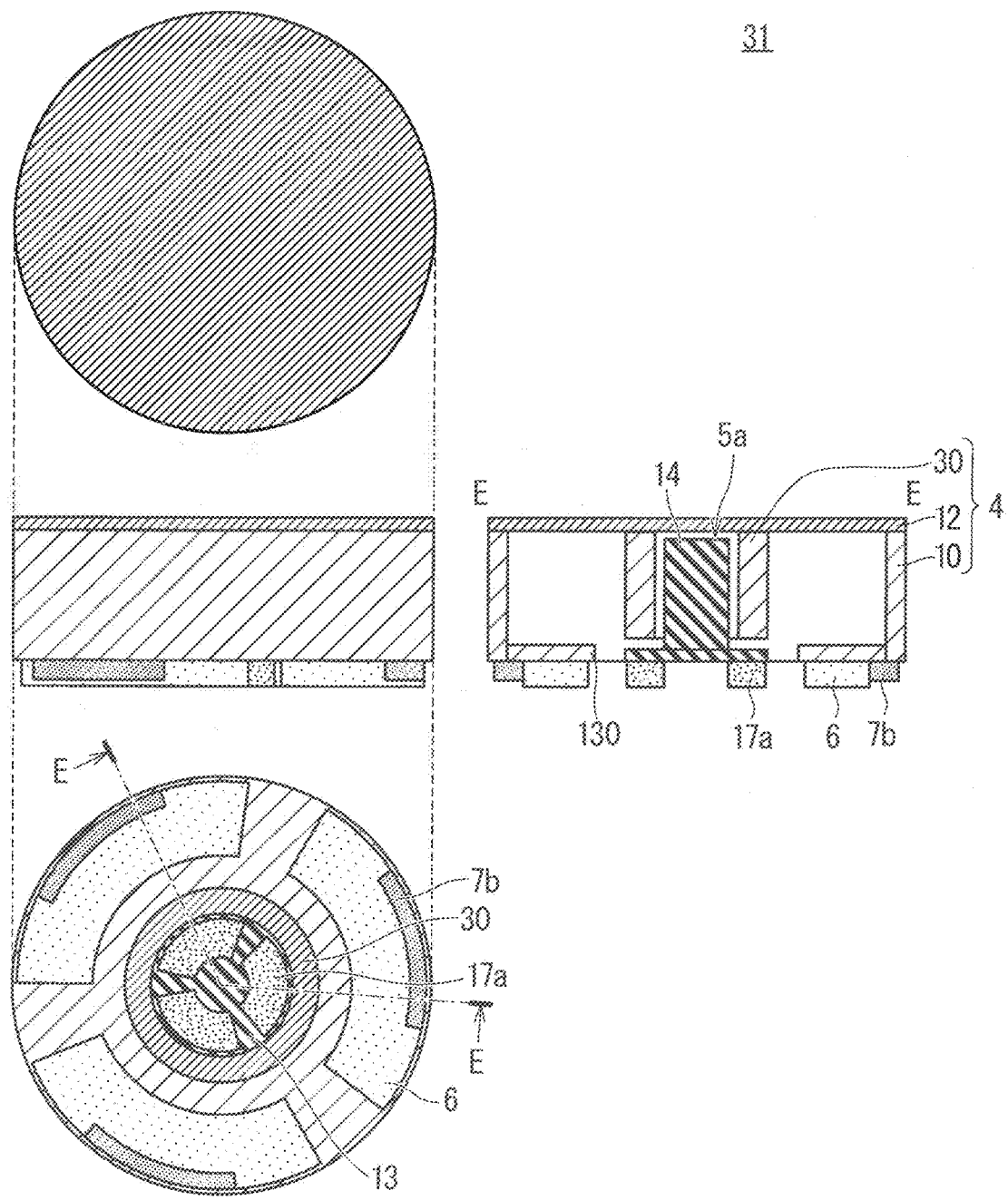
FIG. 96 is a diagram illustrating an example of a configuration of the tactile presentation knob according to the fifth embodiment.

FIG. 96 is a diagram illustrating another example of the configuration of the tactile presentation knob 31. A top view, a side view, and a bottom view are illustrated in this order from the top on the left side of the diagram, and a cross-sectional view in an arrow direction taken along line E-E in the bottom view is illustrated on the right side of the diagram.

As illustrated in FIG. 96, the shaft portion 14 is connected to the fixing table 13, the shaft portion 14 is inserted into the fixing hole of the rotation portion inner shaft portion 30, a gap between the shaft portion 14 and the rotation portion inner shaft portion 30 is small, and displacement in the front-rear direction and the left-right direction of the rotation portion 4 is small.

As illustrated in FIG. 96, a bottom surface of the shaft structure holding portion 17a and a bottom surface of the conductive elastic portion 6 are in the same plane as a surface of the tactile presentation panel. However, in a case where the rotation and translational operations are performed, a bottom surface of a position detection unit 7b is provided so as not to be in contact with the surface of the tactile presentation panel. In a case where the pushing operation is performed, the bottom surface of the position detection unit 7b is in contact with the surface of the tactile presentation panel so that the position of the position detection unit 7b is detected. In this manner, the pushing operation of the tactile presentation knob 31 can be detected without providing an additional detection unit.

Figure 97:
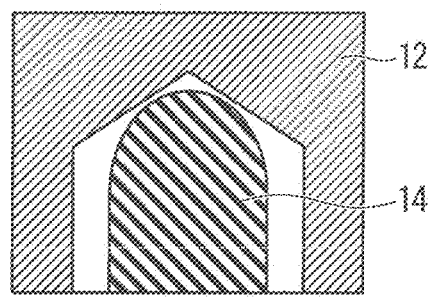
FIG. 97 is a diagram illustrating a partial configuration of the tactile presentation knob according to the fifth embodiment.
Figure 98:
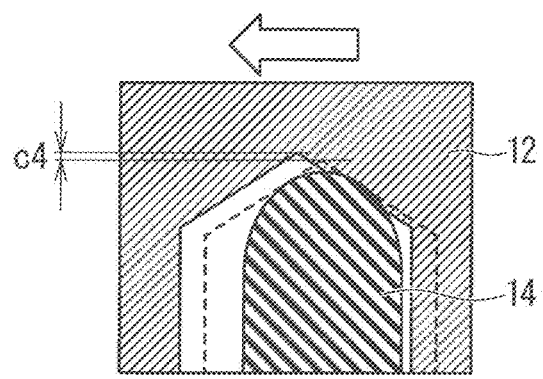
FIG. 98 is a diagram illustrating a partial configuration of the tactile presentation knob according to the fifth embodiment.
Figure 99:
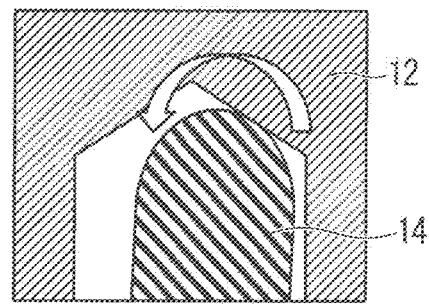
FIG. 99 is a diagram illustrating a partial configuration of the tactile presentation knob according to the fifth embodiment.

FIG. 97 is a cross-sectional view illustrating a configuration of a contact portion between the shaft portion 14 and the rotation portion upper surface plate 12 of the rotation portion 4. As illustrated in FIG. 97, a top portion of the shaft portion 14 has an arc shape, and the rotation portion upper surface plate 12 has a portion facing the shaft portion 14 in a conical shape having an inclination with a rotation center at a maximum height. In a case where the pushing operation is performed on the tactile presentation touch panel in a manner shifted from the vertical direction, the rotation portion moves in the horizontal direction as indicated by an arrow in FIG. 98, and due to shapes of the shaft portion 14 and the side in contact with the shaft portion 14 of the rotation portion upper surface plate 12, the rotation portion 4 is lifted by c4 with respect to that before the movement (indicated by a broken line), and a force in the rotating direction is applied around the contact point between the shaft portion 14 and the rotation portion upper surface plate 12, so that the rotation portion 4 is slightly inclined as indicated by an arrow in FIG. 99. The position detection unit 7b comes into contact with the tactile presentation panel due to this slight inclination, and the movement direction can be easily detected by detecting the position. Note that, although description has been made in a case where the shape of a portion facing the shaft portion 14 of the rotation portion upper surface plate 12 is a conical shape, the shape may be any shape as long as an inclination having an effect of lifting the rotation portion upper surface plate 12 is imparted.

Note that, although the method of holding the shaft structure holding portion 17a is not described in detail, a mode in which the shaft structure holding portion 17a is in contact with a surface of the tactile presentation touch panel 400 in a state where a frictional force is strong is favorable. Examples of a method for making a frictional force between the shaft structure holding portion 17a and the surface of the tactile presentation touch panel 400 higher than the frictional force of a combination of materials include a method using an electrostatic attraction force by the tactile presentation touch panel 400 and a method using a magnetic field attraction force by a magnet, a coil, or the like provided on a back surface of the tactile presentation touch panel 400.

Sixth Embodiment

<Invalidation of Operation Outside Operation Range and Presentation of Tactile Sense>

Figure 102:
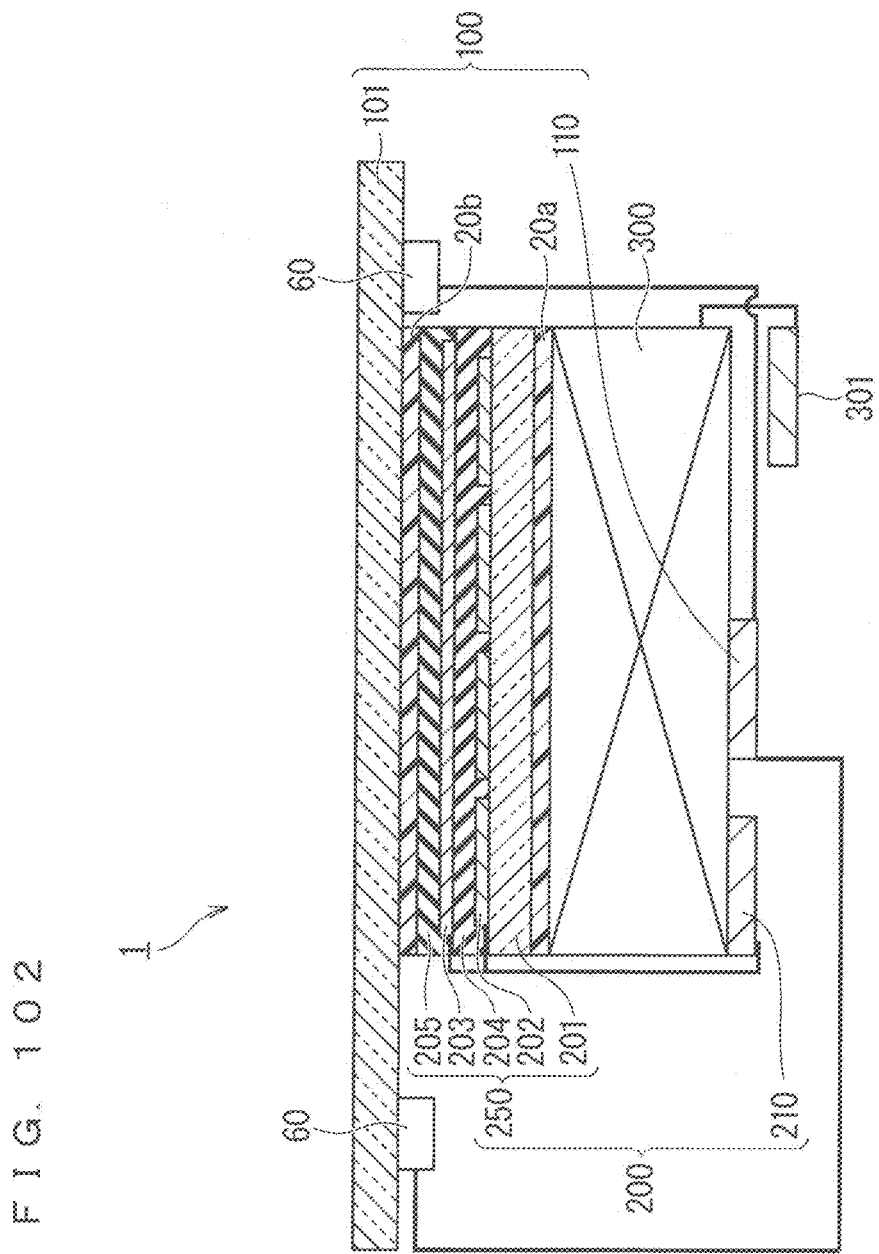
FIG. 102 is a cross-sectional view of the tactile presentation panel according to a sixth embodiment.

FIG. 102 is a cross-sectional view illustrating an example of a configuration of the tactile presentation touch display 1. As illustrated in FIG. 102, in a sixth embodiment, ultrasonic wave element 60 is installed on an outer peripheral portion of a surface opposite to a surface in contact with the tactile presentation knob 3 of the transparent insulating substrate 101. The other configurations are substantially the same as those of the first embodiment, and thus the description of the configurations is omitted here.

A frictional force between the tactile presentation knob 3 and the transparent insulating substrate 101 may be controlled by an ultrasonic wave. In this case, a wavelength range of the ultrasonic wave is lower than a high frequency range in which an air layer is generated between the tactile presentation knob 3 and the transparent insulating substrate 101 and no frictional force is generated.

The ultrasonic wave elements 60 are desirably installed at symmetrical positions in an outer peripheral portion of the transparent insulating substrate 101. By controlling a vibration timing of the ultrasonic wave element 60, a position where vibration of a surface of the transparent insulating substrate 101 resonates can be set at the same position as an indication position 50 of the tactile presentation knob 3.

In this case, it is possible to generate vibration having an equivalent amplitude with a smaller voltage than that in a case where the ultrasonic wave elements 60 operate in synchronization, which can contribute to reduction in overall power consumption of the tactile presentation touch display 1.

<Effect>

According to the sixth embodiment, a surface of the transparent insulating substrate 101 is vibrated using the ultrasonic wave element 60 to generate a frictional force between the tactile presentation knob 3 and the transparent insulating substrate 101. Therefore, in a case where the tactile presentation touch display 1 is used outdoors such as on the sea, the tactile presentation knob 3 can be used.

<Variation>

The first to sixth embodiments are described using an example in which the rotation operation is performed about the rotation shaft of the knob. However, each embodiment can also be applied to a case where the rotation shaft is not used and the knob is slid like a slide switch. Specifically, it is possible to use the knob like a stylus pen not only by vertical, horizontal, or oblique linear slide, but also by circular slide that draws a circle or zigzag slide.

Note that, in the first to sixth embodiments described above, the case where the tactile presentation knob 3 or the tactile presentation knob 31 is used and rotation operation is performed about the rotation shaft of the knob. However, the present invention is not limited to this. For example, each of the first to sixth embodiments can also be applied to a case where the tactile presentation knob 3 or the tactile presentation knob 31 is slid like a slide switch. Specifically, by using the tactile presentation knob 3 or the tactile presentation knob 31 like a stylus pen, not only vertical, horizontal, and oblique linear slide, but also circular slide that draws a circle, zigzag slide, and the like can be performed.

Note that, in the present disclosure, within the scope of the disclosure, preferred embodiments can be freely combined with each other, and each preferred embodiment can be appropriately modified or omitted.

Although the present disclosure has been described in detail, the above explanation is exemplary in all the aspects, and the present disclosure is not limited to the explanation. It is understood that countless variations that are not exemplified are conceivable without departing from the scope of the present disclosure.

The invention claimed is:

1. A tactile presentation apparatus that has a tactile presentation knob having a conductive member placed on an operation surface and presents a tactile sense to a user via the tactile presentation knob, the tactile presentation apparatus comprising:
    a movement amount calculation circuit that calculates a movement amount of the tactile presentation knob from current coordinates on the tactile presentation apparatus of the tactile presentation knob and past coordinates of the tactile presentation knob;
    a tactile strength calculation circuit that calculates a tactile strength of the tactile sense to be presented to the user based on the calculated movement amount of the tactile presentation knob from the current coordinates and the past coordinates;
    a tactile presentation circuit that sets a voltage signal waveform to implement the presentation of the tactile sense based on the calculated tactile strength; and
    a tactile sense condition storage that stores a relationship with the tactile strength for the presentation of the tactile sense based on the movement amount of the tactile presentation knob and a relationship between the tactile strength for the presentation of the tactile sense and the voltage signal waveform set by the tactile presentation circuit to implement the presentation of the tactile sense, wherein
    the movement amount of the tactile presentation knob for the presentation of the tactile sense includes one or more of a rotation angle and a rotation speed of the tactile presentation knob, and
    the presentation of the tactile sense is based on access of the relationship with the tactile strength for the presentation of the tactile sense based on the movement amount of the tactile presentation knob and a relationship between the tactile strength for the presentation of the tactile sense and the voltage signal waveform set by the tactile presentation circuit to implement the presentation of the tactile sense stored in the tactile sense condition storage, and
    for the movement amount of the tactile presentation knob in the form of the rotation angle, patterning associated with a relationship with tactile strength based on the movement amount includes:

a first pattern corresponding to rotation in a first direction of the tactile presentation knob; and
a second pattern corresponding to rotation in a second direction opposite to the first direction,
the first direction is a direction away from an initial position,
the second direction is a direction opposite the first direction,
the first pattern and the second pattern are different, and
presented is a tactile sense selected from one of a first tactile sense corresponding to the first pattern in response to the tactile presentation knob rotating in the first direction away from the initial position, or a second tactile sense corresponding to the second pattern in response to the tactile presentation knob rotating in the second direction opposite the first direction, and
the presented tactile sense is indicative of approach toward the initial position or toward a termination region of an operation region of the tactile presentation knob.

2. The tactile presentation apparatus according to claim 1, further comprising:
a touch panel,
wherein the tactile presentation apparatus functions as a tactile presentation touch panel.

3. The tactile presentation apparatus according to claim 2, further comprising:
a display screen processing circuit that changes a display screen displayed on a display based on the movement amount of the tactile presentation knob.

4. The tactile presentation apparatus according to claim 3, wherein
the display is separate from the tactile presentation apparatus.

5. The tactile presentation apparatus according to claim 3, further comprising:
a display condition storage that stores a relationship between content of processing of the display screen and processing of the display screen based on the movement amount of the tactile presentation knob.

6. The tactile presentation apparatus according to claim 5, wherein
the display condition storage stores a relationship with processing of the display screen based on the movement amount of the tactile presentation knob as a pattern, and
the display screen processing circuit operates based on the pattern.

7. The tactile presentation apparatus according to claim 2, further comprising a display screen processing circuit that changes a display screen to be displayed on a display based on the movement amount of the tactile presentation knob,
wherein the touch panel includes:
a detection circuit that detects contact of the user with the tactile presentation knob; and
a storage that stores at least one of current rotation information of the tactile presentation knob, a current display screen, or a display processing method of the display screen in a case where the user is not in contact with the tactile presentation knob.

8. The tactile presentation apparatus according to claim 7, wherein
in a case where the user is not in contact with the tactile presentation knob, any of initialization of the current rotation information or holding of the current rotation information, initialization of the current display screen or holding of the current display screen, and update of the display screen in accordance with a display processing method of the display screen is selected.

9. The tactile presentation apparatus according to claim 2, further comprising:
a display screen processing circuit that changes a display screen to be displayed on a display based on the movement amount of the tactile presentation knob,
wherein
the tactile presentation apparatus includes:
a display condition storage that stores a relationship between content of processing of the display screen and processing of the display screen based on the movement amount of the tactile presentation knob,
the touch panel includes:
a detection circuit that detects contact of the user with the tactile presentation knob,
the detection circuit detects rotation of the tactile presentation knob, movement in a horizontal direction of the tactile presentation knob, release of contact of the tactile presentation knob, and pushing operation of the tactile presentation knob, and
the display screen processing circuit changes the display screen based on the detected operation of the detection circuit.

10. The tactile presentation apparatus according to claim 9, wherein
the display screen processing circuit performs processing for stopping processing of the display screen based on the movement amount stored in the display condition storage in a case where pushing operation of the tactile presentation knob is performed.

11. The tactile presentation apparatus according to claim 9, wherein
changing of the display screen by the display screen processing circuit is fine adjustment operation of the display screen.

12. The tactile presentation apparatus according to claim 11, wherein
the fine adjustment operation is frame advance operation in screen scrolling.

13. The tactile presentation apparatus according to claim 9, wherein
changing of the display screen by the display screen processing circuit includes screen scrolling operation of roughly changing the display screen by rotation operation of the tactile presentation knob, and
finely changing the display screen by operation other than rotation operation of the tactile presentation knob.

14. The tactile presentation apparatus according to claim 9, wherein
changing of the display screen by the display screen processing circuit includes operation of scaling the display screen.

15. The tactile presentation apparatus according to claim 9, wherein
changing of the display screen by the display screen processing circuit is made based on information stored in the display condition storage or information transmitted from outside.

16. The tactile presentation apparatus according to claim 9, wherein
changing of the display screen by the display screen processing circuit is made by operation of reciprocating the tactile presentation knob.

17. The tactile presentation apparatus according to claim 9, wherein
in a case where the display screen is changed by rotation operation of the tactile presentation knob, information on the rotation angle by the rotation operation is subjected to any one of initialization, holding, and processing of adding or subtracting an angle corresponding to a fine adjustment to or from the rotation angle.

18. The tactile presentation apparatus according to claim 2, further comprising:
a display screen processing circuit that changes a display screen to be displayed on a display based on the movement amount of the tactile presentation knob, wherein
the tactile presentation apparatus includes:
a display condition storage that stores a relationship between content of processing of the display screen and processing of the display screen based on the movement amount of the tactile presentation knob, the touch panel includes:
a detection circuit that detects contact of the user with the tactile presentation knob,
the detection circuit detects rotation of the tactile presentation knob, movement in a horizontal direction of the tactile presentation knob, release of contact of the tactile presentation knob, pushing operation of the tactile presentation knob, and operation of reciprocating the tactile presentation knob, and
the display screen processing circuit changes the display screen based on the detected operation of the detection circuit.

19. The tactile presentation apparatus according to claim 18, wherein
the display screen processing circuit performs processing for stopping processing of the display screen based on the movement amount stored in the display condition storage in a case where pushing operation of the tactile presentation knob is performed.

20. The tactile presentation apparatus according to claim 18, wherein
changing of the display screen by the display screen processing circuit is fine adjustment operation of the display screen.

21. The tactile presentation apparatus according to claim 20, wherein
the fine adjustment operation is frame advance operation in screen scrolling.

22. The tactile presentation apparatus according to claim 18, wherein
changing of the display screen by the display screen processing circuit includes screen scrolling operation of roughly changing the display screen by rotation operation of the tactile presentation knob, and finely changing the display screen by operation other than rotation operation of the tactile presentation knob.

23. The tactile presentation apparatus according to claim 18, wherein
changing of the display screen by the display screen processing circuit includes operation of scaling the display screen.

24. The tactile presentation apparatus according to claim 18, wherein
changing of the display screen by the display screen processing circuit is made based on information stored in the display condition storage or information transmitted from outside.

25. The tactile presentation apparatus according to claim 18, wherein
changing of the display screen by the display screen processing circuit is made by operation of reciprocating the tactile presentation knob.

26. The tactile presentation apparatus according to claim 18, wherein
in a case where the display screen is changed by rotation operation of the tactile presentation knob, information on the rotation angle by the rotation operation is subjected to any one of initialization, holding, and processing of adding or subtracting an angle corresponding to a fine adjustment to or from the rotation angle.

27. The tactile presentation apparatus according to claim 1, wherein
the tactile presentation circuit changes an operation feeling according to the rotation speed of the tactile presentation knob.

28. The tactile presentation apparatus according to claim 1, wherein
the tactile sense condition storage stores the relationship with the tactile strength based on the movement amount of the tactile presentation knob as a pattern, and
the tactile strength calculation circuit operates based on the pattern.

29. The tactile presentation apparatus according to claim 1, wherein
the first pattern is a pattern in which the tactile strength increases as the rotation angle from the initial position of the tactile presentation knob increases.

30. The tactile presentation apparatus according to claim 1, wherein
in the first pattern, degree of increase in the tactile strength in a peripheral region of the initial position of the tactile presentation knob is larger than that in the termination region of an operation range of the tactile presentation knob.

31. The tactile presentation apparatus according to claim 1, wherein
in the first pattern, degree of increase in the tactile strength in a peripheral region of the initial position of the tactile presentation knob is smaller than that in the termination region of an operation range of the tactile presentation knob.

32. The tactile presentation apparatus according to claim 1, wherein
the first pattern is a pattern in which the tactile strength decreases as the rotation angle from the initial position of the tactile presentation knob increases.

33. The tactile presentation apparatus according to claim 1, wherein
the first pattern is a pattern in which the tactile strength increases as the rotation angle from the initial position increases up to a set rotation angle, and the tactile strength discontinuously decreases under a condition where the set rotation angle is exceeded.

34. The tactile presentation apparatus according to claim 33, further comprising:
a display screen processing circuit that changes a display screen to be displayed on a display based on the movement amount of the tactile presentation knob,
wherein the display screen processing circuit stops change of the display screen under the condition where the set rotation angle is exceeded.

35. The tactile presentation apparatus according to claim 1, wherein
the first pattern is a pattern in which the tactile strength does not change in a peripheral region of the initial position of the tactile presentation knob.

36. The tactile presentation apparatus according to claim 1, wherein
the second pattern is a pattern in which the tactile strength decreases from the tactile strength of the tactile presentation knob in the first pattern to a predetermined first tactile strength.

37. The tactile presentation apparatus according to claim 36, wherein
the second pattern is a pattern in which the tactile strength increases from the first tactile strength to a predetermined second tactile strength at the initial position of the tactile presentation knob.

38. The tactile presentation apparatus according to claim 36, wherein
the second pattern is a pattern in which the tactile strength increases from the first tactile strength toward a predetermined second tactile strength as the initial position of the tactile presentation knob is closer.

39. The tactile presentation apparatus according to claim 1, wherein
the tactile strength is changed as a maximum amplitude of a voltage signal having a plurality of frequencies is changed.

40. The tactile presentation apparatus according to claim 1, wherein
the tactile strength is changed as application time of a voltage signal having a plurality of frequencies is changed.

41. The tactile presentation apparatus according to claim 1, wherein
the tactile strength is changed as a formation cycle of a voltage signal having a plurality of frequencies is changed.

42. The tactile presentation apparatus according to claim 1, wherein
the movement amount calculation circuit outputs the movement amount of the tactile presentation knob to a drive control circuit that performs drive control of a moving body.

43. The tactile presentation apparatus according to claim 42, wherein
the drive control circuit performs drive control of the moving body with reference to an operation pattern associated with rotation of the tactile presentation knob, and movement in a horizontal direction of the tactile presentation knob and operation of releasing contact from the tactile presentation knob stored in a storage based on the movement amount of the tactile presentation knob.

44. The tactile presentation apparatus according to claim 42,
wherein
the tactile sense condition storage stores, as a pattern, a relationship with the tactile strength based on the movement amount of the tactile presentation knob,
the tactile strength calculation circuit operates based on the pattern, and
in a case where the movement amount of the tactile presentation knob is the rotation angle,
the pattern includes:
a first pattern corresponding to rotation in a first direction of the tactile presentation knob; and
a second pattern corresponding to rotation in a second direction opposite to the first direction, and
the first pattern and the second pattern are different.

45. The tactile presentation apparatus according to claim 44, wherein
the first pattern is a pattern in which the tactile strength is constant from an initial position of the tactile presentation knob to a first rotation angle, and the tactile strength decreases as the rotation angle increases under a condition where the first rotation angle is exceeded.

46. The tactile presentation apparatus according to claim 44, wherein
in the first pattern,
under a condition where a second rotation angle is exceeded, the tactile strength becomes constant, and
when a third rotation angle is exceeded, the tactile strength increases as the rotation angle increases.

47. The tactile presentation apparatus according to claim 46, further comprising:
a display screen processing circuit that changes a display screen to be displayed on a display based on the movement amount off the tactile presentation knob,
wherein
in the first pattern,
under a condition where a fourth rotation angle is exceeded, the tactile strength discontinuously decreases, and
the display screen processing circuit stops change of the display screen.

48. The tactile presentation apparatus according to claim 44, wherein
the second pattern is a pattern in which the tactile strength decreases from the tactile strength of the tactile presentation knob in the first pattern to a predetermined first tactile strength.

49. The tactile presentation apparatus according to claim 48, wherein
the second pattern is a pattern in which the tactile strength increases from the first tactile strength to a predetermined second tactile strength at the initial position of the tactile presentation knob.

50. The tactile presentation apparatus according to claim 42, wherein
operation of the moving body by the tactile presentation knob includes:
operation of releasing a driving force, braking, shifting up a gear change, shifting down a gear change, advancing, reversing, flap-up, flap-down, rotating to the right, and rotating to the left performed on the moving body.

51. The tactile presentation apparatus according to claim 42, wherein
the moving body includes an automobile, agricultural equipment, construction equipment, a railway vehicle, a ship, a flying body, and a robot.

52. The tactile presentation apparatus according to claim 1, wherein
the presentation of the tactile sense is performed electrostatically.

53. The tactile presentation apparatus according to claim 1, wherein
the presentation of the tactile sense is performed together with an ultrasonic wave.

54. A tactile presentation knob placed on the operation surface of the tactile presentation apparatus according to claim 1, comprising:

a rotation shaft having a hollow structure;
a first rotating body arranged in a hollow portion of the rotation shaft;
a second rotating body that houses the rotation shaft;
a conductive elastic portion arranged on a side facing the operation surface of the first rotating body;
a structure holding portion arranged on a side facing the operation surface of the rotation shaft;
a position detector on a side facing the operation surface of the second rotating body; and
an upper surface plate that connects the first rotating body and the second rotating body on a side opposite to the operation surface.

55. The tactile presentation knob according to claim 54, wherein
a diameter of the hollow portion of the rotation shaft is larger than a diameter of the first rotating body by at most 0.5 mm.

56. The tactile presentation knob according to claim 54, wherein
the structure holding portion is divided into a plurality of portions arranged at intervals from each other, and
the conductive elastic portion is divided into a plurality of portions arranged at intervals from each other.

57. The tactile presentation knob according to claim 54, wherein
the position detector is divided into a plurality of portions arranged at intervals from each other.

58. A tactile presentation knob placed on the operation surface of the tactile presentation apparatus according to claim 1, comprising:
a rotation shaft;
a first rotating body that houses the rotation shaft;
a second rotating body that houses the first rotating body;
a structure holding portion arranged on a side facing the operation surface of the rotation shaft;
a conductive elastic portion arranged on a side facing the operation surface of the second rotating body; and
an upper surface plate that connects the first rotating body and the second rotating body on a side opposite to the operation surface,
wherein
the rotation shaft includes:
a shaft portion;
a fixing table that faces the operation surface with the structure holding portion interposed therebetween; and
an elastic connector that connects the fixing table and the shaft portion.

59. The tactile presentation knob according to claim 58, wherein
the elastic connector includes a coil spring.

60. The tactile presentation knob according to claim 59, wherein
the elastic connector includes:
two or more of first flat plate springs arranged to face each other; and
two or more of second flat plate springs arranged to face each other in a direction orthogonal to the first flat plate spring.

61. The tactile presentation knob according to claim 58, wherein
in the first rotating body, a bottom surface on the operation surface side does not to protrude to a portion forming the elastic connector on the fixing table side of the rotation shaft.

62. The tactile presentation knob according to claim 58, wherein
the structure holding portion is divided into a plurality of portions arranged at intervals from each other, and
the conductive elastic portion is divided into a plurality of portions arranged at intervals from each other.

63. A tactile presentation knob placed on the operation surface of the tactile presentation apparatus according to claim 1, comprising:
a first rotation shaft;
a second rotation shaft that houses the first rotation shaft;
a first rotating body that houses the second rotation shaft;
a second rotating body that houses the first rotating body;
a first structure holding portion arranged on a side facing the operation surface of the first rotation shaft;
a second structure holding portion arranged on a side facing the operation surface of the second rotation shaft;
a conductive elastic portion arranged on a side facing the operation surface of the second rotating body; and
an upper surface plate that connects the first rotating body and the second rotating body on a side opposite to the operation surface,
wherein
the first rotation shaft includes:
a shaft portion;
a fixing table that faces the operation surface with the first structure holding portion interposed therebetween; and
an elastic connector that connects the fixing table and the shaft portion.

64. The tactile presentation knob according to claim 63, further comprising:
a first shaft portion guide that protrudes from a side surface of the shaft portion of the first rotation shaft; and
a second shaft portion guide protruding from a position corresponding to the first shaft portion guide on an inner surface of the second rotation shaft and engaging with the first shaft portion guide.

65. A tactile presentation knob placed on the operation surface of the tactile presentation apparatus according to claim 1, comprising:
a rotation shaft;
a first rotating body that houses the rotation shaft;
a second rotating body that houses the first rotating body;
a structure holding portion arranged on a side facing the operation surface of the rotation shaft;
a conductive elastic portion arranged on a side facing the operation surface of the second rotating body; and
an upper surface plate that connects the first rotating body and the second rotating body on a side opposite to the operation surface,
wherein
the rotation shaft includes:
a shaft portion; and
a fixing table that faces the operation surface with the structure holding portion interposed therebetween, and
a gap is included between a side surface of the shaft portion of the rotation shaft and an inner surface of the first rotating body, the gap allowing a rotation portion including the first rotating body, the second rotating body, and the upper surface plate to move back, forth, right, and left in a planar direction.

66. The tactile presentation knob according to claim 65, wherein
the gap includes a plurality of suspensions that separate the rotation shaft and the first rotating body, and
each of the plurality of suspensions includes an elastic connector having a first end connected to the shaft portion and a sliding portion connected to a second end of the elastic connector, the sliding portion being in contact with and sliding on an inner surface of the first rotating body.

67. The tactile presentation knob according to claim 65, wherein
the gap includes a plurality of piezoelectric elements that separate the rotation shaft and the first rotating body, and
each of the plurality of piezoelectric elements includes a sliding portion having a first end connected to the shaft portion and a second end in contact with and sliding on an inner surface of the first rotating body.

68. The tactile presentation knob according to claim 65, wherein
the structure holding portion is divided into a plurality of portions arranged at intervals from each other, and
the conductive elastic portion is divided into a plurality of portions arranged at intervals from each other.

69. A tactile presentation knob placed on the operation surface of the tactile presentation apparatus according to claim 1, comprising:
a rotation shaft;
a first rotating body that houses the rotation shaft;
a second rotating body that houses the first rotating body;
a structure holding portion on a side facing the operation surface of the rotation shaft;
a conductive elastic portion on a side facing the operation surface of the second rotating body;
a position detector outside the conductive elastic portion; and
an upper surface plate that connects the first rotating body and the second rotating body on a side opposite to the operation surface,
wherein
the rotation shaft includes:
a shaft portion; and
a fixing table that faces the operation surface with the structure holding portion interposed therebetween, and
the position detector is thinner than the structure holding portion and the conductive elastic portion so that a bottom surface does not come into contact with the operation surface in rotation operation and translational operation of the tactile presentation knob.

70. The tactile presentation knob according to claim 69, wherein
the shaft portion of the rotation shaft has a top portion having a cross section of an arc shape, and
in the upper surface plate, a portion facing the top portion of the shaft portion has a conical shape having an inclination with a rotation center as a maximum height.

71. The tactile presentation knob according to claim 69, wherein
the position detector is divided into a plurality of portions arranged at intervals from each other.

* * * * *